(12) United States Patent
Kang et al.

(10) Patent No.: US 9,755,814 B2
(45) Date of Patent: Sep. 5, 2017

(54) METHOD OF DETERMINING TRANSPORT BLOCK SIZE AND APPARATUSES THEREOF

(71) Applicant: KT CORPORATION, Gyeonggi-do (KR)

(72) Inventors: Seung Hyun Kang, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 225 days.

(21) Appl. No.: 14/664,855

(22) Filed: Mar. 21, 2015

(65) Prior Publication Data
US 2015/0271802 A1 Sep. 24, 2015

(30) Foreign Application Priority Data

Mar. 21, 2014 (KR) .................. 10-2014-0033633
Mar. 26, 2014 (KR) .................. 10-2014-0035350
Mar. 31, 2014 (KR) .................. 10-2014-0037405
May 19, 2014 (KR) .................. 10-2014-0059650
Dec. 15, 2014 (KR) .................. 10-2014-0180330

(51) Int. Cl.
*H04L 27/34* (2006.01)
*H04L 5/00* (2006.01)
(Continued)

(52) U.S. Cl.
CPC .......... *H04L 5/0092* (2013.01); *H04L 1/0003* (2013.01); *H04L 1/0009* (2013.01);
(Continued)

(58) Field of Classification Search
CPC ... H04L 1/0003; H04L 1/0009; H04L 1/0026; H04L 27/0008; H04L 27/0012; H04L 27/34
See application file for complete search history.

(56) References Cited

U.S. PATENT DOCUMENTS

| | | | | |
|---|---|---|---|---|
| 2013/0329661 A1* | 12/2013 | Chen | ................. | H04W 72/0453 370/329 |
| 2015/0195069 A1* | 7/2015 | Yi | .............................. | H04J 11/00 370/329 |
| 2015/0215913 A1* | 7/2015 | Cheng | ................... | H04L 1/0001 370/330 |

FOREIGN PATENT DOCUMENTS

WO 2014/021632 A1 2/2014

OTHER PUBLICATIONS

Hwawei et al., "TBS table design for 256QAM", R1-140035, 3GPP TSG RAN WG1 Meeting #76, Prague, Czech Republic, Feb. 10-14, 2014, pp. 1-12.
(Continued)

*Primary Examiner* — Hoon J Chung
(74) *Attorney, Agent, or Firm* — IP Legal Services, LLC

(57) ABSTRACT

The present disclosure relates to a method and apparatus for determining a Transport Block Size (TBS) in a wireless communication system, and more particularly, to a method and apparatus for determining a TBS table in association with 256 QAM. Particularly, a method for a base station to transmit data includes receiving Channel State Information (CSI) from a User Equipment, determining a Transport Block Size (TBS) value based on a TBS table including indices corresponding to the 256QAM modulation scheme and the number of allocable Physical Resource Block (PRB) pairs, and transmitting data using the TBS value.

15 Claims, 19 Drawing Sheets

(51) Int. Cl.
*H04L 27/00* (2006.01)
*H04L 1/00* (2006.01)

(52) U.S. Cl.
CPC ........ *H04L 1/0026* (2013.01); *H04L 27/0008* (2013.01); *H04L 27/0012* (2013.01); *H04L 27/34* (2013.01)

(56) References Cited

OTHER PUBLICATIONS

Ericsson, "TBS table design for downlink 256QAM", R1-140755, 3GPP TSG RAN WG1 Meeting #76, Prague, Czech Republic, Feb. 10-14, 2014, pp. 1-6.
Broadcom Corporation, "Details of MCS and TBS design for high order modulation", R1-140608, 3GPP TSG-RAN WG1 Meeting #76, Prague, Czech Republic, Feb. 10-14, 2014, pp. 1-5.
Nokia, NSN, "On CQI/MCS/TBS table design for 256QAM", R1-140555, 3GPP TSG-RAN WG1 Meeting #76, Prague, Czech Republic, Feb. 10-14, 2014, pp. 1-7.

* cited by examiner

FIG.1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

FIG.3

| CQI INDEX | MODULATION | CODE RATE X 1024 | EFFICIENCY |
|---|---|---|---|
| 0 | | OUT OF RANGE | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

| CQI INDEX | $I_{MCS}$ | $I_{TBS}$ | CODE RATE * 1024 | EFFICIENCY |
|---|---|---|---|---|
| 2 | 0 | 0 | 120 | 0.2344 |
| - | 1 | 1 | 157 | 0.3057 |
| 3 | 2 | 2 | 193 | 0.3770 |
| - | 3 | 3 | 251 | 0.4893 |
| 4 | 4 | 4 | 308 | 0.6016 |
| - | 5 | 5 | 379 | 0.7393 |
| 5 | 6 | 6 | 449 | 0.8770 |
| - | 7 | 7 | 526 | 1.0264 |
| 6 | 8 | 8 | 602 | 1.1758 |
| - | 9 | 9 | 679 | 1.3262 |
| | 10 | 9 | 340 | |
| 7 | 11 | 10 | 378 | 1.4766 |
| - | 12 | 11 | 434 | 1.6954 |
| 8 | 13 | 12 | 490 | 1.9141 |
| - | 14 | 13 | 553 | 2.1602 |
| 9 | 15 | 14 | 616 | 2.4063 |
| - | 16 | 15 | 658 | 2.5684 |
| | 17 | 15 | 438 | |
| 10 | 18 | 16 | 466 | 2.7305 |
| - | 19 | 17 | 517 | 3.0264 |
| 11 | 20 | 18 | 567 | 3.3223 |
| - | 21 | 19 | 616 | 3.6123 |
| 12 | 22 | 20 | 666 | 3.9023 |
| - | 23 | 21 | 719 | 4.2129 |
| 13 | 24 | 22 | 772 | 4.5234 |
| - | 25 | 23 | 822 | 4.8193 |
| 14 | 26 | 24 | 873 | 5.1152 |
| - | 27 | 25 | 910 | 5.3350 |
| 15 | 28 | 26 | 948 | 5.5547 |

| IMCS | MODULATION | R | ITBS |
|---|---|---|---|
| 21 | 256QAM | 711 | 27 |
| 22 | 256QAM | 754 | 28 |
| 23 | 256QAM | 797 | 29 |
| 24 | 256QAM | 841 | 30 |
| 25 | 256QAM | 885 | 31 |
| 26 | 256QAM | 916.5 | 32 |
| 27 | 256QAM | 948 | 33 |

FIG.9

| $N_{PRB}$ | 1 | 2 | 3 | 4 | 5 | 6 | 7 | 8 | 9 | 10 |
|---|---|---|---|---|---|---|---|---|---|---|
| TBS | 648 | 1320 | 1992 | 2664 | 3368 | 4008 | 4584 | 5352 | 5992 | 6712 |
| $N_{PRB}$ | 11 | 12 | 13 | 14 | 15 | 16 | 17 | 18 | 19 | 20 |
| TBS | 7224 | 7992 | 8504 | 9144 | 9912 | 10680 | 11448 | 11832 | 12576 | 12960 |
| $N_{PRB}$ | 21 | 22 | 23 | 24 | 25 | 26 | 27 | 28 | 29 | 30 |
| TBS | 14112 | 14688 | 15264 | 15840 | 16416 | 16992 | 17568 | 18336 | 19080 | 19848 |
| $N_{PRB}$ | 31 | 32 | 33 | 34 | 35 | 36 | 37 | 38 | 39 | 40 |
| TBS | 20616 | 21384 | 22152 | 22920 | 22920 | 23688 | 24496 | 25456 | 25456 | 26416 |
| $N_{PRB}$ | 41 | 42 | 43 | 44 | 45 | 46 | 47 | 48 | 49 | 50 |
| TBS | 27376 | 27376 | 28336 | 29296 | 29296 | 30576 | 31704 | 31704 | 32856 | 32856 |
| $N_{PRB}$ | 51 | 52 | 53 | 54 | 55 | 56 | 57 | 58 | 59 | 60 |
| TBS | 34008 | 34008 | 35160 | 35160 | 36696 | 36696 | 37888 | 37888 | 39232 | 39232 |
| $N_{PRB}$ | 61 | 62 | 63 | 64 | 65 | 66 | 67 | 68 | 69 | 70 |
| TBS | 40576 | 40576 | 42368 | 42368 | 43816 | 43816 | 43816 | 45352 | 45352 | 46888 |
| $N_{PRB}$ | 71 | 72 | 73 | 74 | 75 | 76 | 77 | 78 | 79 | 80 |
| TBS | 46888 | 46888 | 48936 | 48936 | 48936 | 51024 | 51024 | 51024 | 52752 | 52752 |
| $N_{PRB}$ | 81 | 82 | 83 | 84 | 85 | 86 | 87 | 88 | 89 | 90 |
| TBS | 52752 | 55056 | 55056 | 55056 | 57336 | 57336 | 57336 | 59256 | 59256 | 59256 |
| $N_{PRB}$ | 91 | 92 | 93 | 94 | 95 | 96 | 97 | 98 | 99 | 100 |
| TBS | 59256 | 61664 | 61664 | 61664 | 63776 | 63776 | 63776 | 63776 | 66592 | 66592 |
| $N_{PRB}$ | 101 | 102 | 103 | 104 | 105 | 106 | 107 | 108 | 109 | 110 |
| TBS | 66592 | 66592 | 68808 | 68808 | 68808 | 71112 | 71112 | 71112 | 71112 | 73712 |

FIG.10

| $N_{PRB}$ | 1 | 2 | 3 | 4 | 5 | 6 | 7 | 8 | 9 | 10 |
|---|---|---|---|---|---|---|---|---|---|---|
| TBS | 680 | 1384 | 2088 | 2792 | 3496 | 4264 | 4968 | 5544 | 6200 | 6968 |
| $N_{PRB}$ | 11 | 12 | 13 | 14 | 15 | 16 | 17 | 18 | 19 | 20 |
| TBS | 7736 | 8504 | 9144 | 9912 | 10680 | 11064 | 11832 | 12576 | 13536 | 14112 |
| $N_{PRB}$ | 21 | 22 | 23 | 24 | 25 | 26 | 27 | 28 | 29 | 30 |
| TBS | 14688 | 15264 | 16416 | 16992 | 17568 | 18336 | 19080 | 19848 | 20616 | 21384 |
| $N_{PRB}$ | 31 | 32 | 33 | 34 | 35 | 36 | 37 | 38 | 39 | 40 |
| TBS | 22152 | 22152 | 22920 | 23688 | 24496 | 25456 | 26416 | 26416 | 27376 | 28336 |
| $N_{PRB}$ | 41 | 42 | 43 | 44 | 45 | 46 | 47 | 48 | 49 | 50 |
| TBS | 29296 | 29296 | 30576 | 30576 | 31704 | 32856 | 32856 | 34008 | 34008 | 35160 |
| $N_{PRB}$ | 51 | 52 | 53 | 54 | 55 | 56 | 57 | 58 | 59 | 60 |
| TBS | 35160 | 36696 | 36696 | 37888 | 39232 | 39232 | 40576 | 40576 | 42368 | 42368 |
| $N_{PRB}$ | 61 | 62 | 63 | 64 | 65 | 66 | 67 | 68 | 69 | 70 |
| TBS | 42368 | 43816 | 43816 | 45352 | 45352 | 46888 | 46888 | 46888 | 48936 | 48936 |
| $N_{PRB}$ | 71 | 72 | 73 | 74 | 75 | 76 | 77 | 78 | 79 | 80 |
| TBS | 48936 | 51024 | 51024 | 52752 | 52752 | 52752 | 55056 | 55056 | 55056 | 57336 |
| $N_{PRB}$ | 81 | 82 | 83 | 84 | 85 | 86 | 87 | 88 | 89 | 90 |
| TBS | 57336 | 57336 | 59256 | 59256 | 59256 | 61664 | 61664 | 61664 | 61664 | 63776 |
| $N_{PRB}$ | 91 | 92 | 93 | 94 | 95 | 96 | 97 | 98 | 99 | 100 |
| TBS | 63776 | 63776 | 66592 | 66592 | 66592 | 66592 | 68808 | 68808 | 68808 | 71112 |
| $N_{PRB}$ | 101 | 102 | 103 | 104 | 105 | 106 | 107 | 108 | 109 | 110 |
| TBS | 71112 | 71112 | 73712 | 73712 | 73712 | 75376 | 75376 | 76208 | 76208 | 76208 |

FIG.11

| $N_{PRB}$ | *1* | *2* | *3* | *4* | *5* | *6* | *7* | *8* | *9* | *10* |
|---|---|---|---|---|---|---|---|---|---|---|
| TBS | 712 | 1480 | 2216 | 2984 | 3752 | 4392 | 5160 | 5992 | 6712 | 7480 |
| $N_{PRB}$ | *11* | *12* | *13* | *14* | *15* | *16* | *17* | *18* | *19* | *20* |
| TBS | 8248 | 8760 | 9528 | 10296 | 11064 | 11832 | 12576 | 13536 | 14112 | 14688 |
| $N_{PRB}$ | *21* | *22* | *23* | *24* | *25* | *26* | *27* | *28* | *29* | *30* |
| TBS | 15840 | 16416 | 16992 | 17568 | 18336 | 19080 | 19848 | 20616 | 21384 | 22152 |
| $N_{PRB}$ | *31* | *32* | *33* | *34* | *35* | *36* | *37* | *38* | *39* | *40* |
| TBS | 22920 | 23688 | 24496 | 25456 | 26416 | 26416 | 27376 | 28336 | 29296 | 29296 |
| $N_{PRB}$ | *41* | *42* | *43* | *44* | *45* | *46* | *47* | *48* | *49* | *50* |
| TBS | 30576 | 31704 | 31704 | 32856 | 34008 | 34008 | 35160 | 35160 | 36696 | 36696 |
| $N_{PRB}$ | *51* | *52* | *53* | *54* | *55* | *56* | *57* | *58* | *59* | *60* |
| TBS | 37888 | 39232 | 39232 | 40576 | 40576 | 42368 | 42368 | 43816 | 43816 | 45352 |
| $N_{PRB}$ | *61* | *62* | *63* | *64* | *65* | *66* | *67* | *68* | *69* | *70* |
| TBS | 45352 | 45352 | 46888 | 46888 | 48936 | 48936 | 48936 | 51024 | 51024 | 52752 |
| $N_{PRB}$ | *71* | *72* | *73* | *74* | *75* | *76* | *77* | *78* | *79* | *80* |
| TBS | 52752 | 52752 | 55056 | 55056 | 55056 | 57336 | 57336 | 57336 | 59256 | 59256 |
| $N_{PRB}$ | *81* | *82* | *83* | *84* | *85* | *86* | *87* | *88* | *89* | *90* |
| TBS | 59256 | 61664 | 61664 | 61664 | 63776 | 63776 | 63776 | 66592 | 66592 | 66592 |
| $N_{PRB}$ | *91* | *92* | *93* | *94* | *95* | *96* | *97* | *98* | *99* | *100* |
| TBS | 66592 | 68808 | 68808 | 68808 | 71112 | 71112 | 71112 | 73712 | 73712 | 73712 |
| $N_{PRB}$ | *101* | *102* | *103* | *104* | *105* | *106* | *107* | *108* | *109* | *110* |
| TBS | 75376 | 76208 | 76208 | 76208 | 78704 | 78704 | 78704 | 81176 | 81176 | 81176 |

FIG.12

| $N_{PRB}$ | 1 | 2 | 3 | 4 | 5 | 6 | 7 | 8 | 9 | 10 |
|---|---|---|---|---|---|---|---|---|---|---|
| TBS | 776 | 1544 | 2344 | 3112 | 3880 | 4776 | 5544 | 6200 | 6968 | 7736 |
| $N_{PRB}$ | 11 | 12 | 13 | 14 | 15 | 16 | 17 | 18 | 19 | 20 |
| TBS | 8504 | 9528 | 10296 | 11064 | 11832 | 12576 | 13536 | 14112 | 14688 | 15840 |
| $N_{PRB}$ | 21 | 22 | 23 | 24 | 25 | 26 | 27 | 28 | 29 | 30 |
| TBS | 16416 | 16992 | 18336 | 19080 | 19848 | 20616 | 21384 | 22152 | 22920 | 23688 |
| $N_{PRB}$ | 31 | 32 | 33 | 34 | 35 | 36 | 37 | 38 | 39 | 40 |
| TBS | 24496 | 25456 | 25456 | 26416 | 27376 | 28336 | 29296 | 29296 | 30576 | 31704 |
| $N_{PRB}$ | 41 | 42 | 43 | 44 | 45 | 46 | 47 | 48 | 49 | 50 |
| TBS | 31704 | 32856 | 34008 | 34008 | 35160 | 36696 | 36696 | 37888 | 37888 | 39232 |
| $N_{PRB}$ | 51 | 52 | 53 | 54 | 55 | 56 | 57 | 58 | 59 | 60 |
| TBS | 40576 | 40576 | 42368 | 42368 | 43816 | 43816 | 45352 | 45352 | 46888 | 46888 |
| $N_{PRB}$ | 61 | 62 | 63 | 64 | 65 | 66 | 67 | 68 | 69 | 70 |
| TBS | 46888 | 48936 | 48936 | 51024 | 51024 | 51024 | 52752 | 52752 | 55056 | 55056 |
| $N_{PRB}$ | 71 | 72 | 73 | 74 | 75 | 76 | 77 | 78 | 79 | 80 |
| TBS | 55056 | 57336 | 57336 | 57336 | 59256 | 59256 | 59256 | 61664 | 61664 | 63776 |
| $N_{PRB}$ | 81 | 82 | 83 | 84 | 85 | 86 | 87 | 88 | 89 | 90 |
| TBS | 63776 | 63776 | 63776 | 66592 | 66592 | 66592 | 68808 | 68808 | 68808 | 71112 |
| $N_{PRB}$ | 91 | 92 | 93 | 94 | 95 | 96 | 97 | 98 | 99 | 100 |
| TBS | 71112 | 71112 | 73712 | 73712 | 75376 | 75376 | 76208 | 76208 | 78704 | 78704 |
| $N_{PRB}$ | 101 | 102 | 103 | 104 | 105 | 106 | 107 | 108 | 109 | 110 |
| TBS | 78704 | 81176 | 81176 | 81176 | 81176 | 84760 | 84760 | 84760 | 84760 | 87936 |

FIG.13

| $N_{PRB}$ | 1 | 2 | 3 | 4 | 5 | 6 | 7 | 8 | 9 | 10 |
|---|---|---|---|---|---|---|---|---|---|---|
| TBS | 808 | 1608 | 2472 | 3240 | 4136 | 4968 | 5736 | 6456 | 7480 | 8248 |
| $N_{PRB}$ | 11 | 12 | 13 | 14 | 15 | 16 | 17 | 18 | 19 | 20 |
| TBS | 9144 | 9912 | 10680 | 11448 | 12216 | 12960 | 14112 | 14688 | 15840 | 16416 |
| $N_{PRB}$ | 21 | 22 | 23 | 24 | 25 | 26 | 27 | 28 | 29 | 30 |
| TBS | 17568 | 18336 | 19080 | 19848 | 20616 | 21384 | 22152 | 22920 | 23688 | 24496 |
| $N_{PRB}$ | 31 | 32 | 33 | 34 | 35 | 36 | 37 | 38 | 39 | 40 |
| TBS | 25456 | 26416 | 27376 | 28336 | 29296 | 29296 | 30576 | 31704 | 31704 | 32856 |
| $N_{PRB}$ | 41 | 42 | 43 | 44 | 45 | 46 | 47 | 48 | 49 | 50 |
| TBS | 34008 | 35160 | 35160 | 36696 | 36696 | 37888 | 39232 | 39232 | 40576 | 40576 |
| $N_{PRB}$ | 51 | 52 | 53 | 54 | 55 | 56 | 57 | 58 | 59 | 60 |
| TBS | 42368 | 42368 | 43816 | 45352 | 45352 | 46888 | 46888 | 46888 | 48936 | 48936 |
| $N_{PRB}$ | 61 | 62 | 63 | 64 | 65 | 66 | 67 | 68 | 69 | 70 |
| TBS | 51024 | 51024 | 52752 | 52752 | 52752 | 55056 | 55056 | 55056 | 57336 | 57336 |
| $N_{PRB}$ | 71 | 72 | 73 | 74 | 75 | 76 | 77 | 78 | 79 | 80 |
| TBS | 59256 | 59256 | 59256 | 61664 | 61664 | 63776 | 63776 | 63776 | 66592 | 66592 |
| $N_{PRB}$ | 81 | 82 | 83 | 84 | 85 | 86 | 87 | 88 | 89 | 90 |
| TBS | 66592 | 68808 | 68808 | 68808 | 71112 | 71112 | 71112 | 73712 | 73712 | 73712 |
| $N_{PRB}$ | 91 | 92 | 93 | 94 | 95 | 96 | 97 | 98 | 99 | 100 |
| TBS | 75376 | 76208 | 76208 | 78704 | 78704 | 78704 | 81176 | 81176 | 81176 | 81176 |
| $N_{PRB}$ | 101 | 102 | 103 | 104 | 105 | 106 | 107 | 108 | 109 | 110 |
| TBS | 84760 | 84760 | 84760 | 84760 | 87936 | 87936 | 87936 | 87936 | 90816 | 90816 |

*FIG.14*

| $N_{PRB}$ | *1* | *2* | *3* | *4* | *5* | *6* | *7* | *8* | *9* | *10* |
|---|---|---|---|---|---|---|---|---|---|---|
| TBS | 840 | 1672 | 2536 | 3368 | 4264 | 5160 | 5992 | 6712 | 7736 | 8504 |
| $N_{PRB}$ | *11* | *12* | *13* | *14* | *15* | *16* | *17* | *18* | *19* | *20* |
| TBS | 9528 | 10296 | 11064 | 11832 | 12960 | 13536 | 14688 | 15264 | 16416 | 16992 |
| $N_{PRB}$ | *21* | *22* | *23* | *24* | *25* | *26* | *27* | *28* | *29* | *30* |
| TBS | 17568 | 19080 | 19848 | 20616 | 21384 | 22152 | 22920 | 23688 | 24496 | 25456 |
| $N_{PRB}$ | *31* | *32* | *33* | *34* | *35* | *36* | *37* | *38* | *39* | *40* |
| TBS | 26416 | 27376 | 28336 | 29296 | 29296 | 30576 | 31704 | 32856 | 32856 | 34008 |
| $N_{PRB}$ | *41* | *42* | *43* | *44* | *45* | *46* | *47* | *48* | *49* | *50* |
| TBS | 35160 | 35160 | 36696 | 37888 | 37888 | 39232 | 40576 | 40576 | 42368 | 42368 |
| $N_{PRB}$ | *51* | *52* | *53* | *54* | *55* | *56* | *57* | *58* | *59* | *60* |
| TBS | 43816 | 43816 | 45352 | 46888 | 46888 | 46888 | 48936 | 48936 | 51024 | 51024 |
| $N_{PRB}$ | *61* | *62* | *63* | *64* | *65* | *66* | *67* | *68* | *69* | *70* |
| TBS | 52752 | 52752 | 52752 | 55056 | 55056 | 57336 | 57336 | 57336 | 59256 | 59256 |
| $N_{PRB}$ | *71* | *72* | *73* | *74* | *75* | *76* | *77* | *78* | *79* | *80* |
| TBS | 61664 | 61664 | 61664 | 63776 | 63776 | 63776 | 66592 | 66592 | 66592 | 68808 |
| $N_{PRB}$ | *81* | *82* | *83* | *84* | *85* | *86* | *87* | *88* | *89* | *90* |
| TBS | 68808 | 71112 | 71112 | 71112 | 73712 | 73712 | 73712 | 75376 | 76208 | 76208 |
| $N_{PRB}$ | *91* | *92* | *93* | *94* | *95* | *96* | *97* | *98* | *99* | *100* |
| TBS | 78704 | 78704 | 78704 | 81176 | 81176 | 81176 | 84760 | 84760 | 84760 | 84760 |
| $N_{PRB}$ | *101* | *102* | *103* | *104* | *105* | *106* | *107* | *108* | *109* | *110* |
| TBS | 87936 | 87936 | 87936 | 87936 | 90816 | 90816 | 90816 | 93800 | 93800 | 93800 |

FIG.15

| $N_{PRB}$ | 1 | 2 | 3 | 4 | 5 | 6 | 7 | 8 | 9 | 10 |
|---|---|---|---|---|---|---|---|---|---|---|
| TBS | 968 | 1992 | 2984 | 4008 | 4968 | 5992 | 6968 | 7992 | 8760 | 9912 |
| $N_{PRB}$ | 11 | 12 | 13 | 14 | 15 | 16 | 17 | 18 | 19 | 20 |
| TBS | 10680 | 11832 | 12960 | 13536 | 14688 | 15840 | 16992 | 17568 | 19080 | 19848 |
| $N_{PRB}$ | 21 | 22 | 23 | 24 | 25 | 26 | 27 | 28 | 29 | 30 |
| TBS | 20616 | 21384 | 22920 | 23688 | 24496 | 25456 | 26416 | 27376 | 28336 | 29296 |
| $N_{PRB}$ | 31 | 32 | 33 | 34 | 35 | 36 | 37 | 38 | 39 | 40 |
| TBS | 30576 | 31704 | 32856 | 34008 | 35160 | 35160 | 36696 | 37888 | 39232 | 39232 |
| $N_{PRB}$ | 41 | 42 | 43 | 44 | 45 | 46 | 47 | 48 | 49 | 50 |
| TBS | 40576 | 40576 | 42368 | 43816 | 43816 | 45352 | 46888 | 46888 | 48936 | 48936 |
| $N_{PRB}$ | 51 | 52 | 53 | 54 | 55 | 56 | 57 | 58 | 59 | 60 |
| TBS | 51024 | 51024 | 52752 | 52752 | 55056 | 55056 | 57336 | 57336 | 59256 | 59256 |
| $N_{PRB}$ | 61 | 62 | 63 | 64 | 65 | 66 | 67 | 68 | 69 | 70 |
| TBS | 59256 | 61664 | 61664 | 63776 | 63776 | 63776 | 66592 | 66592 | 68808 | 68808 |
| $N_{PRB}$ | 71 | 72 | 73 | 74 | 75 | 76 | 77 | 78 | 79 | 80 |
| TBS | 71112 | 71112 | 71112 | 73712 | 75376 | 76208 | 76208 | 76208 | 78704 | 78704 |
| $N_{PRB}$ | 81 | 82 | 83 | 84 | 85 | 86 | 87 | 88 | 89 | 90 |
| TBS | 81176 | 81176 | 81176 | 81176 | 84760 | 84760 | 84760 | 87936 | 87936 | 87936 |
| $N_{PRB}$ | 91 | 92 | 93 | 94 | 95 | 96 | 97 | 98 | 99 | 100 |
| TBS | 90816 | 90816 | 90816 | 93800 | 93800 | 93800 | 93800 | 97896 | 97896 | 97896 |
| $N_{PRB}$ | 101 | 102 | 103 | 104 | 105 | 106 | 107 | 108 | 109 | 110 |
| TBS | 97896 | 97896 | 97896 | 97896 | 97896 | 97896 | 97896 | 97896 | 97896 | 97896 |

METHOD OF DETERMINING TRANSPORT BLOCK SIZE AND APPARATUSES THEREOF

CROSS-REFERENCE TO RELATED APPLICATION

This application claims priority from and the benefit under 35 U.S.C. §119(a) of Korean Patent Application Nos. 10-2014-0033633, 10-2014-0035350, 10-2014-0037405, 10-2014-0059650 and 10-2014-0180330, filed on Mar. 21, 2014, Mar. 26, 2014, Mar. 31, 2014, May 19, 2014 and Dec. 15, 2014, respectively, which are hereby incorporated by reference for all purposes as if fully set forth herein.

BACKGROUND OF THE INVENTION

1. Field of the Invention

The present disclosure relates to a method and apparatus for determining a Transport Block Size (TBS) in a wireless communication system, and more particularly, to a method and apparatus for determining a TBS table in association with 256 QAM.

2. Description of the Prior Art

Information may be transmitted through a signal using signal properties such as intensities, displacements, frequencies, and phases thereof. Modulation is a process of transforming such signal properties into proper waveforms according to a channel characteristic of a transmission medium. Also, a digital signal may be used to transmit digital information by mapping the digital information to one of bit stream and a digitalized analog signal (sampled or analog-to-digital converted signal). Digital modulation is a process of transforming such digital signal (e.g., digital symbol sequences) to a proper signal according to the channel characteristics of a transmission medium. As a representative digital modulation method having good bandwidth efficiency, an M-ary QAM modulation method is used. The M-ary QAM modulation method may be expressed as $2^M$ QAM and the M-ary QAM modulation method includes QPSK (or 4QAM), 16QAM and 64QAM.

Various modulation methods are used for downlink (DL) data transmission in a wireless communication system such as Long Term Evolution (LTE) or LTE-Advanced. Such modulation methods include QPSK, 16QAM and 64QAM. By using these modulation methods, a Base Station (BS) transmits data to a User Equipment (UE), and the UE demodulates the transmitted signal and receives the data.

Recently, an amount of data transmitted and received between terminals and associated base stations have been increased abruptly due to sharp increase in the number of user terminals and in the data usage. This requires a modulation method that can rapidly process a large amount of data traffic.

Meanwhile, a BS selects one of the modulation methods based on a DL channel status, and notifies the UE of the selected modulation method by using DCI. The UE may identify the selected modulation method based on the received DCI and may receive the data through demodulation appropriate for the data modulation method.

When the base station transmits data to the User Equipment, the base station selects the modulation scheme based on the downlink channel state, and determines a Transport Block Size (TBS) using the selected modulation scheme. The TBS is required to determine an amount of data to be included in a single transport block when the base station transmits data to the User Equipment.

To this end, the User Equipment measures the downlink channel state, and transmits information associated with the measured channel state to the base station. In addition, the base station determines MCS index information mapped to each of QPSK, 16QAM, and 64QAM based on the information associated with the channel state, and determines the TBS.

However, a new modulation scheme is required due to the increase in data traffic and speed, and a method of determining a TBS in association with the new modulation scheme is required.

SUMMARY OF THE INVENTION

The present disclosure contrived in response to the above described demand provides a method and apparatus for configuring a Transport Block Size (TBS) table when 256QAM is newly defined as a modulation scheme.

In addition, the present disclosure is to provide a method and apparatus for transmitting data from a base station to a User Equipment using a modulation scheme and a newly set TBS table in association with 256QAM.

The present disclosure contrived to solve the above mentioned problems, provides a method for a base station to transmit data. The method includes: receiving Channel State Information (CSI) from a User Equipment; determining a TBS value based on a TBS table including indices for supporting a 256QAM modulation scheme and the number of allocable Physical Resource Block (PRB) pairs; and transmitting data using the TBS value.

In addition, the present disclosure provides a method for a User Equipment to receive data. The method includes: transmitting CSI to a base station; and receiving data using a TBS value determined based on the CSI, wherein the TBS value is determined based on a TBS table including indices for supporting a 256QAM modulation scheme, and the number of allocable PRB pairs.

In addition, the present disclosure provides a base station that transmits data. The base station includes a receiver, a controller, and a transmitter. The receiver receives CSI from a User Equipment. The controller determines a TBS value based on a TBS table including indices corresponding to a 256QAM modulation scheme, and the number of allocable PRB pairs. The transmitter transmits data using the TBS value.

In addition, the present disclosure provides a User Equipment that receives data. The User Equipment includes a transmitter and a receiver. The transmitter transmits CSI to a base station. The receiver receives data using a TBS value determined based on the CSI, wherein the TBS value is determined based on a TBS table including an index corresponding to a 256QAM modulation scheme and the number of allocable PRB pairs.

According to at least one embodiment of the present disclosure, a method and apparatus may be provided for newly setting a TBS table when 256QAM is newly defined as a modulation scheme.

In addition, according to at least one embodiment of the present disclosure, a method and apparatus may be provided for enabling a base station to transmit larger data more faster to a User Equipment using a newly set TBS table for supporting 256QAM.

BRIEF DESCRIPTION OF THE DRAWINGS

The above and other objects, features and advantages of the present disclosure will be more apparent from the following detailed description taken in conjunction with the accompanying drawings, in which:

FIG. 1 is a diagram illustrating a relationship among a modulation order, a Modulation and Coding Scheme (MCS), and a Transport Block Size (TBS) index;

FIG. 3 is a diagram illustrating a typical CQI index table;

FIG. 4 is a diagram illustrating a mapping table between a typical CQI index table and an MCS and a TBS;

FIG. 8 is a diagram illustrating an index of a TBS for supporting 256QAM according to an embodiment of the present disclosure;

FIG. 9 is a diagram illustrating a TBS value of a TBS index number 27 according to an embodiment of the present disclosure;

FIG. 10 is a diagram illustrating a TBS value of a TBS index number 28 according to an embodiment of the present disclosure;

FIG. 11 is a diagram illustrating a TBS value of a TBS index number 29 according to an embodiment of the present disclosure;

FIG. 12 is a diagram illustrating a TBS value of a TBS index number 30 according to an embodiment of the present disclosure;

FIG. 13 is a diagram illustrating a TBS value of a TBS index number 31 according to an embodiment of the present disclosure;

FIG. 14 is a diagram illustrating a TBS value of a TBS index number 32 according to an embodiment of the present disclosure;

FIG. 15 is a diagram illustrating a TBS value of a TBS index number 33 according to an embodiment of the present disclosure;

DETAILED DESCRIPTION OF THE EXEMPLARY EMBODIMENTS

Figure 2:
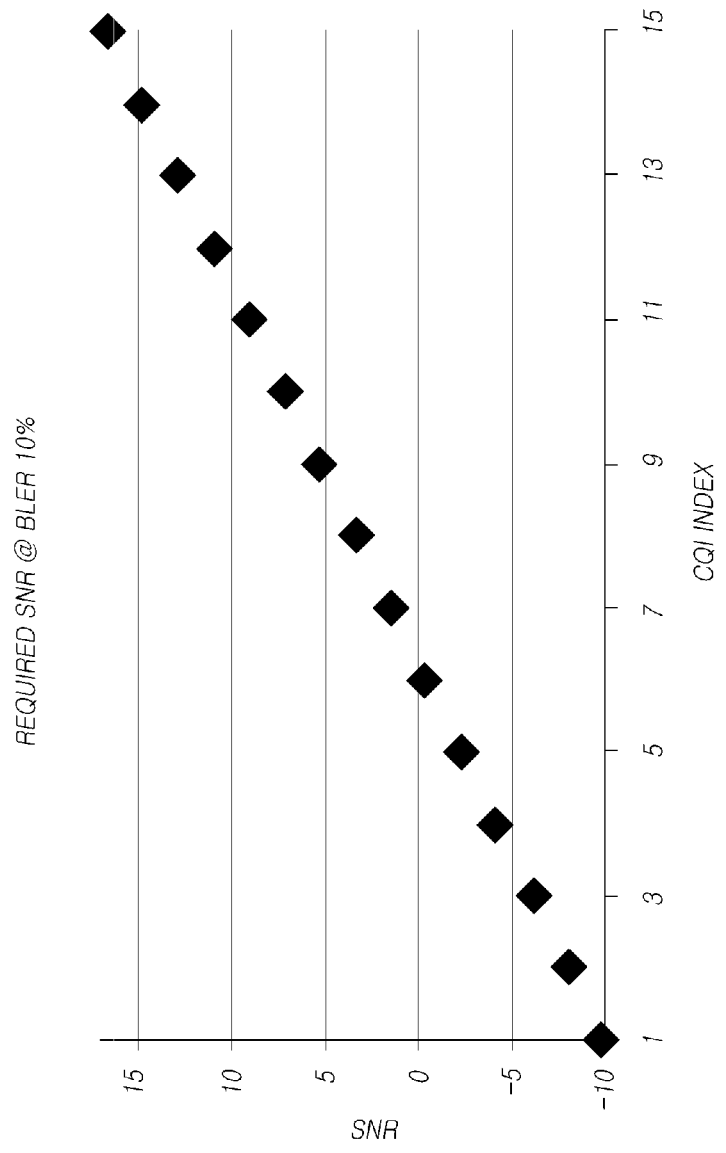
FIG. 2 is a diagram illustrating CQI Block Error Rate (BLER) performance.

Hereinafter, embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a User Equipment (UE) in wideband code division multiple access (WCDMA), long term evolution (LTE), high speed packet access (HSPA), and an Mobile station (MS), a User Terminal (UT), an Subscriber Station (SS), a wireless device, and the like in Global System for mobile communications (GSM).

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a Base Station Controller (BSC) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways: i) the base station may be a device itself that provides a megacell, a macrocell, a microcell, a picocell, a femtocell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. A wireless area itself that receives or transmits a signal from the perspective of a UE or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. The user equipment and the base station are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), a Physical Control Format Indicator Channel (PCFICH), a Physical Hybrid ARQ Indicator Channel (PHICH), a Physical Uplink Control Channel (PUCCH), an Enhanced Physical Downlink Control Channel (EPDCCH), and the like, and may be configured as a data channel, such as a Physical Downlink Shared Channel (PDSCH), a Physical Uplink Shared Channel (PUSCH), and the like, and may be configured as a data channel, such as a Physical Downlink Shared Channel (PDSCH), a Physical Uplink Shared Channel (PUSCH), and the like, so as to transmit data.

Control information may be transmitted using an enhanced PDCCH or extended PDCCH (EPDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (COMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received or a signal is transmitted or received through a PDCCH" includes "an EPDCCH is transmitted or received or a signal is transmitted or received through an EPDCCH".

That is, a downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Hereinafter, higher layer signaling includes an RRC signaling that transmits RRC information including an RRC parameter.

An eNB executes downlink transmission to UEs. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Modulation is a process of transforming signal properties, such as intensity, displacement, frequency, phase, or the like into an appropriate waveform according to the channel characteristics of a transmission medium for transmitting information through a signal. In addition, digital modulation is a process of transforming a digital signal (e.g., a digital symbol sequence) for transmitting digital information by mapping the digital information to one of various available signals (e.g., signal set), into a signal appropriate for channel characteristics. As a representative digital modulation scheme which has high bandwidth efficiency, a M-ary QAM modulation scheme expressed by 2M QAM, such as, QPSK (or 4QAM), 16QAM, and 64QAM, are used. Here, M denotes a modulation order, which indicates the number of digital symbols that are modulated for each time, and the modulation orders of QPSK, 16QAM, 64QAM, and 256QAM are 2, 4, 6, and 8, respectively.

A modulation scheme used for downlink data transmission in 3GPP LTE includes QPSK, 16QAM, and 64QAM. A base station selects one of the above described modulation schemes based on a downlink channel state, and informs a User Equipment (UE) of the same using Downlink Control Information (DCI).

FIG. 1 is a diagram illustrating a relationship among a modulation order, a Modulation and Coding Scheme (MCS), and a Transport Block Size (TBS) index.

An MCS index formed has 5 bits and included in Downlink Control Information (DCI). The MCS index informs a UE of one used for transmission among three modulation schemes as shown in FIG. 1. Referring to FIG. 1, MCS indices #0 to #28 are used for indicating Hybrid Automatic Repeat reQuest (HARQ) initial transmission, and MCS indices #29 to #31 are used for indicating HARQ retransmission.

More specifically, MCS indices #0 to #9 are used to indicate that a QPSK modulation method is used for DL data transmission, MCS indices #10 to #16 are used to indicate that a 16QAM modulation method is used for the DL data transmission, and MCS indices #17 to #28 are used to indicate that a 64QAM modulation method is used for the DL data transmission.

Multiple MCS indices indicate the same modulation method as described above. Each MCS index denotes that data can be transmitted by using codewords of different code rates. When a channel state is good, a BS increases bandwidth efficiency by using a high MCS index. In contrast, when the channel state is poor, the BS performs robust transmission by using a low MCS index so as to be able to overcome the poor channel status. That is, an MCS may be adjusted according to a channel state. Such operation may be referred to as "link adaptation." In other words, the link adaptation refers to the operation of adjusting MCS index by compensating wireless channel characteristics that vary depending on time, in order to maximize a system processing rate.

As described, the MCS indices #0 to #28 are used to indicate HARQ initial transmission, and the MCS indices #29, #30 and #31 are used to indicate one of modulation methods (e.g., QPSK modulation, 16QAM modulation, and 64QAM modulation) used for HARQ retransmission. For example, MCS index #29 indicates that QPSK modulation has been used for HARQ retransmission, MCS index #30 indicates that 16QAM modulation has been used for HARQ retransmission, and MCS index #31 indicates that 64QAM modulation has been used for HARQ retransmission.

Referring to FIG. 1, a Transport Block Size (TBS) index $I_{TBS}$ is configured to be mapped to each MCS index $I_{MCS}$. In the 3GPP TS 36.213 document, 110 TBSs are defined for each TBS index $I_{TBS}$, each TBS corresponding to a size of transmittable information bits, by taking into consideration that the size of a transmission resource from a single Physical Resource Block (PRB) pair to 110 PRB pairs is allocable to a UE.

FIG. 2 is a graph illustrating a CQI block error rate (BLER) performance. FIG. 3 is a typical CQI index table.

The UE needs to feed back a channel state to the BS so that the BS may perform link adaptation according to the channel state of the UE. Such feedback Information on the channel state is referred to as "Channel State Information (CSI). The CSI includes a Pre-coding Matrix Indicator (PMI), a Rank Indicator (RI), and a Channel Quality Indicator (CQI). Here, the PMI and the RI are CSI related to Multiple-Input Multiple-Output (MIMO) transmission, and the CQI indicates a modulation method, a coding rate (i.e., code rate*1024) and transmission efficiency (i.e., efficiency=modulation order*coding rate) which may be used according to the channel state of the UE as illustrated in FIG. 3. When the channel state is good, the UE feeds back a CQI index indicating high transmission efficiency to the BS. In contrast, when the channel state is not good, the UE feeds back a CQI index indicating low transmission efficiency to the BS.

The typical CQI feedback information has a size of 4 bits. The typical CQI feedback information indicates 16 transmission efficiencies. FIG. 2 illustrates a required SNR value satisfying a BLER of 10% against transmission efficiency versus a performance of a CQI of FIG. 3. In an experimental environment considering a single transmission antenna and two reception antennas in an Additive White Gaussian Noise (AWGN) channel environment. In FIG. 2, the typical CQI has a range of a required SNR at a BLER of 10% which is from about −10 dB to 17 dB, and for each CQI index, transmission efficiency is configured so that a gap between SNRs is uniformly equal to about 1.9 dB.

FIG. 4 is a mapping table including a typical CQI index table, an MCS and a TBS.

The BS identifies the CQI received from the UE, and determines the amount of resources to be allocated to the UE and an MCS to be used for transmission to the UE based on the identified CQI. At this time, the above-described MCS illustrated in FIG. 1 and the above-described CQI illustrated in FIG. 3 have a relation as illustrated in FIG. 4.

Referring to FIG. 4, MCS indices 0, 2, 4, 6, 8, 11, 13, 15, 18, 20, 22, 24, 26 and 28 may be configured to have the same transmission efficiencies as those of CQI indices #2, #3, #4, #5, #6, #7, #8, #9, #10, #11, #12, #13, #14 and #15, respectively. In addition, an MCS index positioned between two consecutive CQI indices is configured to have an intermediate transmission efficiency value between transmission efficiency values of two CQI indices transmission efficiency.

However, MCS indices 9 and 10, where a modulation order is changed from QPSK to 16QAM, are configured to have the same transmission efficiency. MCS indices 16 and 17, where a modulation order is changed from 16QAM to 64QAM, are also configured to have the same transmission efficiency. Further, such MCS indices, where modulation orders are changed, are configured to have the same TBS index. Thus, the same TBS is transmitted through a transmission resource of the same amount.

The BS identifies the channel state through the CQI received from the UE, and selects a size of a transmission resource to be allocated to the UE and an MCS to be used for the relevant transmission resource, with reference to the identified channel state. At this time, the determination of a coding rate of the MCS is identical to that of a TBS which is the size of information bits to be transmitted through the relevant transmission resource.

Figure 5:
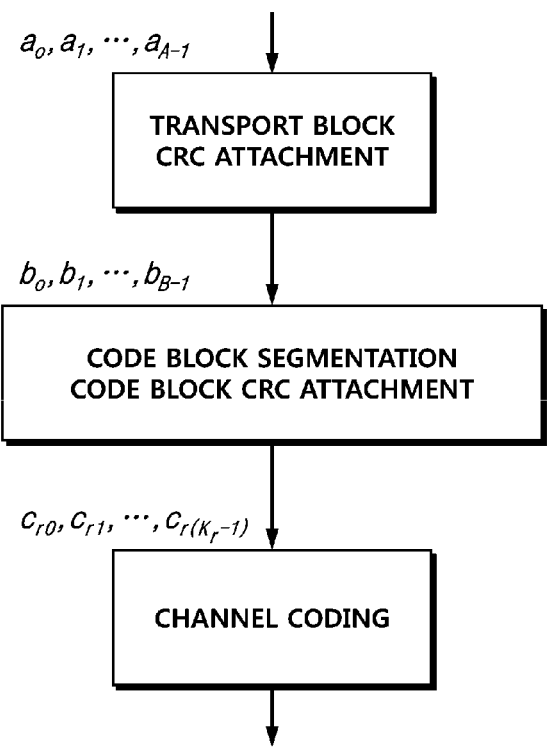
FIG. 5 is a diagram illustrating an encoding method of a data channel.

FIG. 5 is a diagram illustrating a method of encoding a data channel.

Hereinafter, a method of encoding a data channel using a TBS will be described with reference to FIG. 5. Herein, the channel encoding method of FIG. 5 uses the TBS that is set according to at least one embodiment as described above. At first, when a TBS is set, a base station segments a single medium access control protocol data unit (MAC PDU) based on the TBS or generates a Transport Block (TB) by aggregating a plurality of MAC PDUs based on the TBS.

As illustrated in FIG. 5, a TB CRC is generated using the TB because inputting into a channel encoder. The generated CRC has a size of 24 bits. Then, the generated TB CRC is attached to a bit stream of the TB. If the total size of the TB and the TB CRC is greater than 6144 bits, code block segmentation is executed. As described, the TB CRC has a size of 24 bits. In the code block segmentation, a Code Block (CB) CRC is added to each code block. Such a CB CRC has a size of 24 bits. The size of the code block including the CB CRC is not greater than 6144 bits. Each code block is encoded into a turbo code.

B may be used to decide the number of code blocks (e.g., a code block number C) when the TB is segmented into code blocks through the code bock segmentation. The B may be a value including a TBS and a TB CRC. Therefore, B=A+24. In FIG. 5, an information bit stream including the TB CRC is expressed by $b_0, b_1, \ldots,$ and $b_{B-1}$.

When the B is less than or equal to the largest size of a code block such as 6144 bits, the code block number C (e.g., the number of code blocks) is 1. Accordingly, the code block segmentation of a TB is not performed. In addition, an additional CB CRC is not required because the code block number C is 1. Therefore, a total number B' of turbo-encoded information bits is equal to B. When B is greater than the largest code block size such as 6144 bits, the TB is segmented through the code block segmentation. Here, the code block number C is C=(B/(Z−L)). In addition, a CB CRC having a size of 24 bits is included in each code block. Therefore, a total number B' of encoded information bits is B+24*C (e.g., B'=B+24*C).

In the code block segmentation method, the code block number C is defined first based on B'. Then, a code block size K applicable to turbo-encoding is determined. As the code block size K, predetermined 188 block sizes from 40 to 6144 bits are used. Table 1 shows the code block size K mapped to the predetermined 188 block sizes. For reference, Table 5.1.3-3 of the 3GPP TS 36.212 document: K is defined from among turbo code internal interleaver parameters.

TABLE 1

| index | K |
|---|---|
| 1 | 40 |
| 2 | 48 |
| 3 | 58 |
| 4 | 84 |
| 5 | 72 |
| 6 | 80 |
| 7 | 88 |
| 8 | 98 |
| 9 | 104 |
| 10 | 112 |
| 11 | 120 |
| 12 | 128 |
| 13 | 136 |
| 14 | 144 |
| 15 | 152 |
| 16 | 160 |
| 17 | 168 |
| 18 | 176 |
| 19 | 184 |
| 20 | 192 |
| 21 | 200 |
| 22 | 208 |
| 23 | 216 |
| 24 | 224 |
| 25 | 232 |
| 26 | 240 |
| 27 | 248 |
| 28 | 256 |
| 29 | 264 |
| 30 | 272 |
| 31 | 280 |
| 32 | 288 |
| 33 | 296 |
| 34 | 304 |
| 35 | 312 |
| 36 | 320 |
| 37 | 328 |
| 38 | 336 |
| 39 | 344 |
| 40 | 362 |
| 41 | 360 |
| 42 | 388 |
| 43 | 376 |
| 44 | 384 |
| 45 | 392 |
| 46 | 400 |
| 47 | 408 |
| 48 | 416 |
| 49 | 424 |
| 50 | 432 |
| 51 | 440 |
| 52 | 448 |
| 53 | 456 |
| 54 | 464 |
| 55 | 472 |
| 56 | 480 |
| 57 | 488 |
| 58 | 496 |
| 59 | 504 |
| 60 | 512 |
| 61 | 528 |
| 62 | 544 |
| 63 | 560 |

TABLE 1-continued

| index | K |
|---|---|
| 64 | 576 |
| 65 | 592 |
| 66 | 608 |
| 67 | 624 |
| 68 | 640 |
| 69 | 656 |
| 70 | 672 |
| 71 | 688 |
| 72 | 704 |
| 73 | 720 |
| 74 | 736 |
| 75 | 752 |
| 76 | 768 |
| 77 | 784 |
| 78 | 800 |
| 79 | 816 |
| 80 | 832 |
| 81 | 848 |
| 82 | 864 |
| 83 | 880 |
| 84 | 896 |
| 85 | 912 |
| 86 | 928 |
| 87 | 944 |
| 88 | 960 |
| 89 | 976 |
| 90 | 992 |
| 91 | 1008 |
| 92 | 1024 |
| 93 | 1056 |
| 94 | 1088 |
| 95 | 1120 |
| 96 | 1152 |
| 97 | 1184 |
| 98 | 1216 |
| 99 | 1248 |
| 100 | 1280 |
| 101 | 1312 |
| 102 | 1344 |
| 103 | 1376 |
| 104 | 1408 |
| 105 | 1440 |
| 106 | 1472 |
| 107 | 1504 |
| 108 | 1538 |
| 109 | 1588 |
| 110 | 1600 |
| 111 | 1632 |
| 112 | 1664 |
| 113 | 1696 |
| 114 | 1728 |
| 115 | 1780 |
| 116 | 1792 |
| 117 | 1824 |
| 118 | 1856 |
| 119 | 1888 |
| 120 | 1920 |
| 121 | 1952 |
| 122 | 1964 |
| 123 | 2016 |
| 124 | 2048 |
| 125 | 2112 |
| 126 | 2176 |
| 127 | 2240 |
| 128 | 2304 |
| 129 | 2388 |
| 130 | 2432 |
| 131 | 2496 |
| 132 | 2560 |
| 133 | 2624 |
| 134 | 2888 |
| 135 | 2752 |
| 136 | 2816 |
| 137 | 2880 |
| 138 | 2944 |
| 139 | 3005 |
| 140 | 3072 |
| 141 | 3136 |

TABLE 1-continued

| index | K |
| --- | --- |
| 142 | 3200 |
| 143 | 3284 |
| 144 | 3328 |
| 145 | 3392 |
| 146 | 3456 |
| 147 | 3520 |
| 148 | 3584 |
| 149 | 3848 |
| 150 | 3712 |
| 151 | 3776 |
| 152 | 3840 |
| 153 | 3904 |
| 154 | 3968 |
| 155 | 4032 |
| 156 | 4096 |
| 157 | 4160 |
| 158 | 4224 |
| 159 | 4288 |
| 160 | 4352 |
| 161 | 4416 |
| 162 | 4480 |
| 163 | 4544 |
| 164 | 4808 |
| 165 | 4672 |
| 166 | 4736 |
| 167 | 4800 |
| 168 | 4864 |
| 169 | 4928 |
| 170 | 4992 |
| 171 | 5056 |
| 172 | 5120 |
| 173 | 5184 |
| 174 | 5248 |
| 175 | 5312 |
| 176 | 5376 |
| 177 | 5440 |
| 178 | 5504 |
| 179 | 5568 |
| 180 | 5632 |
| 181 | 5696 |
| 182 | 5760 |
| 183 | 5824 |
| 184 | 5888 |
| 185 | 5952 |
| 186 | 6016 |
| 187 | 6080 |
| 188 | 6144 |

Subsequently, a method of defining a code block size K to be used for code block segmentation will be described. At first, $K_+$ is defined as the largest K that satisfies C·K>B' and is selected from Ks mapped to 188 block sizes in Table 1.

When C=1, K is defined to be equal to K ($K=K_+$).

When C>1, a second block size $K_-$ is defined. The second block $K_-$ is used for a subsequent code block segmentation. For example, the largest K is selected from Ks that are less than $K_+$. Then, $K_-$ is defined as the selected K.

Subsequently, the number $C_+$ of code blocks (e.g., code block number $C_+$) obtained through code block segmentation based on $K_+$, and the number $C_-$ of code blocks obtained through code block segmentation based on $K_-$, are defined. C is equal to ($C_+ + C_-$).

First, $C_-$ is defined based on $$C_- = * \frac{CEK_+ - B'}{X_K} + .$$

Here, $X_K = K_+ - K_-$. Therefore, $C_+$ is equal to $C - C_-$ (e.g., $C_+ = C - C_-$).

Subsequently, a process of segmenting the information bits $b_0, b_1, \ldots,$ and $b_{B-1}$ into code blocks will be described.

When C is not 1, r has 0, ..., and C−1, an $r^{th}$ code block bit stream may be expressed as $c_{r0}, c_{r1}, c_{r2}, c_{r3}, \ldots, c_r(K_r-1)$. Each code block of the information bits $b_0, b_1, \ldots,$ and $b_{B-1}$ is configured as follows.

k=0
s=0
for γ=0 to C−1
[Descriptions: the size of each code block is defined as follows.]
When $r<C_-$, $K_r = K_-$,
And otherwise, $K_r = K_+$
[Descriptions: the information bit stream $b_0, b_1, \ldots,$ and $b_{B-1}$ configures a code block bit stream as follows.]
k=0
while
$k<K_r - L$.
$c_{rk} = b_s$
k=k+1
S=s+1
end while
[Descriptions: the bit stream configured through the method may be expressed as $c_{r0}, c_{r1}, c_{r2}, c_{r3}, \ldots, c_r(K_r-L-1)$, and L is 24. A CB CRC of 24 bits is configured using the bit stream and the CB CRC is added to the bit stream through the following method.]
while
$k<K_r$
$C_{rk} = p_{r(k+L-K_r)}$
k=k+1
end while
k=0
end for FIG. 6 is a diagram illustrating typical code block segmentation method.

Figure 6:
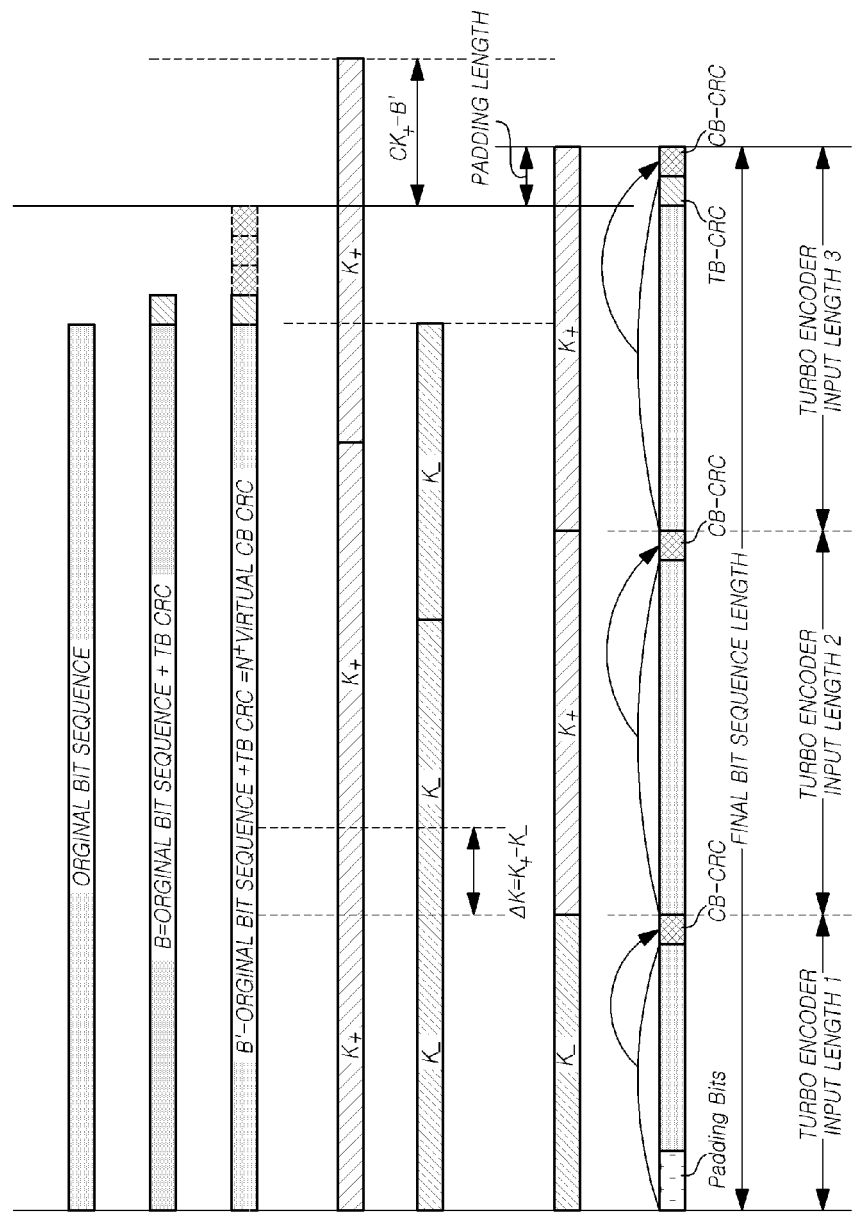
FIG. 6 is a diagram illustrating an example of a typical code block segmentation method.

In FIG. 6, C=3, $C_-=1$, and $C_+=2$. In addition, a first code block is formed of C bits, and the remaining two code blocks are formed of $C_+$ bits. Each code block includes a CB CRC of 24 bits.

However, when the code block segmentation method is applied to a TBS specified in 3GPP TS 36.213, $$C_- = \left\lfloor \frac{C \cdot K_+ - B'}{\Delta_K} \right\rfloor$$

is always 0 in the typical code block segmentation, and thus, code block segmentation is executed based on only a single code block size $K_+$, as shown below.

Table 2 and Table 3 provided below show a code block size K', the number C of code blocks (e.g., code block number C), and a block size B' including a TB-CRC and a CB-CRC, when the code block segmentation is executed with respect to a TBS specified in 3GPP TS 36.213.

TABLE 2

Common TBSs used in Ranks 1 to 4, and code block size K', the number C of code blocks, and a block size B' including a TB-CRC and a CB-CRC when TB code block segmentation is executed

| I | TBS | K' | C | B' |
| --- | --- | --- | --- | --- |
| 0 | 16 | 40 | 1 | 40 |
| 1 | 24 | 48 | 1 | 48 |
| 2 | 32 | 56 | 1 | 56 |
| 3 | 40 | 64 | 1 | 64 |
| 4 | 56 | 60 | 1 | 80 |

TABLE 2-continued

Common TBSs used in Ranks 1 to 4, and code block size K', the number C of code blocks, and a block size B' including a TB-CRC and a CB-CRC when TB code block segmentation is executed

| I | TBS | K' | C | B' |
|---|---|---|---|---|
| 5 | 72 | 96 | 1 | 96 |
| 6 | 88 | 112 | 1 | 112 |
| 7 | 104 | 128 | 1 | 128 |
| 8 | 120 | 144 | 1 | 144 |
| 9 | 136 | 160 | 1 | 160 |
| 10 | 144 | 168 | 1 | 168 |
| 11 | 152 | 176 | 1 | 176 |
| 12 | 176 | 200 | 1 | 200 |
| 13 | 208 | 232 | 1 | 232 |
| 14 | 224 | 248 | 1 | 248 |
| 15 | 256 | 280 | 1 | 280 |
| 16 | 280 | 304 | 1 | 304 |
| 17 | 288 | 312 | 1 | 312 |
| 18 | 296 | 320 | 1 | 320 |
| 19 | 328 | 352 | 1 | 352 |
| 20 | 336 | 360 | 1 | 360 |
| 21 | 344 | 368 | 1 | 368 |
| 22 | 376 | 400 | 1 | 400 |
| 23 | 392 | 416 | 1 | 416 |
| 24 | 408 | 432 | 1 | 432 |
| 25 | 424 | 448 | 1 | 448 |
| 26 | 440 | 464 | 1 | 464 |
| 27 | 456 | 480 | 1 | 480 |
| 28 | 472 | 496 | 1 | 496 |
| 29 | 488 | 512 | 1 | 512 |
| 30 | 504 | 528 | 1 | 528 |
| 31 | 520 | 544 | 1 | 544 |
| 32 | 536 | 560 | 1 | 560 |
| 33 | 552 | 576 | 1 | 576 |
| 34 | 568 | 592 | 1 | 592 |
| 35 | 584 | 608 | 1 | 608 |
| 36 | 600 | 624 | 1 | 624 |
| 37 | 616 | 640 | 1 | 640 |
| 38 | 632 | 656 | 1 | 656 |
| 39 | 648 | 672 | 1 | 672 |
| 40 | 680 | 704 | 1 | 704 |
| 41 | 696 | 720 | 1 | 720 |
| 42 | 712 | 736 | 1 | 736 |
| 43 | 744 | 768 | 1 | 768 |
| 44 | 776 | 800 | 1 | 800 |
| 45 | 808 | 832 | 1 | 832 |
| 46 | 840 | 864 | 1 | 864 |
| 47 | 872 | 896 | 1 | 896 |
| 48 | 904 | 928 | 1 | 928 |
| 49 | 936 | 960 | 1 | 960 |
| 50 | 968 | 992 | 1 | 992 |
| 51 | 1000 | 1024 | 1 | 1024 |
| 52 | 1032 | 1056 | 1 | 1056 |
| 53 | 1064 | 1088 | 1 | 1088 |
| 54 | 1096 | 1120 | 1 | 1120 |
| 55 | 1128 | 1152 | 1 | 1152 |
| 56 | 1160 | 1184 | 1 | 1184 |
| 57 | 1192 | 1216 | 1 | 1216 |
| 58 | 1224 | 1248 | 1 | 1248 |
| 59 | 1256 | 1280 | 1 | 1280 |
| 60 | 1288 | 1312 | 1 | 1312 |
| 61 | 1320 | 1344 | 1 | 1344 |
| 62 | 1352 | 1376 | 1 | 1376 |
| 63 | 1384 | 1408 | 1 | 1408 |
| 64 | 1416 | 1440 | 1 | 1440 |
| 65 | 1480 | 1504 | 1 | 1504 |
| 66 | 1544 | 1568 | 1 | 1568 |
| 67 | 1608 | 1632 | 1 | 1632 |
| 68 | 1672 | 1696 | 1 | 1696 |
| 69 | 1736 | 1760 | 1 | 1760 |
| 70 | 1800 | 1824 | 1 | 1824 |
| 71 | 1864 | 1888 | 1 | 1888 |
| 72 | 1926 | 1952 | 1 | 1952 |
| 73 | 1992 | 2016 | 1 | 2016 |
| 74 | 2024 | 2048 | 1 | 2048 |
| 75 | 2088 | 2112 | 1 | 2112 |
| 76 | 2152 | 2176 | 1 | 2176 |
| 77 | 2216 | 2240 | 1 | 2240 |
| 78 | 2280 | 2304 | 1 | 2304 |
| 79 | 2344 | 2368 | 1 | 2368 |
| 80 | 2408 | 2432 | 1 | 2432 |
| 81 | 2472 | 2496 | 1 | 2496 |
| 82 | 2536 | 2560 | 1 | 2560 |
| 83 | 2600 | 2624 | 1 | 2624 |
| 84 | 2664 | 2688 | 1 | 2688 |
| 85 | 2728 | 2752 | 1 | 2752 |
| 86 | 2792 | 2816 | 1 | 2816 |
| 87 | 2856 | 2880 | 1 | 2880 |
| 88 | 2984 | 3008 | 1 | 3008 |
| 89 | 3112 | 3136 | 1 | 3136 |
| 90 | 3240 | 3264 | 1 | 3264 |
| 91 | 3368 | 3392 | 1 | 3392 |
| 92 | 3496 | 3520 | 1 | 3520 |
| 93 | 3624 | 3648 | 1 | 3648 |
| 94 | 3752 | 3776 | 1 | 3776 |
| 95 | 3880 | 3904 | 1 | 3904 |
| 96 | 4008 | 4032 | 1 | 4032 |
| 97 | 4136 | 4160 | 1 | 4160 |
| 98 | 4264 | 4288 | 1 | 4288 |
| 99 | 4392 | 4416 | 1 | 4416 |
| 100 | 4584 | 4608 | 1 | 4608 |
| 101 | 4776 | 4800 | 1 | 4800 |
| 102 | 4968 | 4992 | 1 | 4992 |
| 103 | 5160 | 5184 | 1 | 5184 |
| 104 | 5352 | 5376 | 1 | 5376 |
| 105 | 5544 | 5568 | 1 | 5568 |
| 106 | 5736 | 5760 | 1 | 5760 |
| 107 | 5992 | 6016 | 1 | 6016 |

TABLE 3

Common TBSs used in Ranks 1 to 4, and code block size K', the number C of code blocks, and a block size B' including a TB-CRC and a CB-CRC when TB code block segmentation is executed

| I | TBS | K' | C | B' |
|---|---|---|---|---|
| 108 | 6200 | 3136 | 2 | 6272 |
| 109 | 6435 | 3254 | 2 | 6328 |
| 110 | 6712 | 3392 | 2 | 6734 |
| 111 | 6853 | 3520 | 2 | 7040 |
| 112 | 7224 | 3643 | 2 | 7296 |
| 113 | 7430 | 3776 | 2 | 7552 |
| 114 | 7735 | 3904 | 2 | 7808 |
| 115 | 7922 | 4032 | 2 | 8064 |
| 116 | 8243 | 4160 | 2 | 8320 |
| 117 | 8504 | 4288 | 2 | 8576 |
| 118 | 8750 | 4416 | 2 | 8832 |
| 119 | 9144 | 4508 | 2 | 9216 |
| 120 | 9528 | 4800 | 2 | 9600 |
| 121 | 9912 | 4992 | 2 | 9984 |
| 122 | 10296 | 5184 | 2 | 10368 |
| 123 | 10630 | 5376 | 2 | 10752 |
| 124 | 11064 | 5568 | 2 | 11136 |
| 125 | 11445 | 5760 | 2 | 11520 |
| 126 | 11882 | 5952 | 2 | 11904 |
| 127 | 12192 | 4096 | 3 | 12288 |
| 128 | 12576 | 4224 | 3 | 12672 |
| 129 | 12940 | 4332 | 3 | 13056 |
| 130 | 13536 | 4344 | 3 | 13682 |
| 131 | 14112 | 4735 | 3 | 14208 |
| 132 | 14638 | 4925 | 3 | 14784 |
| 133 | 15264 | 5120 | 3 | 15360 |
| 134 | 15840 | 5812 | 3 | 15936 |
| 135 | 16414 | 5504 | 3 | 16512 |
| 136 | 16992 | 5695 | 3 | 17033 |
| 137 | 17368 | 5888 | 3 | 17664 |

TABLE 3-continued

Common TBSs used in Ranks 1 to 4, and code block size K', the number C of code blocks, and a block size B' including a TB-CRC and a CB-CRC when TB code block segmentation is executed

| I | TBS | K' | C | B' |
|---|---|---|---|---|
| 138 | 18336 | 5144 | 3 | 18432 |
| 139 | 19030 | 4800 | 4 | 19200 |
| 140 | 19343 | 4992 | 4 | 19063 |
| 141 | 20525 | 3234 | 4 | 20735 |
| 142 | 22334 | 3375 | 4 | 21504 |
| 143 | 22152 | 3363 | 4 | 22272 |
| 144 | 22220 | 5760 | 4 | 23040 |
| 145 | 23633 | 5932 | 4 | 23808 |
| 146 | 24485 | 4923 | 5 | 24640 |
| 147 | 23436 | 3120 | 5 | 23600 |
| 148 | 25415 | 3312 | 5 | 26360 |
| 149 | 27375 | 5504 | 5 | 27320 |
| 150 | 28335 | 3505 | 5 | 28480 |
| 151 | 28225 | 5835 | 5 | 29440 |
| 152 | 30576 | 5144 | 5 | 30720 |
| 153 | 32704 | 5312 | 5 | 32872 |
| 154 | 10752 | 3304 | 6 | 33024 |
| 155 | 11136 | 3685 | 6 | 34276 |
| 156 | 11520 | 3535 | 6 | 35328 |
| 157 | 11804 | 6144 | 6 | 36364 |
| 158 | 12233 | 3440 | 7 | 38080 |
| 159 | 12572 | 3532 | 7 | 38424 |
| 160 | 13056 | 3824 | 7 | 40753 |
| 161 | 13632 | 6030 | 7 | 42802 |
| 162 | 14203 | 3304 | 8 | 44032 |
| 163 | 14734 | 3585 | 8 | 41553 |
| 164 | 15360 | 3335 | 8 | 47104 |
| 165 | 15936 | 5144 | 8 | 48252 |
| 166 | 52024 | 5585 | 8 | 51264 |
| 167 | 32732 | 3355 | 8 | 52992 |
| 168 | 50536 | 5144 | 9 | 55296 |
| 169 | 57335 | 3760 | 10 | 57600 |
| 170 | 58235 | 5952 | 10 | 52520 |
| 171 | 61954 | 3435 | 11 | 63832 |
| 172 | 53775 | 3324 | 11 | 64054 |
| 173 | 55392 | 6030 | 11 | 55330 |
| 174 | 63305 | 3760 | 12 | 69120 |
| 175 | 71112 | 3252 | 12 | 71424 |
| 176 | 73712 | 5685 | 13 | 74043 |
| 177 | 73376 | 5824 | 13 | 75712 |
| 178 | 75203 | 3333 | 13 | 75344 |
| 179 | 75704 | 5030 | 13 | 78045 |
| 180 | 31175 | 3324 | 14 | 52335 |
| 181 | 54750 | 6080 | 14 | 53120 |
| 182 | 37835 | 3385 | 15 | 53320 |
| 183 | 80315 | 6030 | 15 | 81200 |
| 184 | 83600 | 5888 | 16 | 24206 |
| 185 | 87395 | 6144 | 16 | 83304 |
| 186 | 103840 | 6015 | 17 | 102272 |
| 187 | 103323 | 5833 | 18 | 105834 |
| 188 | 110135 | 5144 | 18 | 110582 |
| 189 | 115040 | 6080 | 19 | 115520 |
| 190 | 118525 | 6016 | 20 | 110320 |
| 191 | 124456 | 3032 | 21 | 114882 |
| 192 | 122485 | 5144 | 22 | 129024 |
| 193 | 133203 | 6080 | 22 | 133760 |
| 194 | 137782 | 6015 | 23 | 138353 |
| 195 | 142248 | 5952 | 24 | 142343 |
| 196 | 145836 | 6144 | 24 | 147435 |
| 197 | 148775 | 6016 | 25 | 130400 |
| 198 | 151376 | 6080 | 25 | 132000 |
| 199 | 152875 | 5144 | 25 | 133500 |
| 200 | 157432 | 5050 | 25 | 133080 |
| 201 | 161760 | 6016 | 27 | 162432 |
| 202 | 163226 | 6144 | 27 | 165335 |
| 203 | 152544 | 8080 | 28 | 170240 |
| 204 | 172333 | 3852 | 29 | 172503 |
| 205 | 171600 | 5030 | 29 | 176320 |
| 206 | 177816 | 3852 | 30 | 173550 |
| 207 | 181616 | 6030 | 30 | 132400 |
| 208 | 135726 | 6016 | 31 | 136455 |
| 209 | 187712 | 6030 | 31 | 133430 |
| 210 | 191720 | 5016 | 32 | 192512 |
| 211 | 183515 | 6144 | 32 | 183303 |
| 212 | 199324 | 5030 | 33 | 200540 |
| 213 | 203704 | 5015 | 34 | 204544 |
| 214 | 205330 | 6030 | 34 | 106720 |
| 215 | 221236 | 6030 | 35 | 212300 |
| 216 | 224176 | 6244 | 35 | 115040 |
| 217 | 220285 | 6144 | 36 | 212234 |
| 218 | 222530 | 6016 | 37 | 222582 |
| 219 | 226416 | 6244 | 37 | 227323 |
| 220 | 230204 | 6060 | 38 | 232040 |
| 221 | 236160 | 2030 | 39 | 237220 |
| 222 | 243543 | 6016 | 41 | 245535 |
| 223 | 254323 | 6080 | 42 | 225360 |
| 224 | 266140 | 6030 | 44 | 157320 |
| 225 | 275375 | 6144 | 45 | 175430 |
| 226 | 234606 | 5030 | 47 | 235760 |
| 227 | 283736 | 6144 | 48 | 284812 |
| 228 | 288355 | 6144 | 49 | 301055 |

Table 4 lists a block size K' used for channel encoding for each code block.

TABLE 4

Block size K used for code block segmentation of common TBS

| Index | K' |
|---|---|
| 0 | 40 |
| 1 | 48 |
| 2 | 56 |
| 3 | 64 |
| 4 | 80 |
| 5 | 96 |
| 6 | 112 |
| 7 | 128 |
| 8 | 144 |
| 9 | 160 |
| 10 | 168 |
| 11 | 176 |
| 12 | 200 |
| 13 | 232 |
| 14 | 248 |
| 15 | 280 |
| 16 | 304 |
| 17 | 312 |
| 18 | 320 |
| 19 | 352 |
| 20 | 360 |
| 21 | 368 |
| 22 | 400 |
| 23 | 416 |
| 24 | 432 |
| 25 | 448 |
| 26 | 464 |
| 27 | 480 |
| 28 | 496 |
| 29 | 512 |
| 30 | 528 |
| 31 | 544 |
| 32 | 560 |
| 33 | 576 |
| 34 | 592 |
| 35 | 608 |
| 36 | 624 |
| 37 | 640 |
| 38 | 656 |
| 39 | 672 |
| 40 | 704 |
| 41 | 720 |

TABLE 4-continued

Block size K used for code block segmentation of common TBS

| Index | K' |
|---|---|
| 42 | 736 |
| 43 | 768 |
| 44 | 800 |
| 45 | 832 |
| 46 | 864 |
| 47 | 896 |
| 48 | 928 |
| 49 | 960 |
| 50 | 992 |
| 51 | 1024 |
| 52 | 1056 |
| 53 | 1088 |
| 54 | 1120 |
| 55 | 1152 |
| 56 | 1164 |
| 57 | 1216 |
| 58 | 1248 |
| 59 | 1280 |
| 60 | 1312 |
| 61 | 1344 |
| 62 | 1376 |
| 63 | 1408 |
| 64 | 1440 |
| 65 | 1504 |
| 66 | 1568 |
| 67 | 1632 |
| 68 | 1696 |
| 69 | 1760 |
| 70 | 1824 |
| 71 | 1888 |
| 72 | 1952 |
| 73 | 2016 |
| 74 | 2048 |
| 75 | 2112 |
| 76 | 2176 |
| 77 | 2240 |
| 78 | 2304 |
| 79 | 2368 |
| 80 | 2432 |
| 81 | 2496 |
| 82 | 2560 |
| 83 | 2624 |
| 84 | 2688 |
| 85 | 2752 |
| 86 | 2816 |
| 87 | 2880 |
| 88 | 3008 |
| 89 | 3136 |
| 90 | 3264 |
| 91 | 3392 |
| 92 | 3520 |
| 93 | 3648 |
| 94 | 3776 |
| 95 | 3904 |
| 96 | 4032 |
| 97 | 4096 |
| 98 | 4160 |
| 99 | 4224 |
| 100 | 4286 |
| 101 | 4352 |
| 102 | 4416 |
| 103 | 4544 |
| 104 | 4608 |
| 105 | 4736 |
| 106 | 4800 |
| 107 | 4926 |
| 108 | 4992 |
| 109 | 5120 |
| 110 | 5184 |
| 111 | 5312 |
| 112 | 5376 |
| 113 | 5440 |
| 114 | 5504 |
| 115 | 5566 |
| 116 | 5632 |
| 117 | 5696 |
| 118 | 5760 |
| 119 | 5824 |
| 120 | 5886 |
| 121 | 5952 |
| 122 | 6016 |
| 123 | 6080 |
| 124 | 6144 |

The number of code blocks (e.g., code block number C) in the code block segmentation method is defined as $C = \lceil B/(Z-L) \rceil$. Table 5 below shows a smallest K $K_{MIN}$, a smallest TBS $TBS_{MIN}$, and the maximum TBS $TBS_{MAX}$ of each code block number C when a TB is segmented into code blocks using one a block size using the code block segmentation described above and when the highest K is 6144. For example, $K_{MIN}$ is the smallest K among Ks of a corresponding code block number C. $TBS_{MIN}$ is the smallest TBS among transport block sizes available for a corresponding code block number C. $TBS_{MAX}$ is the maximum TBS among transport block sizes available for a corresponding code block number C. As shown in Table 5, a range of transport block sizes available for each code block number C is configured to overlap with other. Therefore, when a TBS (corresponding C=i) is in between $TBS_{MIN,i}$ and $TBS_{MAX,i}$, a TB is segmented to i code blocks through code block segmentation using a block size K between $K_{MIN,i}$ and 6144 bits.

TABLE 5

Code block size available for each value corresponding to the number of code blocks

| C | $K_{MIN}$ | $TBS_{MIN}$ | $TBS_{MAX}$ | $B'_{MIN}$ | $B'_{MAX}$ |
|---|---|---|---|---|---|
| 2 | 3136 | 6200 | 12216 | 6272 | 12288 |
| 3 | 4160 | 12384 | 18336 | 12480 | 18432 |
| 4 | 4672 | 18568 | 24456 | 18688 | 24576 |
| 5 | 4928 | 24496 | 30576 | 24640 | 30720 |
| 6 | 5184 | 30936 | 36696 | 31104 | 36864 |
| 7 | 5312 | 36992 | 42816 | 37184 | 43008 |
| 8 | 5440 | 43304 | 48936 | 43520 | 49152 |
| 9 | 5504 | 49296 | 55056 | 49536 | 55296 |
| 10 | 5568 | 55416 | 61176 | 55680 | 61440 |
| 11 | 5632 | 61664 | 67296 | 61952 | 67584 |
| 12 | 5696 | 68040 | 73416 | 68352 | 73728 |
| 13 | 5696 | 73712 | 79536 | 74048 | 79872 |
| 14 | 5760 | 80280 | 85656 | 80640 | 86016 |
| 15 | 5760 | 86016 | 91776 | 86400 | 92160 |
| 16 | 5824 | 92776 | 97896 | 93184 | 98304 |
| 17 | 5824 | 98576 | 104016 | 99008 | 104448 |
| 18 | 5824 | 104376 | 110136 | 104832 | 110592 |
| 19 | 5824 | 110176 | 116256 | 110656 | 116736 |
| 20 | 5888 | 117256 | 122376 | 117760 | 122880 |
| 21 | 5888 | 123120 | 128496 | 123648 | 129024 |
| 22 | 5888 | 128984 | 134616 | 129536 | 135168 |
| 23 | 5888 | 134848 | 140736 | 135424 | 141312 |
| 24 | 5952 | 142248 | 146856 | 142848 | 147456 |
| 25 | 5952 | 148176 | 152976 | 148800 | 153600 |
| 26 | 5952 | 154104 | 159096 | 154752 | 159744 |
| 27 | 5952 | 160032 | 165216 | 160704 | 165888 |
| 28 | 5952 | 165960 | 171336 | 166656 | 172032 |
| 29 | 5952 | 171888 | 177456 | 172608 | 178176 |
| 30 | 5952 | 177816 | 183576 | 178560 | 184320 |
| 31 | 5952 | 183744 | 189696 | 184512 | 190464 |
| 32 | 6016 | 191720 | 195816 | 192512 | 196608 |
| 33 | 6016 | 197712 | 201936 | 198528 | 202752 |
| 34 | 6016 | 203704 | 208056 | 204544 | 208896 |

TABLE 5-continued

Code block size available for each value
corresponding to the number of code blocks

| C | $K_{MIN}$ | $TBS_{MIN}$ | $TBS_{MAX}$ | $B'_{MIN}$ | $B'_{MAX}$ |
|---|---|---|---|---|---|
| 35 | 6016 | 209696 | 214176 | 210560 | 215040 |
| 36 | 6016 | 215688 | 220296 | 216576 | 221184 |
| 37 | 6016 | 221680 | 226416 | 222592 | 227328 |
| 39 | 6016 | 233664 | 238656 | 234624 | 239616 |
| 40 | 6016 | 239656 | 244776 | 240640 | 245760 |
| 41 | 6016 | 245648 | 250896 | 246656 | 251904 |
| 42 | 6016 | 251640 | 257016 | 252672 | 258048 |
| 43 | 6016 | 257632 | 263136 | 258688 | 264192 |
| 44 | 6016 | 263624 | 269256 | 264704 | 270336 |
| 45 | 6016 | 269616 | 275376 | 270720 | 276480 |
| 46 | 6016 | 275608 | 281496 | 276736 | 282624 |
| 47 | 6016 | 281600 | 287616 | 282752 | 288768 |
| 48 | 6080 | 290664 | 293736 | 291840 | 294912 |
| 49 | 6080 | 296720 | 299856 | 297920 | 301056 |
| 50 | 6080 | 302776 | 305976 | 304000 | 307200 |
| 51 | 6080 | 308832 | 312096 | 310080 | 313344 |
| 52 | 6080 | 314888 | 318216 | 316160 | 319488 |
| 53 | 6080 | 320944 | 324336 | 322240 | 325632 |
| 54 | 6080 | 327000 | 330456 | 328320 | 331776 |
| 55 | 6080 | 333056 | 336576 | 334400 | 337920 |
| 56 | 6080 | 339112 | 342696 | 340480 | 344064 |
| 57 | 6080 | 345168 | 348816 | 346560 | 350208 |
| 58 | 6080 | 351224 | 354936 | 352640 | 356352 |
| 59 | 6080 | 357280 | 361056 | 358720 | 362496 |
| 60 | 6080 | 363336 | 367176 | 364800 | 368640 |
| 61 | 6080 | 369392 | 373296 | 370880 | 374784 |
| 62 | 6080 | 375448 | 379416 | 376960 | 380928 |
| 63 | 6080 | 381504 | 385536 | 383040 | 387082 |
| 64 | 6080 | 387560 | 391656 | 389120 | 393216 |

Figure 7:
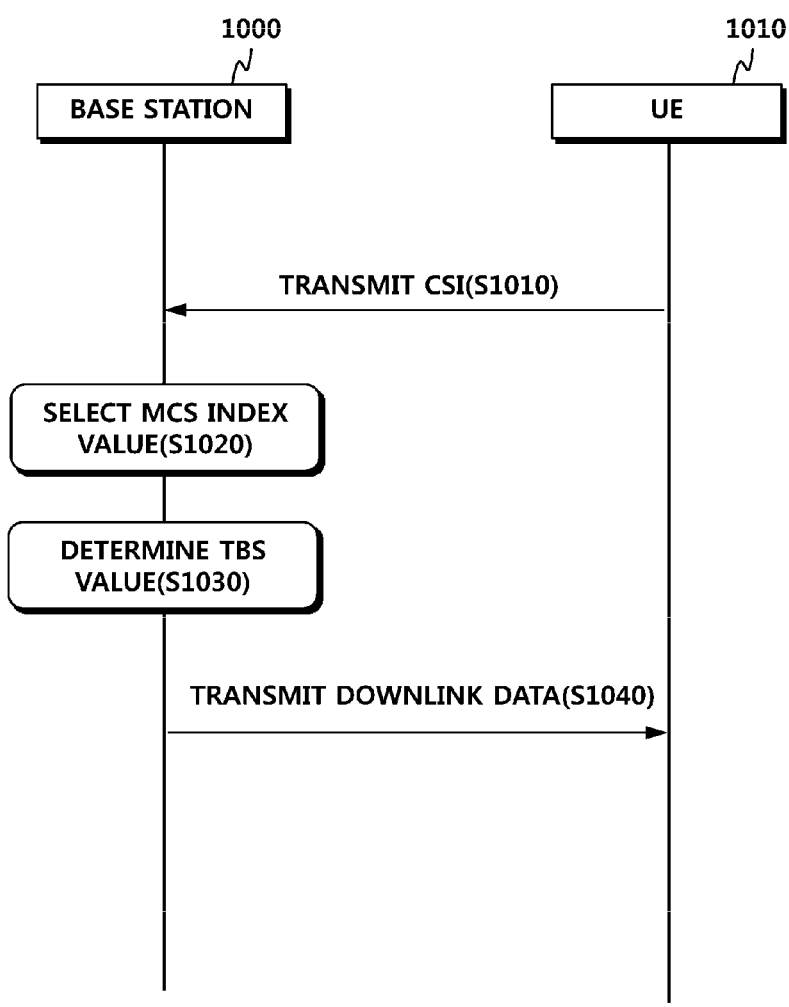
FIG. 7 is a signal flow diagram illustrating operations of a base station and a User Equipment according to an embodiment of the present disclosure.

FIG. 7 is a signal flow diagram illustrating operations of a base station and a UE according to an embodiment of the present disclosure.

A method for transmitting data by a base station according to an embodiment of the present disclosure includes receiving Channel State Information (CSI) from a UE, determining a transport block size (TBS) based on a TBS table including indices corresponding to a 256QAM modulation scheme and a number of allocable PRB pairs, and transmitting data using the TBS.

A method for receiving data by a UE according to another embodiment of the present disclosure includes transmitting CSI to a base station, and receiving data using a TBS determined based on the CSI, wherein the TBS is determined based on a TBS table including indices corresponding to a 256 QAM modulation scheme and the number of allocable PRB pairs.

Referring to FIG. 7, a UE 1010 measures a channel quality of a downlink channel. For example, based on a reference signal transmitted from a base station 1000, the UE measures the quality of the downlink channel and selects a Channel Quality Indicator (CQI) corresponding to the corresponding quality. The UE 1010 includes the selected CQI in CSI, and transmits the same to the base station 1000, in operation S1010.

The base station 1000 receives the CSI from the UE 1010, and determines a CQI index included in the CSI. Subsequently, based on the determined CQI index, the method may select a single Modulation and Coding Scheme (MCS) index from a predetermined MCS index table including MCS indices corresponding to the 256 QAM modulation scheme.

The base station 1000 determines a TBS based on the TBS table including indices corresponding to the 256 QAM modulation scheme and the number of allocable PRB pairs, in operation S1030. For example, the base station 1000 selects a TBS index corresponding to the above described MCS index, from the TBS table. Subsequently, the base station 1000 determines the TBS based on the number of PRB pairs and the selected TBS index.

The base station 1000 transmits data using the TBS determined based on the above described method, in operation 51040. The UE 1010 receives the above described data from the base station 1000.

Hereinafter, the present disclosure will describe each embodiment in association with a TBS index set to support 256 QAM in addition to typically used three modulation schemes, such as, QPSK, 16QAM, ad 64QAM, and a method of setting a TBS of each TBS index.

[Rank1 (or 1-Layer Spatial Multiplexing) TBS Setting Method]

With respect to each transmission efficiency of MCS indices newly defined for supporting 256QAM, 110 transport block sizes (TBSs) need to be newly defined for each transmission efficiency based on consideration 1 to 110 PRB pairs. A TBS is defined as follow in accordance with at least one embodiment.

MCS indices are added corresponding to 256 QAM having a modulation order of 8. Accordingly, it is necessary to define TBS indices corresponding to the new MCS indices. Hereinafter, various embodiments of a method for setting TBS indices added or modified for supporting 256QAM and setting TBS values for the added or modified TBS indices will be described.

For example, a TBS table may be configured to have TBS indices 27 to 33 for supporting the 256 QAM modulation scheme in accordance with at least one embodiment. That is, the TBS table may include at least 7 TBS indices set as TBS indices for 256 QAM.

As another example, a TBS value corresponding to the 256 QAM modulation scheme in the TBS table may be set based on the number of resource elements of a single PRB pair, the number of allocable PRB pairs, and a transmission efficiency value for each index in accordance with at least one embodiment. Particularly, each TBS value may be set through the following described method.

TBS Value Setting Method

When an MCS index $I_{MCS}$ is a value that supports the maximum transmission efficiency, a TBS value is calculated by the following method 1.

Method 1

1) A block size $B'_{temp}$ is calculated based on transmission efficiency, the number of PRB pairs (e.g., $N_{PRB}$), and the number of resource elements of each PRB pair with applying 0.93 as a code rate. In an equation below for calculating the block size $B'_{temp}$, $N_{toneperPRB}$ denotes the number of resource elements for each PRB pair, M denotes a modulation order, a code rate is 0.93, and a transmission efficiency is obtained based on the modulation order and the code rate (e.g., transmission efficiency=M*0.93).

$$B'_{temp} = N_{toneperPRB} * N_{PRB} * M * \text{code rate}$$

2) The largest B' value is selected among B' values that are less than $B'_{temp}$ and included in Table 2 or Table 3.

3) A TBS corresponding to B' in Table 2 or Table 3 is defined as a TBS for the defined $N_{PRB}$ and an MCS index 27. That is, a TBS value of a TBS index 33 corresponding to the MCS index 27 that supports the maximum transmission efficiency may be set to the value calculated through the above described method.

When the MCS index $I_{MCS}$ is not a value that supports the maximum transmission efficiency, a TBS value is calculated by the following method 2.

Method 2

1) A block size $B'_{temp}$ is calculated based on transmission efficiency, the number of PRB pairs, and the number of resource elements of each PRB pair with applying R/1024 as a code rate. In an equation below for calculating the block size $B'_{temp}$, $N_{tonerPRB}$ denotes the number of resource elements for each PRB pair, M denotes a modulation order, R/1024 denotes a code rate, and transmission efficiency obtained by multiplying the modulation order and the code rate (e.g., M*R/1024).

$$B'_{temp} = N_{tonerPRB} * N_{PRB} * M * R / 1024$$

2) The largest B' value is selected from B' values that are less than $B'_{temp}$ and included in Table 2 or Table 3. Search for the smallest B' value that is greater than $B'_{temp}$ from Table 2 or Table 3, which is referred to as $B'_+$.

3) $SE_-$ and $SE_+$ are calculated using equations of: $SE_- = B'_- / (N_{tonerPRB} * N_{PRB})$; and $SE_+ = B'_+ / (N_{tonerPRB} * N_{PRB})$.

4) $SE_{Target}$ is set as M*R/1024 and $(SE_{Target} - SE_-)$ is compared with $(SE_{Target} - SE_+)$ IF $SE_{Target} - SE_- \geq |SE_{Target} - SE_+|$,
$B' = B'_+$
ELSE,
$B' = B'_-$ 5) a TBS corresponding to B' in Table 2 or Table 3 is defined as a TBS for the defined $N_{PRB}$ and corresponding transmission efficiency In addition, the largest TBS value $TBS_{max}$ may be set for all defined TBSs. For example, with respect to the MCS index $I_{MCS}$ that supports the maximum transmission efficiency, a TBS when $N_{PRB}$ is 100 is defined as $TBS_{max}$. With respect to all TBSs defined through the above described method, all values greater than $TBS_{max}$ are defined alternatively as $TBS_{max}$.

In addition, $N_{tonerPRB} = 136$ may be used when the MCS index $I_{MCS}$ is a value that supports the maximum transmission efficiency, and $N_{tonerPRB} = 120$ is used otherwise in accordance with at least one embodiment.

As described above, a TBS value may be calculated through the above described method in accordance with at least one embodiment. Hereinafter, a TBS value may be set variously based on a code rate value or a transmission efficiency value of each MCS index corresponding to 256 QAM and thus, a TBS value corresponding to 256 QAM for each MCS index will be described through embodiments.

In accordance with at least one embodiment of the present disclosure, a TBS table may be configured to include a MCS index 0 to a MCS index 18 identical to a typical TBS table because TBS indices $I_{TBS}$ 0 to 16 are configured to support VoIP services in the typical TBS table. Here, the MCS index 18 is corresponding to a TBS index $I_{TBS}$ 16. In addition, TBS indices for supporting 256QAM may be added from TBS index $I_{TBS}$ 27 in the TBS table in accordance with at least one embodiment because TBS indices $I_{TBS}$ 0 to 26 are already defined in the typical TBS table.

First Embodiment

In accordance with the first embodiment, a TBS is defined for supporting transmission efficiency corresponding to MCSs of Table 6. TBS indices 27 to 36 are newly defined for supporting 256QAM in accordance with the first embodiment. Table 7 shows such TBS indices 27 to 36 newly defined for supporting 256QAM.

TABLE 6

| $I_{MCS}$ | modulation | R | $I_{TBS}$ |
|---|---|---|---|
| 18 | 64 QAM | 466 | 16 |
| 19 | 64 QAM | 546 | 27 |
| 20 | 64 QAM | 627 | 28 |
| 21 | 64 QAM | 707 | 29 |
| 22 | 64 QAM | 787 | 30 |
| 23 | 64 QAM | 868 | 31 |
| 24 | 64 QAM | 934 | 32 |
| 25 | 256 QAM | 759 | 33 |
| 26 | 256 QAM | 830 | 34 |
| 27 | 256 QAM | 895 | 35 |
| 28 | 256 QAM | 948 | 36 |

TABLE 7

| $N_{PRB}$ | $I_{TBS}$ | | | | | | | | | |
|---|---|---|---|---|---|---|---|---|---|---|
| | 27 | 28 | 29 | 30 | 31 | 32 | 33 | 34 | 35 | 36 |
| 1 | 344 | 424 | 472 | 536 | 584 | 632 | 680 | 744 | 808 | 968 |
| 2 | 744 | 872 | 968 | 1096 | 1192 | 1288 | 1384 | 1544 | 1672 | 1992 |
| 3 | 1128 | 1288 | 1480 | 1608 | 1800 | 1928 | 2088 | 2280 | 2472 | 2984 |
| 4 | 1480 | 1736 | 1992 | 2216 | 2408 | 2600 | 2792 | 3112 | 3368 | 4008 |
| 5 | 1864 | 2152 | 2472 | 2728 | 2984 | 3240 | 3496 | 3880 | 4136 | 4968 |
| 6 | 2280 | 2600 | 2984 | 3240 | 3624 | 3880 | 4264 | 4584 | 4968 | 5992 |
| 7 | 2664 | 3112 | 3496 | 3880 | 4264 | 4584 | 4968 | 5352 | 5736 | 6968 |
| 8 | 2984 | 3496 | 4008 | 4392 | 4776 | 5160 | 5736 | 6200 | 6712 | 7992 |
| 9 | 3368 | 3880 | 4392 | 4968 | 5544 | 5992 | 6456 | 6968 | 7480 | 8760 |
| 10 | 3752 | 4392 | 4968 | 5544 | 5992 | 6456 | 6968 | 7736 | 8248 | 9912 |
| 11 | 4136 | 4776 | 5352 | 5992 | 6712 | 7224 | 7736 | 8504 | 9144 | 10680 |
| 12 | 4584 | 5352 | 5992 | 6456 | 7224 | 7736 | 8504 | 9144 | 9912 | 11832 |
| 13 | 4968 | 5736 | 6456 | 7224 | 7736 | 8504 | 9144 | 9912 | 10680 | 12960 |
| 14 | 5352 | 6200 | 6968 | 7736 | 8504 | 9411 | 9912 | 10680 | 11832 | 13536 |
| 15 | 5736 | 6456 | 7480 | 8248 | 9144 | 9912 | 10680 | 11448 | 12576 | 14688 |
| 16 | 5992 | 6968 | 7992 | 8760 | 9528 | 10296 | 11448 | 12216 | 13536 | 15840 |
| 17 | 6456 | 7480 | 8504 | 9144 | 10296 | 11064 | 12216 | 12960 | 14112 | 16992 |
| 18 | 6712 | 7736 | 8760 | 9912 | 11064 | 11832 | 12576 | 14112 | 15264 | 17968 |
| 19 | 7224 | 8248 | 9528 | 10296 | 11448 | 12216 | 13536 | 14688 | 15840 | 19080 |
| 20 | 7480 | 8760 | 9912 | 11064 | 12216 | 12960 | 14112 | 15264 | 16416 | 19848 |
| 21 | 7992 | 9144 | 10296 | 11448 | 12576 | 13536 | 14688 | 16416 | 17568 | 20616 |
| 22 | 8248 | 9528 | 10680 | 12216 | 13536 | 14112 | 15840 | 16992 | 18336 | 21384 |
| 23 | 8760 | 9912 | 11448 | 12576 | 14112 | 15264 | 16416 | 17568 | 19080 | 22920 |
| 24 | 9144 | 10680 | 11832 | 12960 | 14688 | 15840 | 16992 | 18336 | 19848 | 23688 |

TABLE 7-continued

| | $I_{TBS}$ | | | | | | | | | |
|---|---|---|---|---|---|---|---|---|---|---|
| $N_{PRB}$ | 27 | 28 | 29 | 30 | 31 | 32 | 33 | 34 | 35 | 36 |
| 25 | 9528 | 11064 | 12216 | 13536 | 15264 | 16416 | 17568 | 19080 | 20616 | 24496 |
| 26 | 9912 | 11448 | 12960 | 14112 | 15840 | 16992 | 18336 | 19848 | 21384 | 25456 |
| 27 | 10296 | 11832 | 13536 | 14688 | 16416 | 17568 | 19080 | 20616 | 22152 | 26416 |
| 28 | 10680 | 12216 | 13536 | 15264 | 16992 | 18336 | 19848 | 21384 | 23688 | 27376 |
| 29 | 11064 | 12576 | 14112 | 15840 | 17568 | 19080 | 20616 | 22152 | 24496 | 28336 |
| 30 | 11448 | 12960 | 14688 | 16416 | 18336 | 19848 | 21384 | 22920 | 25456 | 29296 |
| 31 | 11832 | 13536 | 15264 | 16992 | 19080 | 20616 | 22152 | 23688 | 25456 | 30576 |
| 32 | 12216 | 14112 | 15840 | 17568 | 19080 | 20616 | 22920 | 24496 | 26416 | 31704 |
| 33 | 12576 | 14688 | 16416 | 18336 | 19848 | 21384 | 23688 | 25456 | 27376 | 32856 |
| 34 | 12960 | 14688 | 16992 | 18336 | 20616 | 22152 | 23688 | 26416 | 28336 | 34008 |
| 35 | 13536 | 15264 | 17568 | 19080 | 21384 | 22920 | 24496 | 27376 | 29296 | 35160 |
| 36 | 13536 | 15840 | 17568 | 19848 | 22152 | 23688 | 25456 | 28336 | 30576 | 35160 |
| 37 | 14112 | 16416 | 18336 | 20616 | 22152 | 24496 | 26416 | 28336 | 30576 | 36696 |
| 38 | 14688 | 16416 | 19080 | 20616 | 22920 | 24496 | 26416 | 29296 | 31704 | 37888 |
| 39 | 14688 | 16992 | 19080 | 21384 | 23688 | 25456 | 27376 | 30576 | 32856 | 39232 |
| 40 | 15264 | 17568 | 19848 | 22152 | 24496 | 26416 | 28336 | 30576 | 32856 | 39232 |
| 41 | 15840 | 18336 | 20616 | 22920 | 24496 | 26416 | 29296 | 31704 | 34008 | 40576 |
| 42 | 15840 | 18336 | 20616 | 22920 | 25456 | 27376 | 29296 | 32856 | 35160 | 40576 |
| 43 | 16416 | 19080 | 21384 | 23688 | 26416 | 28336 | 30576 | 32856 | 35160 | 42368 |
| 44 | 16992 | 19080 | 21384 | 24496 | 26416 | 28336 | 31704 | 34008 | 36696 | 43816 |
| 45 | 16992 | 19848 | 22152 | 24496 | 27376 | 29296 | 31704 | 35160 | 37888 | 43816 |
| 46 | 17568 | 19848 | 22920 | 25456 | 28336 | 30576 | 32856 | 35160 | 37888 | 45352 |
| 47 | 17568 | 20616 | 22920 | 25456 | 28336 | 30576 | 32856 | 36696 | 39232 | 46888 |
| 48 | 18336 | 21384 | 23688 | 26416 | 29296 | 31704 | 34008 | 36696 | 40576 | 46888 |
| 49 | 18336 | 21384 | 24496 | 27376 | 29296 | 31704 | 35160 | 37888 | 40576 | 48936 |
| 50 | 19080 | 22152 | 24496 | 27376 | 30576 | 32856 | 35160 | 39232 | 42368 | 48936 |
| 51 | 19080 | 22152 | 25456 | 28336 | 30576 | 32856 | 36696 | 39232 | 42368 | 51024 |
| 52 | 19848 | 22920 | 25456 | 28336 | 31704 | 34006 | 36696 | 40576 | 43816 | 51024 |
| 53 | 19848 | 22920 | 26416 | 29296 | 31704 | 35160 | 37888 | 40576 | 43816 | 52752 |
| 54 | 20616 | 23688 | 26416 | 29296 | 32856 | 35160 | 37888 | 42368 | 45352 | 52752 |
| 55 | 20616 | 24496 | 27376 | 30576 | 32856 | 35160 | 39232 | 42368 | 45352 | 55056 |
| 56 | 21384 | 24496 | 27376 | 30576 | 34008 | 36696 | 39232 | 43816 | 46888 | 55056 |
| 57 | 21384 | 25456 | 28336 | 31704 | 35160 | 36696 | 40576 | 43816 | 46888 | 57336 |
| 58 | 22152 | 25456 | 28336 | 31704 | 35160 | 37888 | 40576 | 45352 | 48936 | 57336 |
| 59 | 22152 | 25456 | 29296 | 32856 | 35160 | 37888 | 42368 | 45352 | 48936 | 59256 |
| 60 | 22920 | 26416 | 29296 | 32856 | 36696 | 39232 | 42368 | 46888 | 51024 | 59256 |
| 61 | 22920 | 26416 | 30576 | 34008 | 36696 | 39232 | 43816 | 46888 | 51024 | 59256 |
| 62 | 23688 | 27376 | 30576 | 34008 | 37888 | 40576 | 43816 | 48936 | 51024 | 61664 |
| 63 | 23688 | 27376 | 31704 | 35160 | 37888 | 40576 | 45352 | 48936 | 52752 | 61664 |
| 64 | 24496 | 28336 | 31704 | 35160 | 39232 | 42368 | 45352 | 48936 | 52752 | 63776 |
| 65 | 24496 | 28336 | 31704 | 35160 | 39232 | 42368 | 45352 | 51024 | 55056 | 63776 |
| 66 | 25456 | 29296 | 32856 | 36696 | 40576 | 43816 | 46888 | 51024 | 55056 | 63776 |
| 67 | 25456 | 29296 | 32856 | 36696 | 40576 | 43816 | 46888 | 52752 | 55056 | 66592 |
| 68 | 26456 | 29296 | 34008 | 37888 | 40576 | 43816 | 48936 | 52752 | 57336 | 66592 |
| 69 | 26416 | 30576 | 34008 | 37886 | 42368 | 45352 | 48936 | 52752 | 57336 | 68808 |
| 70 | 26416 | 30576 | 35160 | 37888 | 42368 | 45352 | 48936 | 55056 | 59256 | 68808 |
| 71 | 27376 | 31704 | 35160 | 39232 | 43816 | 46888 | 51024 | 55056 | 59256 | 71112 |
| 72 | 27376 | 31704 | 35160 | 39232 | 43816 | 46888 | 51024 | 55056 | 59256 | 71112 |
| 73 | 28336 | 31704 | 36696 | 40576 | 43816 | 46888 | 51024 | 57336 | 61664 | 71112 |
| 74 | 28336 | 32856 | 36696 | 40576 | 45352 | 48936 | 52752 | 57336 | 64664 | 73712 |
| 75 | 28336 | 32856 | 36696 | 40576 | 45352 | 48936 | 52752 | 57336 | 64664 | 75376 |
| 76 | 29296 | 32856 | 37888 | 42368 | 46888 | 48936 | 52752 | 59256 | 63776 | 76208 |
| 77 | 29296 | 34008 | 37888 | 42368 | 46888 | 51024 | 55056 | 59256 | 63776 | 76208 |
| 78 | 29296 | 34008 | 39232 | 42368 | 46888 | 51024 | 55056 | 59256 | 63776 | 76208 |
| 79 | 30576 | 35160 | 39232 | 43816 | 48936 | 51024 | 55056 | 61664 | 66592 | 78704 |
| 80 | 30576 | 35160 | 39232 | 43816 | 48936 | 52752 | 57336 | 61664 | 66592 | 78704 |
| 81 | 30576 | 35160 | 40576 | 45352 | 48936 | 52752 | 57336 | 63776 | 66592 | 84476 |
| 82 | 31704 | 36696 | 40576 | 45352 | 48936 | 52752 | 57336 | 63776 | 68808 | 81176 |
| 83 | 31704 | 36696 | 40576 | 45352 | 51024 | 55056 | 59256 | 63776 | 68808 | 81176 |
| 84 | 31704 | 36696 | 42368 | 46888 | 51024 | 55056 | 59256 | 63776 | 71112 | 81176 |
| 85 | 32856 | 37886 | 42368 | 46888 | 51024 | 55056 | 59256 | 66592 | 71112 | 84760 |
| 86 | 32856 | 37886 | 42368 | 46888 | 52752 | 55056 | 61664 | 66592 | 71112 | 84760 |
| 87 | 32856 | 37886 | 42368 | 48936 | 52752 | 57336 | 61664 | 66592 | 73712 | 84760 |
| 88 | 34008 | 39232 | 43816 | 48936 | 52752 | 57336 | 61664 | 68808 | 73712 | 87936 |
| 89 | 34008 | 39232 | 43816 | 48936 | 55056 | 57336 | 63776 | 68808 | 73712 | 87936 |
| 90 | 34008 | 39232 | 43816 | 48936 | 55056 | 59256 | 63776 | 68808 | 75376 | 87936 |
| 91 | 35160 | 40576 | 45352 | 51024 | 55056 | 59256 | 63776 | 71112 | 76208 | 90816 |
| 92 | 35160 | 40576 | 45352 | 51024 | 55056 | 59256 | 63776 | 71112 | 76208 | 90816 |
| 93 | 35160 | 40576 | 45352 | 51024 | 55056 | 61664 | 66592 | 71112 | 78704 | 90816 |
| 94 | 35160 | 40576 | 46888 | 51024 | 57336 | 61664 | 66592 | 73712 | 78704 | 93800 |
| 95 | 36696 | 42368 | 46888 | 52752 | 57336 | 61664 | 66592 | 73712 | 78704 | 93800 |
| 96 | 36696 | 42368 | 46888 | 52752 | 59256 | 63776 | 68808 | 73712 | 88176 | 93800 |
| 97 | 36696 | 42368 | 48936 | 52752 | 59256 | 63776 | 68808 | 75376 | 88176 | 93800 |
| 98 | 37888 | 42368 | 48936 | 55056 | 59256 | 63776 | 68808 | 76208 | 88176 | 97896 |
| 99 | 37888 | 43816 | 48936 | 55056 | 59256 | 63776 | 71112 | 76208 | 88176 | 97896 |
| 100 | 37888 | 43816 | 48936 | 55056 | 61664 | 66592 | 71112 | 78704 | 84760 | 97896 |

TABLE 7-continued

| $N_{PRB}$ | 27 | 28 | 29 | 30 | 31 | 32 | 33 | 34 | 35 | 36 |
|---|---|---|---|---|---|---|---|---|---|---|
| 101 | 39232 | 43816 | 51024 | 55056 | 61664 | 66592 | 71112 | 78704 | 84760 | 97896 |
| 102 | 39232 | 45352 | 51024 | 55056 | 61664 | 66592 | 71112 | 78704 | 84760 | 97896 |
| 103 | 39232 | 45352 | 51024 | 57336 | 61664 | 66592 | 73712 | 78704 | 84760 | 97896 |
| 104 | 39232 | 45352 | 51024 | 57336 | 63776 | 68808 | 73712 | 81176 | 87936 | 97896 |
| 105 | 40576 | 45352 | 52752 | 57336 | 63776 | 68808 | 73712 | 81176 | 87936 | 97896 |
| 106 | 40576 | 46888 | 52752 | 59256 | 63776 | 68808 | 75376 | 81176 | 87936 | 97896 |
| 107 | 40576 | 46888 | 52752 | 59256 | 63776 | 68808 | 76208 | 81176 | 90816 | 97896 |
| 108 | 40576 | 46888 | 52752 | 59256 | 66592 | 71112 | 76208 | 84760 | 90816 | 97896 |
| 109 | 42368 | 46888 | 55056 | 59256 | 66592 | 71112 | 76208 | 84760 | 90816 | 97896 |
| 110 | 42368 | 48936 | 55056 | 61664 | 66592 | 71112 | 78704 | 84760 | 90816 | 97896 |

Second Embodiment

In accordance with the second embodiment, a TBS is defined for supporting transmission efficiency corresponding to MCSs in Table 8. TBS indices 27 to 36 are newly defined for supporting 256QAM in accordance with the first embodiment. Table 9 shows such TBS indices 27 to 36 newly defined for supporting 256QAM

TABLE 8

| $I_{MCS}$ | modulation | R | $I_{TBS}$ |
|---|---|---|---|
| 18 | 64 QAM | 466 | 16 |
| 19 | 64 QAM | 547 | 27 |

TABLE 8-continued

| $I_{MCS}$ | modulation | R | $I_{TBS}$ |
|---|---|---|---|
| 20 | 64 QAM | 628 | 28 |
| 21 | 64 QAM | 709 | 29 |
| 22 | 64 QAM | 790 | 30 |
| 23 | 64 QAM | 871 | 31 |
| 24 | 64 QAM | 937 | 32 |
| 25 | 256 QAM | 763 | 33 |
| 26 | 256 QAM | 834 | 34 |
| 27 | 256 QAM | 900 | 35 |
| 28 | 256 QAM | 952 | 36 |

TABLE 9

| $N_{PRB}$ | 27 | 28 | 29 | 30 | 31 | 32 | 33 | 34 | 35 | 36 |
|---|---|---|---|---|---|---|---|---|---|---|
| 1 | 376 | 424 | 472 | 536 | 584 | 632 | 696 | 744 | 808 | 968 |
| 2 | 744 | 872 | 968 | 1096 | 1192 | 1288 | 1416 | 1544 | 1672 | 1992 |
| 3 | 1128 | 1288 | 1480 | 1672 | 1800 | 1928 | 2152 | 2344 | 2536 | 2984 |
| 4 | 1544 | 1736 | 1992 | 2216 | 2408 | 2600 | 2856 | 3112 | 3368 | 4008 |
| 5 | 1928 | 2152 | 2472 | 2728 | 2984 | 3240 | 3496 | 3880 | 4136 | 4968 |
| 6 | 2280 | 2600 | 2984 | 3368 | 3624 | 3880 | 4264 | 4584 | 4968 | 5992 |
| 7 | 2664 | 3112 | 3496 | 3880 | 4264 | 4584 | 4968 | 5544 | 5992 | 6968 |
| 8 | 3112 | 3496 | 4008 | 4392 | 4968 | 5160 | 5736 | 6200 | 6712 | 7992 |
| 9 | 3496 | 4008 | 4392 | 4968 | 5544 | 5992 | 6456 | 6968 | 7480 | 8760 |
| 10 | 3880 | 4392 | 4968 | 5544 | 5992 | 6456 | 6968 | 7736 | 8248 | 9912 |
| 11 | 4264 | 4776 | 5544 | 5992 | 6712 | 7224 | 7736 | 8504 | 9144 | 10680 |
| 12 | 4584 | 5332 | 5992 | 6712 | 7224 | 7736 | 8504 | 9144 | 9912 | 11832 |
| 13 | 4968 | 5736 | 6456 | 7224 | 7992 | 8504 | 9144 | 9912 | 11064 | 12960 |
| 14 | 5352 | 6200 | 6968 | 7736 | 8504 | 9144 | 9912 | 11064 | 11832 | 13536 |
| 15 | 5736 | 6456 | 7480 | 8248 | 9144 | 9912 | 10680 | 11832 | 12576 | 14688 |
| 16 | 6200 | 6968 | 7992 | 8760 | 9912 | 10296 | 11448 | 12576 | 13536 | 15840 |
| 17 | 6456 | 7480 | 8504 | 9528 | 10296 | 11064 | 12216 | 12960 | 14112 | 16992 |
| 18 | 6968 | 7992 | 8760 | 9912 | 11064 | 11832 | 12960 | 14112 | 15264 | 17568 |
| 19 | 7224 | 8248 | 9528 | 10296 | 11448 | 12576 | 13536 | 14688 | 15840 | 19080 |
| 20 | 7736 | 8760 | 9912 | 11064 | 12216 | 12960 | 14112 | 15264 | 16992 | 19848 |
| 21 | 7992 | 9144 | 10296 | 11448 | 12576 | 13536 | 14688 | 16416 | 17568 | 20616 |
| 22 | 8504 | 9528 | 11064 | 12216 | 13536 | 14112 | 15840 | 16992 | 18336 | 21384 |
| 23 | 8760 | 9912 | 11448 | 12576 | 14112 | 15264 | 16416 | 17568 | 19080 | 22920 |
| 24 | 9144 | 10680 | 11832 | 12960 | 14688 | 15840 | 16992 | 18336 | 19848 | 23688 |
| 25 | 9528 | 11064 | 12216 | 13536 | 15264 | 16416 | 17568 | 19080 | 20616 | 24496 |
| 26 | 9912 | 11448 | 12960 | 14112 | 15840 | 16992 | 18336 | 19848 | 22152 | 25456 |
| 27 | 10296 | 11832 | 13536 | 14688 | 16416 | 17568 | 19080 | 20616 | 22920 | 26416 |
| 28 | 10680 | 12216 | 14112 | 15264 | 16992 | 18336 | 19848 | 22152 | 23688 | 27376 |
| 29 | 11064 | 12576 | 14112 | 15840 | 17568 | 19080 | 20616 | 22920 | 24496 | 28336 |
| 30 | 11448 | 12960 | 14688 | 16416 | 18336 | 19848 | 21384 | 23688 | 25456 | 29296 |
| 31 | 11832 | 13536 | 15264 | 16992 | 19080 | 20616 | 22152 | 24496 | 26416 | 30576 |
| 32 | 12216 | 14112 | 15840 | 17568 | 19848 | 20616 | 22920 | 24496 | 26416 | 31704 |
| 33 | 12576 | 14688 | 16416 | 18336 | 19848 | 21384 | 23688 | 25456 | 27376 | 32856 |
| 34 | 12960 | 14688 | 16992 | 19080 | 20616 | 22152 | 24496 | 26416 | 28336 | 34008 |
| 35 | 13536 | 15264 | 17568 | 19080 | 21384 | 22920 | 24496 | 27376 | 29296 | 35160 |
| 36 | 13536 | 15840 | 17568 | 19848 | 22152 | 23688 | 25456 | 28336 | 30576 | 35160 |
| 37 | 14112 | 16416 | 18336 | 20616 | 22920 | 24496 | 26416 | 28336 | 30576 | 36696 |

TABLE 9-continued

| | $I_{TBS}$ | | | | | | | | | |
|---|---|---|---|---|---|---|---|---|---|---|
| $N_{PRB}$ | 27 | 28 | 29 | 30 | 31 | 32 | 33 | 34 | 35 | 36 |
| 38 | 14688 | 16416 | 19080 | 20616 | 22920 | 24496 | 27376 | 29296 | 31704 | 37888 |
| 39 | 14688 | 16992 | 19080 | 21384 | 23688 | 25456 | 27376 | 30576 | 32856 | 39232 |
| 40 | 15264 | 17568 | 19848 | 22152 | 24496 | 26416 | 28336 | 30576 | 34008 | 39232 |
| 41 | 15840 | 18336 | 20616 | 22920 | 24496 | 26416 | 29296 | 31704 | 34008 | 40576 |
| 42 | 15840 | 18336 | 20616 | 22920 | 25456 | 27376 | 29296 | 32856 | 35160 | 40576 |
| 43 | 16416 | 19080 | 21384 | 23688 | 26416 | 28336 | 30576 | 34008 | 36696 | 42368 |
| 44 | 16992 | 19080 | 22152 | 24496 | 26416 | 29296 | 31704 | 34008 | 36696 | 43816 |
| 45 | 16992 | 19848 | 22152 | 24496 | 27376 | 29296 | 31704 | 35160 | 37888 | 43816 |
| 46 | 17568 | 19848 | 22920 | 25456 | 28336 | 30576 | 32856 | 35160 | 39232 | 45352 |
| 47 | 18336 | 20616 | 23688 | 26416 | 28336 | 30576 | 34008 | 36696 | 39232 | 46888 |
| 48 | 18336 | 21384 | 23688 | 26416 | 29296 | 31704 | 34008 | 37888 | 40576 | 46888 |
| 49 | 19080 | 21384 | 24496 | 27376 | 29296 | 31704 | 35160 | 37888 | 40576 | 48936 |
| 50 | 19080 | 22152 | 24496 | 27376 | 30576 | 32856 | 35160 | 39232 | 42368 | 48936 |
| 51 | 19848 | 22152 | 25456 | 28336 | 30576 | 32856 | 36696 | 39232 | 42368 | 51024 |
| 52 | 19848 | 22920 | 25456 | 28336 | 31704 | 34008 | 36696 | 40576 | 43816 | 51024 |
| 53 | 20616 | 22920 | 26416 | 29296 | 32856 | 35160 | 37888 | 40576 | 43816 | 52752 |
| 54 | 20616 | 23688 | 26416 | 29296 | 32856 | 35160 | 37888 | 42368 | 45352 | 52752 |
| 55 | 21384 | 24496 | 27376 | 30576 | 34008 | 35160 | 39232 | 42368 | 46888 | 55056 |
| 56 | 21384 | 24496 | 27376 | 30576 | 34008 | 36696 | 39232 | 43816 | 46888 | 55056 |
| 57 | 22152 | 22456 | 28336 | 31704 | 35160 | 37888 | 40576 | 43816 | 46888 | 57336 |
| 58 | 22152 | 25456 | 28336 | 31704 | 35160 | 37888 | 40576 | 45352 | 48936 | 57336 |
| 59 | 22920 | 25456 | 29296 | 32856 | 36696 | 39232 | 42368 | 45352 | 48936 | 59256 |
| 60 | 22920 | 26416 | 29296 | 32856 | 36696 | 39232 | 42368 | 46888 | 51024 | 59256 |
| 61 | 23688 | 26416 | 30576 | 34008 | 36696 | 40576 | 43816 | 46888 | 51024 | 59256 |
| 62 | 23688 | 27376 | 30576 | 34008 | 37888 | 40576 | 43816 | 48936 | 52752 | 61664 |
| 63 | 24496 | 27376 | 31704 | 35160 | 37888 | 40576 | 45352 | 48936 | 52752 | 61664 |
| 64 | 24496 | 28336 | 31704 | 35160 | 39232 | 42368 | 45352 | 48936 | 52752 | 63776 |
| 65 | 24496 | 28336 | 31704 | 36696 | 39232 | 42368 | 46888 | 51024 | 55056 | 63776 |
| 66 | 25456 | 29296 | 32856 | 36696 | 40576 | 43816 | 46888 | 51024 | 55056 | 63776 |
| 67 | 25456 | 29296 | 32856 | 36696 | 40576 | 43816 | 46888 | 52752 | 57336 | 66592 |
| 68 | 26416 | 29296 | 34008 | 37888 | 40576 | 43816 | 48936 | 52752 | 57336 | 66592 |
| 69 | 26416 | 30576 | 34008 | 37888 | 42368 | 45352 | 48936 | 52752 | 57336 | 68808 |
| 70 | 26416 | 30576 | 35160 | 39232 | 42368 | 45352 | 48936 | 55056 | 59256 | 68808 |
| 71 | 27376 | 31704 | 35160 | 39232 | 43816 | 46888 | 51024 | 55056 | 59256 | 71112 |
| 72 | 27376 | 31704 | 35160 | 39232 | 43816 | 46888 | 51024 | 55056 | 61664 | 71112 |
| 73 | 28336 | 31704 | 36696 | 40576 | 43816 | 46888 | 52752 | 57336 | 61664 | 71112 |
| 74 | 28336 | 32856 | 36696 | 40576 | 45352 | 48936 | 52752 | 57336 | 61664 | 73712 |
| 75 | 28336 | 32856 | 36696 | 40576 | 45352 | 48936 | 52752 | 59256 | 63776 | 75376 |
| 76 | 29296 | 32856 | 37888 | 42368 | 46888 | 48936 | 55056 | 59256 | 63776 | 76208 |
| 77 | 29296 | 34008 | 37888 | 42368 | 46888 | 51024 | 55056 | 59256 | 63776 | 76208 |
| 78 | 29296 | 34008 | 39232 | 43816 | 46888 | 51024 | 55056 | 61664 | 66592 | 76208 |
| 79 | 30576 | 35160 | 39232 | 43816 | 48936 | 51024 | 57336 | 61664 | 66592 | 78704 |
| 80 | 30576 | 35160 | 39232 | 43816 | 48936 | 52752 | 57336 | 61664 | 66592 | 78704 |
| 81 | 30576 | 35160 | 40576 | 45352 | 48936 | 52752 | 57336 | 63776 | 68808 | 81176 |
| 82 | 31704 | 36696 | 40576 | 45352 | 51024 | 52752 | 59256 | 63776 | 68808 | 81176 |
| 83 | 31704 | 36696 | 40576 | 45352 | 51024 | 55056 | 59256 | 63776 | 68808 | 81176 |
| 84 | 31704 | 36696 | 42368 | 46888 | 51024 | 55056 | 59256 | 66592 | 71112 | 81176 |
| 85 | 32856 | 37888 | 42368 | 46888 | 51024 | 55056 | 61664 | 66592 | 71112 | 84760 |
| 86 | 32856 | 37888 | 42368 | 46888 | 52752 | 55056 | 61664 | 66592 | 71112 | 84760 |
| 87 | 32856 | 37888 | 43816 | 48936 | 52752 | 57336 | 61664 | 68808 | 73712 | 84760 |
| 88 | 34008 | 39232 | 43816 | 48936 | 52752 | 57336 | 61664 | 68808 | 73712 | 87936 |
| 89 | 34008 | 39232 | 43816 | 48936 | 55056 | 59256 | 63776 | 68808 | 75376 | 87936 |
| 90 | 34008 | 39232 | 45352 | 48936 | 55056 | 59256 | 63776 | 71112 | 75376 | 87936 |
| 91 | 35160 | 40576 | 45352 | 51024 | 55056 | 59256 | 63776 | 71112 | 76208 | 90816 |
| 92 | 35160 | 40576 | 45352 | 51024 | 55056 | 59256 | 66592 | 71112 | 76208 | 90816 |
| 93 | 35160 | 40576 | 46888 | 51024 | 57336 | 61664 | 66592 | 71112 | 78704 | 90816 |
| 94 | 36696 | 40576 | 46888 | 52752 | 57336 | 61664 | 66592 | 73712 | 78704 | 93800 |
| 95 | 36696 | 42368 | 46888 | 52752 | 57336 | 61664 | 66592 | 73712 | 78704 | 93800 |
| 96 | 36696 | 42368 | 46888 | 52752 | 59256 | 63776 | 68808 | 75376 | 81176 | 93800 |
| 97 | 36696 | 42368 | 48936 | 52752 | 59256 | 63776 | 68808 | 75376 | 81176 | 93800 |
| 98 | 37888 | 42368 | 48936 | 55056 | 59256 | 63776 | 68808 | 76208 | 81176 | 97896 |
| 99 | 37888 | 43816 | 48936 | 55056 | 59256 | 63776 | 71112 | 76208 | 84760 | 97896 |
| 100 | 37888 | 43816 | 48936 | 55056 | 61664 | 66592 | 71112 | 78704 | 84760 | 97896 |
| 101 | 39232 | 43816 | 51024 | 55056 | 61664 | 66592 | 71112 | 78704 | 84760 | 97896 |
| 102 | 39232 | 45352 | 51024 | 57336 | 61664 | 66592 | 73712 | 78704 | 84760 | 97896 |
| 103 | 39232 | 45352 | 51024 | 57336 | 63776 | 66592 | 73712 | 81176 | 87936 | 97896 |
| 104 | 39232 | 45352 | 51024 | 57336 | 63776 | 68808 | 73712 | 81176 | 87936 | 97896 |
| 105 | 40756 | 46888 | 52752 | 57336 | 63776 | 68808 | 75376 | 81176 | 87936 | 97896 |
| 106 | 40756 | 46888 | 52752 | 59256 | 63776 | 68808 | 75376 | 81176 | 87936 | 97896 |
| 107 | 40756 | 46888 | 52752 | 59256 | 66592 | 71112 | 76208 | 84760 | 90816 | 97896 |
| 108 | 40756 | 46888 | 52752 | 59256 | 66592 | 71112 | 76208 | 84760 | 90816 | 97896 |
| 109 | 42368 | 48936 | 55056 | 59256 | 66592 | 71112 | 78704 | 84760 | 90816 | 97896 |
| 110 | 42368 | 48936 | 55056 | 61664 | 66592 | 71112 | 78704 | 84760 | 93800 | 97896 |

Third Embodiment

In accordance with the third embodiment, a TBS is defined for supporting transmission efficiency of MCSs in Table 10. TBS indices 27 to 36 are newly defined for supporting 256QAM in accordance with the first embodiment. Table 11 shows such TBS indices 27 to 36 newly defined for supporting 256QAM.

TABLE 10

| $I_{MCS}$ | modulation | R | $I_{TBS}$ |
|---|---|---|---|
| 18 | 64 QAM | 466 | 16 |
| 19 | 64 QAM | 547 | 27 |

TABLE 10-continued

| $I_{MCS}$ | modulation | R | $I_{TBS}$ |
|---|---|---|---|
| 20 | 64 QAM | 627 | 28 |
| 21 | 64 QAM | 707 | 29 |
| 22 | 64 QAM | 787 | 30 |
| 23 | 64 QAM | 861 | 31 |
| 24 | 64 QAM | 934 | 32 |
| 25 | 256 QAM | 766 | 33 |
| 26 | 256 QAM | 830 | 34 |
| 27 | 256 QAM | 889 | 35 |
| 28 | 256 QAM | 948 | 36 |

TABLE 11

| $N_{PRB}$ | 27 | 28 | 29 | 30 | 31 | 32 | 33 | 34 | 35 | 36 |
|---|---|---|---|---|---|---|---|---|---|---|
| 1 | 376 | 424 | 472 | 536 | 584 | 632 | 696 | 744 | 808 | 968 |
| 2 | 744 | 872 | 968 | 1096 | 1192 | 1288 | 1416 | 1544 | 1672 | 1992 |
| 3 | 1128 | 1288 | 1480 | 1608 | 1800 | 1928 | 2152 | 2280 | 2472 | 2984 |
| 4 | 1544 | 1736 | 1992 | 2216 | 2408 | 2600 | 2856 | 3112 | 3368 | 4008 |
| 5 | 1928 | 2152 | 2472 | 2728 | 2984 | 3240 | 3624 | 3880 | 4136 | 4968 |
| 6 | 2280 | 2600 | 2984 | 3240 | 3624 | 3880 | 4264 | 4584 | 4968 | 5992 |
| 7 | 2664 | 3112 | 3496 | 3880 | 4264 | 4584 | 4968 | 5352 | 5736 | 6968 |
| 8 | 3112 | 3496 | 4008 | 4392 | 4776 | 5160 | 5736 | 6200 | 6712 | 7992 |
| 9 | 3496 | 3880 | 4392 | 4968 | 5352 | 5992 | 6456 | 6968 | 7480 | 8760 |
| 10 | 3880 | 4392 | 4968 | 5544 | 5992 | 6456 | 7224 | 7736 | 8248 | 9912 |
| 11 | 4264 | 4776 | 5352 | 5992 | 6712 | 7224 | 7736 | 8504 | 9144 | 10680 |
| 12 | 4584 | 5352 | 5992 | 6456 | 7224 | 7736 | 8504 | 9144 | 9912 | 11832 |
| 13 | 4968 | 5736 | 6456 | 7224 | 7736 | 8504 | 9144 | 9912 | 10680 | 12960 |
| 14 | 5352 | 6200 | 6968 | 7736 | 8504 | 9144 | 9912 | 10680 | 11448 | 13536 |
| 15 | 5736 | 6456 | 7480 | 8248 | 9144 | 9912 | 10680 | 11448 | 12576 | 14688 |
| 16 | 6200 | 6968 | 7992 | 8760 | 9528 | 10296 | 11448 | 12216 | 12960 | 15840 |
| 17 | 6456 | 7480 | 8504 | 9144 | 10296 | 11064 | 12216 | 12960 | 14112 | 16992 |
| 18 | 6968 | 7736 | 8760 | 9912 | 10680 | 11832 | 12960 | 14112 | 14688 | 17568 |
| 19 | 7224 | 8248 | 9528 | 10296 | 11448 | 12216 | 13536 | 14688 | 15840 | 19080 |
| 20 | 7736 | 8760 | 9912 | 11064 | 12216 | 12960 | 14112 | 15264 | 16416 | 19848 |
| 21 | 7992 | 9144 | 10296 | 11448 | 12576 | 13536 | 15264 | 16416 | 17568 | 20616 |
| 22 | 8504 | 9528 | 10680 | 12216 | 12960 | 14112 | 15840 | 16992 | 18336 | 21384 |
| 23 | 8760 | 9912 | 11448 | 12576 | 14112 | 15264 | 16416 | 17568 | 19080 | 22920 |
| 24 | 9144 | 10680 | 11832 | 12960 | 14688 | 15840 | 16992 | 18336 | 19848 | 23688 |
| 25 | 9528 | 11064 | 12216 | 13536 | 15264 | 16416 | 17568 | 19080 | 20616 | 24496 |
| 26 | 9912 | 11448 | 12960 | 14112 | 15840 | 16992 | 18336 | 19848 | 21384 | 25456 |
| 27 | 10296 | 11832 | 13536 | 14688 | 16416 | 17568 | 19080 | 20616 | 22152 | 26416 |
| 28 | 10680 | 12216 | 13536 | 15264 | 16992 | 18336 | 19848 | 21384 | 22920 | 27376 |
| 29 | 11064 | 12576 | 14112 | 15840 | 17568 | 19080 | 20616 | 22152 | 23688 | 28336 |
| 30 | 11448 | 12960 | 14688 | 16416 | 18336 | 19848 | 21384 | 22920 | 24496 | 29296 |
| 31 | 11832 | 13536 | 15264 | 16992 | 18336 | 20616 | 22152 | 23688 | 25456 | 30576 |
| 32 | 12216 | 14112 | 15840 | 17568 | 19080 | 20616 | 22920 | 24496 | 26416 | 31704 |
| 33 | 12576 | 14688 | 16416 | 18336 | 19848 | 21384 | 23688 | 25456 | 27376 | 32856 |
| 34 | 12960 | 14688 | 16992 | 18336 | 20616 | 22152 | 24496 | 26416 | 28336 | 34008 |
| 35 | 13536 | 15264 | 17568 | 19080 | 21384 | 22920 | 25456 | 27376 | 29296 | 35160 |
| 36 | 13536 | 15840 | 17568 | 19848 | 21384 | 23688 | 25456 | 28336 | 29296 | 35160 |
| 37 | 14112 | 16416 | 18336 | 20616 | 22152 | 24496 | 26416 | 28336 | 30576 | 36696 |
| 38 | 14688 | 16416 | 19080 | 20616 | 22920 | 24496 | 27376 | 29296 | 31704 | 37888 |
| 39 | 14688 | 16992 | 19080 | 21384 | 23688 | 25456 | 28336 | 30576 | 32856 | 39232 |
| 40 | 15264 | 17568 | 19848 | 22152 | 23688 | 26416 | 28336 | 30576 | 32856 | 39232 |
| 41 | 15840 | 18336 | 20616 | 22920 | 24496 | 26416 | 29296 | 31704 | 34008 | 40576 |
| 42 | 15840 | 18336 | 20616 | 22920 | 25456 | 27376 | 30576 | 32856 | 35160 | 40576 |
| 43 | 16416 | 19080 | 21384 | 23688 | 25456 | 28336 | 30576 | 32856 | 35160 | 42368 |
| 44 | 16992 | 19080 | 21384 | 24496 | 26416 | 28336 | 31704 | 34008 | 36696 | 43816 |
| 45 | 16992 | 19848 | 22152 | 24496 | 27376 | 29296 | 31704 | 35160 | 37888 | 43816 |
| 46 | 17568 | 19848 | 22920 | 25456 | 27376 | 30576 | 32856 | 35160 | 37888 | 45352 |
| 47 | 18336 | 20616 | 22920 | 25456 | 28336 | 30576 | 34008 | 36696 | 39232 | 46888 |
| 48 | 18336 | 21384 | 23688 | 26416 | 29296 | 31704 | 34008 | 36696 | 39232 | 46888 |
| 49 | 19080 | 21384 | 24496 | 27376 | 29296 | 31704 | 35160 | 37888 | 40576 | 48936 |
| 50 | 19080 | 22152 | 24496 | 27376 | 30576 | 32856 | 35160 | 39232 | 42368 | 48936 |
| 51 | 19848 | 22152 | 25456 | 28336 | 30576 | 32856 | 36696 | 39232 | 42368 | 51024 |
| 52 | 19848 | 22920 | 25456 | 28336 | 31704 | 34008 | 36696 | 40576 | 43816 | 51024 |
| 53 | 20616 | 22920 | 26416 | 29296 | 31704 | 35160 | 37888 | 40576 | 43816 | 52752 |
| 54 | 20616 | 23688 | 26416 | 29296 | 32856 | 35160 | 39232 | 42368 | 45352 | 52752 |
| 55 | 21384 | 24496 | 27376 | 30576 | 32856 | 35160 | 39232 | 42368 | 45352 | 55056 |

TABLE 11-continued

| | $I_{TBS}$ | | | | | | | | | |
|---|---|---|---|---|---|---|---|---|---|---|
| $N_{PRB}$ | 27 | 28 | 29 | 30 | 31 | 32 | 33 | 34 | 35 | 36 |
| 56 | 21384 | 24496 | 27376 | 30576 | 34008 | 36696 | 40576 | 43816 | 46888 | 55056 |
| 57 | 22152 | 22456 | 28336 | 31704 | 34008 | 36696 | 40576 | 43816 | 46888 | 57336 |
| 58 | 22152 | 25456 | 28336 | 31704 | 35160 | 37888 | 40576 | 45352 | 48936 | 57336 |
| 59 | 22920 | 25456 | 29296 | 32856 | 35160 | 37888 | 42368 | 45352 | 48936 | 59256 |
| 60 | 22920 | 26416 | 29296 | 32856 | 36696 | 39232 | 42368 | 46888 | 48936 | 59256 |
| 61 | 23688 | 26416 | 30576 | 34008 | 36696 | 39232 | 43816 | 46888 | 51024 | 59256 |
| 62 | 23688 | 27376 | 30576 | 34008 | 37888 | 40576 | 43816 | 48936 | 51024 | 61664 |
| 63 | 24496 | 27376 | 31704 | 35160 | 37888 | 40576 | 45352 | 48936 | 52752 | 61664 |
| 64 | 24496 | 28336 | 31704 | 35160 | 37888 | 42368 | 45352 | 48936 | 52752 | 63776 |
| 65 | 24496 | 28336 | 31704 | 35160 | 39232 | 42368 | 46888 | 51024 | 55056 | 63776 |
| 66 | 25456 | 29296 | 32856 | 36696 | 39232 | 43816 | 46888 | 51024 | 55056 | 63776 |
| 67 | 25456 | 29296 | 32856 | 36696 | 40576 | 43816 | 46888 | 52752 | 55056 | 66592 |
| 68 | 26416 | 29296 | 34008 | 37888 | 40576 | 43816 | 48936 | 52752 | 57336 | 66592 |
| 69 | 26416 | 30576 | 34008 | 37888 | 42368 | 45352 | 48936 | 52752 | 57336 | 68808 |
| 70 | 26416 | 30576 | 35160 | 37888 | 42368 | 45352 | 51024 | 55056 | 57336 | 68808 |
| 71 | 27376 | 31704 | 35160 | 39232 | 42368 | 46888 | 51024 | 55056 | 59256 | 71112 |
| 72 | 27376 | 31704 | 35160 | 39232 | 43816 | 46888 | 51024 | 55056 | 29256 | 71112 |
| 73 | 28336 | 31704 | 36696 | 40576 | 43816 | 46888 | 52752 | 57336 | 61664 | 71112 |
| 74 | 28336 | 32856 | 36696 | 40576 | 43816 | 48936 | 52752 | 57336 | 61664 | 73712 |
| 75 | 28336 | 32856 | 36696 | 40576 | 45352 | 48936 | 52752 | 57336 | 61664 | 75376 |
| 76 | 29296 | 32856 | 37888 | 42368 | 45352 | 48936 | 55056 | 59256 | 63776 | 76208 |
| 77 | 29296 | 34008 | 37888 | 42368 | 46888 | 51024 | 55056 | 59256 | 63776 | 76208 |
| 78 | 29296 | 34008 | 39232 | 42368 | 46888 | 51024 | 55056 | 59256 | 63776 | 76208 |
| 79 | 30576 | 35160 | 39232 | 43816 | 46888 | 51024 | 57336 | 61664 | 66592 | 78704 |
| 80 | 30576 | 35160 | 39232 | 43816 | 48936 | 52752 | 57336 | 61664 | 66592 | 78704 |
| 81 | 30576 | 35160 | 40576 | 45352 | 48936 | 52752 | 57336 | 63776 | 66592 | 81176 |
| 82 | 31704 | 36696 | 40576 | 45352 | 48936 | 52752 | 59256 | 63776 | 68808 | 81176 |
| 83 | 31704 | 36696 | 40576 | 45352 | 51024 | 55056 | 59256 | 63776 | 68808 | 81176 |
| 84 | 31704 | 36696 | 42368 | 46888 | 51024 | 55056 | 59256 | 63776 | 68808 | 81176 |
| 85 | 32856 | 37888 | 42368 | 46888 | 51024 | 55056 | 61664 | 66592 | 71112 | 84760 |
| 86 | 32856 | 37888 | 42368 | 46888 | 51024 | 55056 | 61664 | 66592 | 71112 | 84760 |
| 87 | 32856 | 37888 | 42368 | 48936 | 52752 | 57336 | 61664 | 66592 | 71112 | 84760 |
| 88 | 34008 | 39232 | 43816 | 48936 | 52752 | 57336 | 63776 | 68808 | 73712 | 87936 |
| 89 | 34008 | 39232 | 43816 | 48936 | 52752 | 57336 | 63776 | 68808 | 73712 | 87936 |
| 90 | 34008 | 39232 | 43816 | 48936 | 55056 | 59256 | 63776 | 68808 | 75376 | 87936 |
| 91 | 35160 | 40576 | 45352 | 51024 | 55056 | 59256 | 63776 | 71112 | 75376 | 90816 |
| 92 | 35160 | 40576 | 45352 | 51024 | 55056 | 59256 | 66592 | 71112 | 76208 | 90816 |
| 93 | 35160 | 40576 | 45352 | 51024 | 55056 | 61664 | 66592 | 71112 | 76208 | 90816 |
| 94 | 36696 | 40576 | 46888 | 51024 | 57336 | 61664 | 66592 | 73712 | 78704 | 93800 |
| 95 | 36696 | 42368 | 46888 | 52752 | 57336 | 61664 | 68808 | 73712 | 78704 | 93800 |
| 96 | 36696 | 42368 | 46888 | 52752 | 57336 | 63776 | 68808 | 73712 | 78704 | 93800 |
| 97 | 36696 | 42368 | 48936 | 52752 | 59256 | 63776 | 68808 | 75376 | 81176 | 93800 |
| 98 | 37888 | 42368 | 48936 | 55056 | 59256 | 63776 | 71112 | 76208 | 81176 | 97896 |
| 99 | 37888 | 43816 | 48936 | 55056 | 59256 | 63776 | 71112 | 76208 | 81176 | 97896 |
| 100 | 37888 | 43816 | 48936 | 55056 | 59256 | 66592 | 71112 | 78704 | 84760 | 97896 |
| 101 | 39232 | 43816 | 51024 | 55056 | 61664 | 66592 | 71112 | 78704 | 84760 | 97896 |
| 102 | 39232 | 45352 | 51024 | 55056 | 61664 | 66592 | 73712 | 78704 | 84760 | 97896 |
| 103 | 39232 | 45352 | 51024 | 57336 | 61664 | 66592 | 73712 | 78704 | 84760 | 97896 |
| 104 | 39232 | 45352 | 51024 | 57336 | 61664 | 68808 | 73712 | 81176 | 84760 | 97896 |
| 105 | 40756 | 45352 | 52752 | 57336 | 63776 | 68808 | 75376 | 81176 | 87936 | 97896 |
| 106 | 40756 | 46888 | 52752 | 59256 | 63776 | 68808 | 75376 | 81176 | 87936 | 97896 |
| 107 | 40756 | 46888 | 52752 | 59256 | 63776 | 68808 | 76208 | 81176 | 87936 | 97896 |
| 108 | 40756 | 46888 | 52752 | 59256 | 63776 | 71112 | 76208 | 84760 | 90816 | 97896 |
| 109 | 42368 | 46888 | 55056 | 59256 | 66592 | 71112 | 78704 | 84760 | 90816 | 97896 |
| 110 | 42368 | 48936 | 55056 | 61664 | 66592 | 71112 | 78704 | 84760 | 90816 | 97896 |

Fourth Embodiment

In accordance with the fourth embodiment, a TBS is defined for supporting transmission efficiency of MCSs in Table 12. TBS indices 27 to 36 are newly defined for supporting 256QAM in accordance with the first embodiment. Table 13 shows such TBS indices 27 to 36 newly defined for supporting 256QAM.

TABLE 12

| $I_{MCS}$ | modulation | R | $I_{TBS}$ |
|---|---|---|---|
| 18 | 64 QAM | 466 | 16 |
| 19 | 64 QAM | 547 | 27 |
| 20 | 64 QAM | 628 | 28 |

TABLE 12-continued

| $I_{MCS}$ | modulation | R | $I_{TBS}$ |
|---|---|---|---|
| 21 | 64 QAM | 709 | 29 |
| 22 | 64 QAM | 790 | 30 |
| 23 | 64 QAM | 864 | 31 |
| 24 | 64 QAM | 937 | 32 |
| 25 | 256 QAM | 769 | 33 |
| 26 | 256 QAM | 834 | 34 |
| 27 | 256 QAM | 893 | 35 |
| 28 | 256 QAM | 952 | 36 |

TABLE 13

| | \multicolumn{10}{c}{$I_{TBS}$} |
|---|---|---|---|---|---|---|---|---|---|---|
| $N_{PRB}$ | 27 | 28 | 29 | 30 | 31 | 32 | 33 | 34 | 35 | 36 |
| 1 | 376 | 424 | 472 | 536 | 584 | 632 | 696 | 744 | 808 | 968 |
| 2 | 744 | 872 | 968 | 1096 | 1192 | 1288 | 1416 | 1544 | 1672 | 1992 |
| 3 | 1128 | 1288 | 1480 | 1672 | 1800 | 1928 | 2152 | 2344 | 2472 | 2984 |
| 4 | 1544 | 1736 | 1992 | 2216 | 2408 | 2600 | 2856 | 3112 | 3368 | 4008 |
| 5 | 1928 | 2152 | 2472 | 2728 | 2984 | 3240 | 3624 | 3880 | 4136 | 4968 |
| 6 | 2280 | 2600 | 2984 | 3368 | 3624 | 3880 | 4264 | 4584 | 4968 | 5992 |
| 7 | 2664 | 3112 | 3496 | 3880 | 4264 | 4584 | 4968 | 5544 | 5736 | 6968 |
| 8 | 3112 | 3496 | 4008 | 4392 | 4776 | 5160 | 5736 | 6200 | 6712 | 7992 |
| 9 | 3496 | 4008 | 4392 | 4968 | 5352 | 5992 | 6456 | 6968 | 7480 | 8760 |
| 10 | 3880 | 4392 | 4968 | 5544 | 5992 | 6456 | 7224 | 7736 | 8248 | 9912 |
| 11 | 4264 | 4776 | 5544 | 5992 | 6712 | 7224 | 7736 | 8504 | 9144 | 10680 |
| 12 | 4584 | 5332 | 5992 | 6712 | 7224 | 7736 | 8504 | 9144 | 9912 | 11832 |
| 13 | 4968 | 5736 | 6456 | 7224 | 7736 | 8504 | 9144 | 9912 | 10680 | 12960 |
| 14 | 5352 | 6200 | 6968 | 7736 | 8504 | 9144 | 9912 | 11064 | 11832 | 13536 |
| 15 | 5736 | 6456 | 7480 | 8248 | 9144 | 9912 | 10680 | 11832 | 12576 | 14688 |
| 16 | 6200 | 6968 | 7992 | 8760 | 9528 | 10296 | 11448 | 12576 | 13536 | 15840 |
| 17 | 6456 | 7480 | 8504 | 9528 | 10296 | 11064 | 12216 | 12960 | 14112 | 16992 |
| 18 | 6968 | 7992 | 8760 | 9912 | 10680 | 11832 | 12960 | 14112 | 14688 | 17568 |
| 19 | 7224 | 8248 | 9528 | 10296 | 11448 | 12576 | 13536 | 14688 | 15840 | 19080 |
| 20 | 7736 | 8760 | 9912 | 11064 | 12216 | 12960 | 14112 | 15264 | 16416 | 19848 |
| 21 | 7992 | 9144 | 10296 | 11448 | 12576 | 13536 | 15264 | 16416 | 17568 | 20616 |
| 22 | 8504 | 9528 | 11064 | 12216 | 13536 | 14112 | 15840 | 16992 | 18336 | 21384 |
| 23 | 8760 | 9912 | 11448 | 12576 | 14112 | 15264 | 16416 | 17568 | 19080 | 22920 |
| 24 | 9144 | 10680 | 11832 | 12960 | 14688 | 15840 | 16992 | 18336 | 19848 | 23688 |
| 25 | 9528 | 11064 | 12216 | 13536 | 15264 | 16416 | 17568 | 19080 | 20616 | 24496 |
| 26 | 9912 | 11448 | 12960 | 14112 | 15840 | 16992 | 18336 | 19848 | 21384 | 25456 |
| 27 | 10296 | 11832 | 13536 | 14688 | 16416 | 17568 | 19080 | 20616 | 22152 | 26416 |
| 28 | 10680 | 12216 | 14112 | 15264 | 16992 | 18336 | 19848 | 22152 | 23688 | 27376 |
| 29 | 11064 | 12576 | 14112 | 15840 | 17568 | 19080 | 20616 | 22920 | 24496 | 28336 |
| 30 | 11448 | 12960 | 14688 | 16416 | 18336 | 19848 | 21384 | 23688 | 24496 | 29296 |
| 31 | 11832 | 13536 | 15264 | 16992 | 19080 | 20616 | 22152 | 24496 | 25456 | 30576 |
| 32 | 12216 | 14112 | 15840 | 17568 | 19080 | 20616 | 22920 | 24496 | 26416 | 31704 |
| 33 | 12576 | 14688 | 16416 | 18336 | 19848 | 21384 | 23688 | 25456 | 27376 | 32856 |
| 34 | 12960 | 14688 | 16992 | 19080 | 20616 | 22152 | 24496 | 26416 | 28336 | 34008 |
| 35 | 13536 | 15264 | 17568 | 19080 | 21384 | 22920 | 25456 | 27376 | 29296 | 35160 |
| 36 | 13536 | 15840 | 17568 | 19848 | 21384 | 23688 | 25456 | 28336 | 30576 | 35160 |
| 37 | 14112 | 16416 | 18336 | 20616 | 22152 | 24496 | 26416 | 28336 | 30576 | 36696 |
| 38 | 14688 | 16416 | 19080 | 20616 | 22920 | 24496 | 27376 | 29296 | 31704 | 37888 |
| 39 | 14688 | 16992 | 19080 | 21384 | 23688 | 25456 | 28336 | 30576 | 32856 | 39232 |
| 40 | 15264 | 17568 | 19848 | 22152 | 24496 | 26416 | 28336 | 30576 | 32856 | 39232 |
| 41 | 15840 | 18336 | 20616 | 22920 | 24496 | 26416 | 29296 | 31704 | 34008 | 40576 |
| 42 | 15840 | 18336 | 20616 | 22920 | 25456 | 27376 | 30576 | 32856 | 35160 | 40576 |
| 43 | 16416 | 19080 | 21384 | 23688 | 26416 | 28336 | 30576 | 34008 | 35160 | 42368 |
| 44 | 16992 | 19080 | 22152 | 24496 | 26416 | 29296 | 31704 | 34008 | 36696 | 43816 |
| 45 | 16992 | 19848 | 22152 | 24496 | 27376 | 29296 | 31704 | 35160 | 37888 | 43816 |
| 46 | 17568 | 19848 | 22920 | 25456 | 27376 | 30576 | 32856 | 35160 | 37888 | 45352 |
| 47 | 18336 | 20616 | 23688 | 26416 | 28336 | 30576 | 34008 | 36696 | 39232 | 46888 |
| 48 | 18336 | 21384 | 23688 | 26416 | 29296 | 31704 | 34008 | 37888 | 40576 | 46888 |
| 49 | 19080 | 21384 | 24496 | 27376 | 29296 | 31704 | 35160 | 37888 | 40576 | 48936 |
| 50 | 19080 | 22152 | 24496 | 27376 | 30576 | 32856 | 35160 | 39232 | 42368 | 48936 |
| 51 | 19848 | 22152 | 25456 | 28336 | 30576 | 32856 | 36696 | 39232 | 42368 | 51024 |
| 52 | 19848 | 22920 | 25456 | 28336 | 31704 | 34008 | 37888 | 40576 | 43816 | 51024 |
| 53 | 20616 | 22920 | 26416 | 29296 | 31704 | 35160 | 37888 | 40576 | 43816 | 52752 |
| 54 | 20616 | 23688 | 26416 | 29296 | 32856 | 35160 | 39232 | 42368 | 45352 | 52752 |
| 55 | 21384 | 24496 | 27376 | 30576 | 32856 | 35160 | 39232 | 42368 | 45352 | 55056 |
| 56 | 21384 | 24496 | 27376 | 30576 | 34008 | 36696 | 40576 | 43816 | 46888 | 55056 |
| 57 | 22152 | 25456 | 28336 | 31704 | 34008 | 37888 | 40576 | 43816 | 46888 | 57336 |
| 58 | 22152 | 25456 | 28336 | 31704 | 35160 | 37888 | 42368 | 45352 | 48936 | 57336 |
| 59 | 22920 | 25456 | 29296 | 32856 | 35160 | 39232 | 42368 | 45352 | 48936 | 59256 |
| 60 | 22920 | 26416 | 29296 | 32856 | 36696 | 39232 | 42368 | 46888 | 51024 | 59256 |
| 61 | 23688 | 26416 | 30576 | 34008 | 36696 | 40576 | 43816 | 46888 | 51024 | 59256 |
| 62 | 23688 | 27376 | 30576 | 34008 | 37888 | 40576 | 43816 | 48936 | 51024 | 61664 |
| 63 | 24496 | 27376 | 31704 | 35160 | 37888 | 40576 | 45352 | 48936 | 52752 | 61664 |
| 64 | 24496 | 28336 | 31704 | 35160 | 39232 | 42368 | 45352 | 48936 | 52752 | 63776 |
| 65 | 24496 | 28336 | 31704 | 36696 | 39232 | 42368 | 46888 | 51024 | 55056 | 63776 |
| 66 | 25456 | 29296 | 32856 | 36696 | 39232 | 43816 | 46888 | 51024 | 55056 | 63776 |
| 67 | 25456 | 29296 | 32856 | 36696 | 40576 | 43816 | 48936 | 52752 | 55056 | 66592 |
| 68 | 26416 | 29296 | 34008 | 37888 | 40576 | 43816 | 48936 | 52752 | 57336 | 66592 |
| 69 | 26416 | 30576 | 34008 | 37888 | 42368 | 45352 | 48936 | 52752 | 57336 | 68808 |
| 70 | 26416 | 30576 | 35160 | 39232 | 42368 | 45352 | 51024 | 55056 | 59256 | 68808 |
| 71 | 27376 | 31704 | 35160 | 39232 | 42368 | 46888 | 51024 | 55056 | 59256 | 71112 |
| 72 | 27376 | 31704 | 35160 | 39232 | 43816 | 46888 | 51024 | 55056 | 59256 | 71112 |
| 73 | 28336 | 31704 | 36696 | 40576 | 43816 | 46888 | 52752 | 57336 | 61664 | 71112 |
| 74 | 28336 | 32856 | 36696 | 40576 | 45352 | 48936 | 52752 | 57336 | 61664 | 73712 |
| 75 | 28336 | 32856 | 36696 | 40576 | 45352 | 48936 | 52752 | 59256 | 61664 | 75376 |
| 76 | 29296 | 32856 | 37888 | 42368 | 45352 | 48936 | 55056 | 59256 | 63776 | 76208 |

TABLE 13-continued

| | $I_{TBS}$ | | | | | | | | |
|---|---|---|---|---|---|---|---|---|---|
| $N_{PRB}$ | 27 | 28 | 29 | 30 | 31 | 32 | 33 | 34 | 35 | 36 |
| 77 | 29296 | 34008 | 37888 | 42368 | 46888 | 51024 | 55056 | 59256 | 63776 | 76208 |
| 78 | 29296 | 34008 | 39232 | 43816 | 46888 | 51024 | 55056 | 61664 | 63776 | 76208 |
| 79 | 30576 | 35160 | 39232 | 43816 | 46888 | 51024 | 57336 | 61664 | 66592 | 78704 |
| 80 | 30576 | 35160 | 39232 | 43816 | 48936 | 52752 | 57336 | 61664 | 66592 | 78704 |
| 81 | 30576 | 35160 | 40576 | 45352 | 48936 | 52752 | 57336 | 63776 | 66592 | 81176 |
| 82 | 31704 | 36696 | 40576 | 45352 | 48936 | 52752 | 59256 | 63776 | 68808 | 81176 |
| 83 | 31704 | 36696 | 40576 | 45352 | 51024 | 55056 | 59256 | 63776 | 68808 | 81176 |
| 84 | 31704 | 36696 | 42368 | 46888 | 51024 | 55056 | 59256 | 66592 | 71112 | 81176 |
| 85 | 32856 | 37888 | 42368 | 46888 | 51024 | 55056 | 61664 | 66592 | 71112 | 84760 |
| 86 | 32856 | 37888 | 42368 | 46888 | 52752 | 55056 | 61664 | 66592 | 71112 | 84760 |
| 87 | 32856 | 37888 | 43816 | 48936 | 52752 | 57336 | 61664 | 68808 | 73712 | 84760 |
| 88 | 34008 | 39232 | 43816 | 48936 | 52752 | 57336 | 63776 | 68808 | 73712 | 87936 |
| 89 | 34008 | 39232 | 43816 | 48936 | 52752 | 59256 | 63776 | 68808 | 73712 | 87936 |
| 90 | 34008 | 39232 | 45352 | 48936 | 55056 | 59256 | 63776 | 71112 | 75376 | 87936 |
| 91 | 35160 | 40576 | 45352 | 51024 | 55056 | 59256 | 66592 | 71112 | 76208 | 90816 |
| 92 | 35160 | 40576 | 45352 | 51024 | 55056 | 59256 | 66592 | 71112 | 76208 | 90816 |
| 93 | 35160 | 40576 | 46888 | 51024 | 57336 | 61664 | 66592 | 71112 | 78704 | 90816 |
| 94 | 36696 | 40576 | 46888 | 52752 | 57336 | 61664 | 66592 | 73712 | 78704 | 93800 |
| 95 | 36696 | 42368 | 46888 | 52752 | 57336 | 61664 | 68808 | 73712 | 78704 | 93800 |
| 96 | 36696 | 42368 | 46888 | 52752 | 57336 | 63776 | 68808 | 75376 | 81176 | 93800 |
| 97 | 36696 | 42368 | 48936 | 52752 | 59256 | 63776 | 68808 | 75376 | 81176 | 93800 |
| 98 | 37888 | 42368 | 48936 | 55056 | 59256 | 63776 | 71112 | 76208 | 81176 | 97896 |
| 99 | 37888 | 43816 | 48936 | 55056 | 59256 | 63776 | 71112 | 76208 | 81176 | 97896 |
| 100 | 37888 | 43816 | 48936 | 55056 | 61664 | 66592 | 71112 | 78704 | 84760 | 97896 |
| 101 | 39232 | 43816 | 51024 | 55056 | 61664 | 66592 | 73712 | 78704 | 84760 | 97896 |
| 102 | 39232 | 45352 | 51024 | 57336 | 61664 | 66592 | 73712 | 78704 | 84760 | 97896 |
| 103 | 39232 | 45352 | 51024 | 57336 | 61664 | 66592 | 73712 | 81176 | 84760 | 97896 |
| 104 | 39232 | 45352 | 51024 | 57336 | 63776 | 68808 | 75376 | 81176 | 87936 | 97896 |
| 105 | 40756 | 46888 | 52752 | 57336 | 63776 | 68808 | 75376 | 81176 | 87936 | 97896 |
| 106 | 40756 | 46888 | 52752 | 59256 | 63776 | 68808 | 76208 | 81176 | 87936 | 97896 |
| 107 | 40756 | 46888 | 52752 | 59256 | 63776 | 71112 | 76208 | 84760 | 87936 | 97896 |
| 108 | 40756 | 46888 | 52752 | 59256 | 66592 | 71112 | 78707 | 84760 | 90816 | 97896 |
| 109 | 42368 | 48936 | 55056 | 59256 | 66592 | 71112 | 78704 | 84760 | 90816 | 97896 |
| 110 | 42368 | 48936 | 55056 | 61664 | 66592 | 71112 | 78704 | 84760 | 90816 | 97896 |

Fifth Embodiment

In accordance with the fifth embodiment, a TBS is defined for supporting transmission efficiency of MCSs in Table 14. TBS indices 27 to 33 are newly defined for supporting 256QAM in accordance with the first embodiment. Table 15 shows such TBS indices 27 to 33 newly defined for supporting 256QAM.

TABLE 14

| $I_{MCS}$ | modulation | R | $I_{TBS}$ |
|---|---|---|---|
| 18 | 64 QAM | 466 | 16 |
| 19 | 64 QAM | 541 | 27 |
| 20 | 64 QAM | 616 | 19 |
| 21 | 64 QAM | 694 | 28 |
| 22 | 64 QAM | 772 | 22 |
| 23 | 64 QAM | 844 | 29 |
| 24 | 64 QAM | 910 | 25 |
| 25 | 256 QAM | 738 | 30 |
| 26 | 256 QAM | 815 | 31 |
| 27 | 256 QAM | 890 | 32 |
| 28 | 256 QAM | 948 | 33 |

TABLE 15

| | $I_{TBS}$ | | | | | | |
|---|---|---|---|---|---|---|---|
| $N_{PRB}$ | 27 | 28 | 29 | 30 | 31 | 32 | 33 |
| 1 | 344 | 456 | 568 | 680 | 744 | 808 | 968 |
| 2 | 744 | 936 | 1160 | 1352 | 1480 | 1672 | 1992 |
| 3 | 1128 | 1416 | 1736 | 2024 | 2280 | 2472 | 2984 |
| 4 | 1480 | 1928 | 2344 | 2728 | 2984 | 3368 | 4008 |
| 5 | 1864 | 2408 | 2984 | 3496 | 3752 | 4136 | 4968 |
| 6 | 2280 | 2856 | 3496 | 4136 | 4584 | 4968 | 5992 |
| 7 | 2664 | 3368 | 4136 | 4776 | 5352 | 5736 | 6968 |
| 8 | 2984 | 3880 | 4776 | 5544 | 5992 | 6712 | 7992 |
| 9 | 3368 | 4392 | 5352 | 6200 | 6712 | 7480 | 8760 |
| 10 | 3752 | 4776 | 5992 | 6968 | 7480 | 8248 | 9912 |
| 11 | 4136 | 5352 | 6456 | 7480 | 8248 | 9144 | 10680 |
| 12 | 4584 | 5736 | 6968 | 8248 | 9144 | 9912 | 11832 |
| 13 | 4968 | 6200 | 7736 | 8760 | 9912 | 10680 | 12960 |
| 14 | 5352 | 6712 | 8248 | 9528 | 10680 | 11448 | 13536 |
| 15 | 5736 | 7224 | 8760 | 10296 | 11448 | 12576 | 14688 |
| 16 | 5992 | 7736 | 9528 | 11064 | 12216 | 13536 | 15840 |
| 17 | 6456 | 8248 | 9912 | 11832 | 12960 | 14112 | 16992 |
| 18 | 6712 | 8760 | 10680 | 12216 | 13536 | 14688 | 17568 |
| 19 | 7224 | 9144 | 11064 | 12960 | 14688 | 15840 | 19080 |
| 20 | 7480 | 9528 | 11832 | 13536 | 15264 | 16416 | 19848 |
| 21 | 7992 | 10296 | 12216 | 14688 | 15840 | 17568 | 20616 |
| 22 | 8248 | 10680 | 12960 | 15264 | 16992 | 18336 | 21384 |
| 23 | 8760 | 11064 | 13536 | 15840 | 17568 | 19080 | 22920 |
| 24 | 9144 | 11448 | 14112 | 16416 | 18336 | 19848 | 23688 |
| 25 | 9528 | 12216 | 14688 | 16992 | 19080 | 20616 | 24496 |
| 26 | 9912 | 12576 | 15264 | 17568 | 19848 | 21384 | 25456 |
| 27 | 10296 | 12960 | 15840 | 18336 | 20616 | 22152 | 26416 |
| 28 | 10680 | 13536 | 16416 | 19080 | 21384 | 22920 | 27376 |
| 29 | 11064 | 14112 | 16992 | 19848 | 22152 | 23688 | 28336 |
| 30 | 11448 | 14688 | 17568 | 20616 | 22920 | 24496 | 29296 |
| 31 | 11832 | 15264 | 18336 | 21384 | 23688 | 25456 | 30576 |
| 32 | 12216 | 15264 | 19080 | 22152 | 24496 | 26416 | 31704 |
| 33 | 12576 | 15840 | 19080 | 22920 | 25456 | 27376 | 32856 |
| 34 | 12960 | 16416 | 19848 | 23688 | 25456 | 28336 | 34008 |
| 35 | 12960 | 16992 | 20616 | 23688 | 26416 | 29296 | 35160 |

TABLE 15-continued

| $N_{PRB}$ | 27 | 28 | 29 | 30 | 31 | 32 | 33 |
|---|---|---|---|---|---|---|---|
| 36 | 13536 | 17568 | 21384 | 24496 | 27376 | 29296 | 35160 |
| 37 | 14112 | 18336 | 22152 | 25456 | 28336 | 30576 | 36696 |
| 38 | 14112 | 18336 | 22152 | 26416 | 29296 | 31704 | 37888 |
| 39 | 14688 | 19080 | 22920 | 26416 | 29296 | 32856 | 39232 |
| 40 | 15264 | 19080 | 23688 | 27376 | 30576 | 32856 | 39232 |
| 41 | 15264 | 19848 | 24496 | 28336 | 31704 | 34008 | 40576 |
| 42 | 15840 | 20616 | 24496 | 29296 | 31704 | 35160 | 40576 |
| 43 | 16416 | 20616 | 25456 | 29296 | 32856 | 35160 | 42368 |
| 44 | 16416 | 21384 | 26416 | 30576 | 34008 | 36696 | 43816 |
| 45 | 16992 | 22152 | 26416 | 30576 | 34008 | 37888 | 43816 |
| 46 | 17568 | 22152 | 27376 | 31704 | 35160 | 37888 | 45352 |
| 47 | 17568 | 22920 | 27376 | 32856 | 35160 | 39232 | 46888 |
| 48 | 18336 | 22920 | 28336 | 32856 | 36696 | 39232 | 46888 |
| 49 | 18336 | 23688 | 29296 | 34008 | 36696 | 40576 | 48936 |
| 50 | 19080 | 24496 | 29296 | 34008 | 37888 | 42368 | 48936 |
| 51 | 19080 | 24496 | 30576 | 35160 | 39232 | 42368 | 51024 |
| 52 | 19848 | 25456 | 30576 | 35160 | 39232 | 43816 | 51024 |
| 53 | 19848 | 25456 | 31704 | 36696 | 40576 | 43816 | 52752 |
| 54 | 20616 | 26416 | 31704 | 36696 | 40576 | 45352 | 52752 |
| 55 | 20616 | 26416 | 32856 | 37888 | 42368 | 45352 | 55056 |
| 56 | 21384 | 27376 | 32856 | 37888 | 42368 | 46888 | 55056 |
| 57 | 21384 | 27376 | 34008 | 39232 | 43816 | 46888 | 57336 |
| 58 | 22152 | 28336 | 34008 | 40576 | 43816 | 48936 | 57336 |
| 59 | 22152 | 28336 | 35160 | 40576 | 45352 | 48936 | 59256 |
| 60 | 22920 | 29296 | 35160 | 40576 | 45352 | 48936 | 59256 |
| 61 | 22920 | 29296 | 36696 | 42368 | 46888 | 51024 | 59256 |
| 62 | 23688 | 30576 | 36696 | 42368 | 46888 | 51024 | 61664 |
| 63 | 23688 | 30576 | 36696 | 43816 | 48936 | 52752 | 61664 |
| 64 | 24496 | 30576 | 37888 | 43816 | 48936 | 52752 | 63776 |
| 65 | 24496 | 31704 | 37888 | 45352 | 48936 | 55056 | 63776 |
| 66 | 24496 | 31704 | 39232 | 45352 | 51024 | 55056 | 63776 |
| 67 | 25456 | 32856 | 39232 | 46888 | 51024 | 55056 | 66592 |
| 68 | 25456 | 32856 | 40576 | 46888 | 51024 | 57336 | 66592 |
| 69 | 26416 | 34008 | 40576 | 46888 | 52752 | 57336 | 68808 |
| 70 | 26416 | 34008 | 40576 | 48936 | 52752 | 57336 | 68808 |
| 71 | 26416 | 34008 | 42368 | 48936 | 55056 | 59256 | 71112 |
| 72 | 27376 | 35160 | 42368 | 48936 | 55056 | 59256 | 71112 |
| 73 | 27376 | 35160 | 43816 | 51024 | 55056 | 61664 | 71112 |
| 74 | 28336 | 36696 | 43816 | 51024 | 57336 | 61664 | 73712 |
| 75 | 28336 | 36696 | 43816 | 51024 | 57336 | 61664 | 75376 |
| 76 | 28336 | 36696 | 45352 | 52752 | 57336 | 63776 | 76208 |
| 77 | 29296 | 37888 | 45352 | 52752 | 59256 | 63776 | 76208 |
| 78 | 29296 | 37888 | 45352 | 52752 | 59256 | 63776 | 76208 |
| 79 | 29296 | 37888 | 46888 | 55056 | 59256 | 66592 | 78704 |
| 80 | 30576 | 39232 | 46888 | 55056 | 61664 | 66592 | 78704 |
| 81 | 30576 | 39232 | 46888 | 55056 | 61664 | 66592 | 81176 |
| 82 | 30576 | 39232 | 48936 | 57336 | 61664 | 68808 | 81176 |
| 83 | 31704 | 40576 | 48936 | 57336 | 63776 | 68808 | 81176 |
| 84 | 31704 | 40576 | 48936 | 57336 | 63776 | 68808 | 81176 |
| 85 | 31704 | 40576 | 51024 | 59256 | 63776 | 71112 | 84760 |
| 86 | 32856 | 42368 | 51024 | 59256 | 66592 | 71112 | 84760 |
| 87 | 32856 | 42368 | 51024 | 59256 | 66592 | 71112 | 84760 |
| 88 | 32856 | 42368 | 52752 | 61664 | 66592 | 73712 | 87936 |
| 89 | 34008 | 43816 | 52752 | 61664 | 68808 | 73712 | 87936 |
| 90 | 34008 | 43816 | 52752 | 61664 | 68808 | 75376 | 87936 |
| 91 | 34008 | 43816 | 52752 | 61664 | 68808 | 75376 | 90816 |
| 92 | 35160 | 45352 | 55056 | 63776 | 71112 | 76208 | 90816 |
| 93 | 35160 | 45352 | 55056 | 63776 | 71112 | 76208 | 90816 |
| 94 | 35160 | 45352 | 55056 | 63776 | 71112 | 78704 | 93800 |
| 95 | 36696 | 46888 | 55056 | 66592 | 71112 | 78704 | 93800 |
| 96 | 36696 | 46888 | 57336 | 66592 | 73712 | 78704 | 93800 |
| 97 | 36696 | 46888 | 57336 | 66592 | 73712 | 81176 | 93800 |
| 98 | 36696 | 46888 | 57336 | 66592 | 73712 | 81176 | 97896 |
| 99 | 37888 | 48936 | 59256 | 68808 | 75376 | 81176 | 97896 |
| 100 | 37888 | 48936 | 59256 | 68808 | 76208 | 84760 | 97896 |
| 101 | 37888 | 48936 | 59256 | 68808 | 76208 | 84760 | 97896 |
| 102 | 39232 | 48936 | 59256 | 71112 | 78704 | 84760 | 97896 |
| 103 | 39232 | 51024 | 61664 | 71112 | 78704 | 84760 | 97896 |
| 104 | 39232 | 51024 | 61664 | 71112 | 78704 | 87936 | 97896 |
| 105 | 39232 | 51024 | 61664 | 71112 | 78704 | 87936 | 97896 |
| 106 | 40576 | 51024 | 61664 | 73712 | 81176 | 87936 | 97896 |
| 107 | 40576 | 52752 | 63776 | 73712 | 81176 | 87936 | 97896 |
| 108 | 40576 | 52752 | 63776 | 73712 | 81176 | 90816 | 97896 |
| 109 | 40576 | 52752 | 63776 | 75376 | 81176 | 90816 | 97896 |
| 110 | 42368 | 52752 | 63776 | 75376 | 84760 | 90816 | 97896 |

Sixth Embodiment

In accordance with the sixth embodiment, a TBS is defined for supporting transmission efficiency of MCSs in Table 16. TBS indices 27 to 33 are newly defined for supporting 256QAM in accordance with the first embodiment. Table 17 shows such TBS indices 27 to 33 newly defined for supporting 256QAM.

TABLE 16

| $I_{MCS}$ | modulation | R | $I_{TBS}$ |
|---|---|---|---|
| 18 | 64 QAM | 466 | 16 |
| 19 | 64 QAM | 541 | 27 |
| 20 | 64 QAM | 616 | 19 |
| 21 | 64 QAM | 694 | 28 |
| 22 | 64 QAM | 772 | 22 |
| 23 | 64 QAM | 844 | 29 |
| 24 | 64 QAM | 910 | 25 |
| 25 | 256 QAM | 739 | 30 |
| 26 | 256 QAM | 818 | 31 |
| 27 | 256 QAM | 893 | 32 |
| 28 | 256 QAM | 952 | 33 |

TABLE 17

| $N_{PRB}$ | 27 | 28 | 29 | 30 | 31 | 32 | 33 |
|---|---|---|---|---|---|---|---|
| 1 | 344 | 456 | 568 | 680 | 744 | 808 | 968 |
| 2 | 744 | 936 | 1160 | 1352 | 1480 | 1672 | 1992 |
| 3 | 1128 | 1416 | 1736 | 2024 | 2280 | 2472 | 2984 |
| 4 | 1480 | 1928 | 2344 | 2728 | 2984 | 3368 | 4008 |
| 5 | 1864 | 2408 | 2984 | 3496 | 3752 | 4136 | 4968 |
| 6 | 2280 | 2856 | 3496 | 4136 | 4584 | 4968 | 5992 |
| 7 | 2664 | 3368 | 4136 | 4776 | 5352 | 5736 | 6968 |
| 8 | 2984 | 3880 | 4776 | 5544 | 5992 | 6712 | 7992 |
| 9 | 3368 | 4392 | 5352 | 6200 | 6712 | 7480 | 8760 |
| 10 | 3752 | 4776 | 5992 | 6968 | 7480 | 8248 | 9912 |
| 11 | 4136 | 5352 | 6456 | 7480 | 8248 | 9144 | 10680 |
| 12 | 4584 | 5736 | 6968 | 8248 | 9144 | 9912 | 11832 |
| 13 | 4968 | 6200 | 7736 | 8760 | 9912 | 10680 | 12960 |
| 14 | 5352 | 6712 | 8248 | 9528 | 10680 | 11832 | 13536 |
| 15 | 5736 | 7224 | 8760 | 10296 | 11448 | 12576 | 14688 |
| 16 | 5992 | 7736 | 9528 | 11064 | 12216 | 13536 | 15840 |
| 17 | 6456 | 8248 | 9912 | 11832 | 12960 | 14112 | 16992 |
| 18 | 6712 | 8760 | 10680 | 12216 | 13536 | 14688 | 17568 |
| 19 | 7224 | 9144 | 11064 | 12960 | 14688 | 15840 | 19080 |
| 20 | 7480 | 9528 | 11832 | 13536 | 15264 | 16416 | 19848 |
| 21 | 7992 | 10296 | 12216 | 14688 | 15840 | 17568 | 20616 |
| 22 | 8248 | 10680 | 12960 | 15264 | 16992 | 18336 | 21384 |
| 23 | 8760 | 11064 | 13536 | 15840 | 17568 | 19080 | 22920 |
| 24 | 9144 | 11448 | 14112 | 16416 | 18336 | 19848 | 23688 |
| 25 | 9528 | 12216 | 14688 | 16992 | 19080 | 20616 | 24496 |
| 26 | 9912 | 12576 | 15264 | 17568 | 19848 | 21384 | 25456 |
| 27 | 10296 | 12960 | 15840 | 18336 | 20616 | 22152 | 26416 |
| 28 | 10680 | 13536 | 16416 | 19080 | 21384 | 23688 | 27376 |
| 29 | 11064 | 14112 | 16992 | 19848 | 22152 | 24496 | 28336 |
| 30 | 11448 | 14688 | 17568 | 20616 | 22920 | 24496 | 29296 |
| 31 | 11832 | 15264 | 18336 | 21384 | 23688 | 25456 | 30576 |
| 32 | 12216 | 15264 | 19080 | 22152 | 24496 | 26416 | 31704 |
| 33 | 12576 | 15840 | 19080 | 22920 | 25456 | 27376 | 32856 |
| 34 | 12960 | 16416 | 19848 | 23688 | 25456 | 28336 | 34008 |
| 35 | 12960 | 16992 | 20616 | 24496 | 26416 | 29296 | 35160 |
| 36 | 13536 | 17568 | 21384 | 24496 | 27376 | 30576 | 35160 |
| 37 | 14112 | 18336 | 22152 | 25456 | 28336 | 30576 | 36696 |
| 38 | 14112 | 18336 | 22152 | 26416 | 29296 | 31704 | 37888 |
| 39 | 14688 | 19080 | 22920 | 26416 | 29296 | 32856 | 39232 |
| 40 | 15264 | 19080 | 23688 | 27376 | 30576 | 32856 | 39232 |
| 41 | 15264 | 19848 | 24496 | 28336 | 31704 | 34008 | 40576 |
| 42 | 15840 | 20616 | 24496 | 29296 | 31704 | 35160 | 40576 |
| 43 | 16416 | 20616 | 25456 | 29296 | 32856 | 35160 | 42368 |
| 44 | 16416 | 21384 | 26416 | 30576 | 34008 | 36696 | 43816 |
| 45 | 16992 | 22152 | 26416 | 30576 | 34008 | 37888 | 43816 |
| 46 | 17568 | 22152 | 27376 | 31704 | 35160 | 37888 | 45352 |
| 47 | 17568 | 22920 | 27376 | 32856 | 35160 | 39232 | 46888 |

TABLE 17-continued

| | $I_{TBS}$ | | | | | | |
|---|---|---|---|---|---|---|---|
| $N_{PRB}$ | 27 | 28 | 29 | 30 | 31 | 32 | 33 |
| 48 | 18336 | 22920 | 28336 | 32856 | 36696 | 40576 | 46888 |
| 49 | 18336 | 23688 | 29296 | 34008 | 37888 | 40576 | 48936 |
| 50 | 19080 | 24496 | 29296 | 34008 | 37888 | 42368 | 48936 |
| 51 | 19080 | 24496 | 30576 | 35160 | 39232 | 42368 | 51024 |
| 52 | 19848 | 25456 | 30576 | 35160 | 39232 | 43816 | 51024 |
| 53 | 19848 | 25456 | 31704 | 36696 | 40576 | 43816 | 52752 |
| 54 | 20616 | 26416 | 31704 | 36696 | 40576 | 45352 | 52752 |
| 55 | 20616 | 26416 | 32856 | 37888 | 42368 | 45352 | 55056 |
| 56 | 21384 | 27376 | 32856 | 39232 | 42368 | 46888 | 55056 |
| 57 | 21384 | 27376 | 34008 | 39232 | 43816 | 46888 | 57336 |
| 58 | 22152 | 28336 | 34008 | 40576 | 43816 | 48936 | 57336 |
| 59 | 22152 | 28336 | 35160 | 40576 | 45352 | 48936 | 59256 |
| 60 | 22920 | 29296 | 35160 | 40576 | 45352 | 51024 | 59256 |
| 61 | 22920 | 29296 | 36696 | 42368 | 46888 | 51024 | 59256 |
| 62 | 23688 | 30576 | 36696 | 42368 | 46888 | 51024 | 61664 |
| 63 | 23688 | 30576 | 36696 | 43816 | 48936 | 52752 | 61664 |
| 64 | 24496 | 30576 | 37888 | 43816 | 48936 | 52752 | 63776 |
| 65 | 24496 | 31704 | 37888 | 45352 | 48936 | 55056 | 63776 |
| 66 | 24496 | 31704 | 39232 | 45352 | 51024 | 55056 | 63776 |
| 67 | 25456 | 32856 | 39232 | 46888 | 51024 | 55056 | 66592 |
| 68 | 25456 | 32856 | 40576 | 46888 | 52752 | 57336 | 66592 |
| 69 | 26416 | 34008 | 40576 | 46888 | 52752 | 57336 | 68808 |
| 70 | 26416 | 34008 | 40576 | 48936 | 52752 | 57336 | 68808 |
| 71 | 26416 | 34008 | 42368 | 48936 | 55056 | 59256 | 71112 |
| 72 | 27376 | 35160 | 42368 | 48936 | 55056 | 59256 | 71112 |
| 73 | 27376 | 35160 | 43816 | 51024 | 55056 | 61664 | 71112 |
| 74 | 28336 | 36696 | 43816 | 51024 | 57336 | 61664 | 73712 |
| 75 | 28336 | 36696 | 43816 | 51024 | 57336 | 61664 | 75376 |
| 76 | 28336 | 36696 | 45352 | 52752 | 57336 | 63776 | 76208 |
| 77 | 29296 | 37888 | 45352 | 52752 | 59256 | 63776 | 76208 |
| 78 | 29296 | 37888 | 45352 | 52752 | 59256 | 63776 | 76208 |
| 79 | 29296 | 37888 | 46888 | 55056 | 59256 | 66592 | 78704 |
| 80 | 30576 | 39232 | 46888 | 55056 | 61664 | 66592 | 78704 |
| 81 | 30576 | 39232 | 46888 | 55056 | 61664 | 66592 | 81176 |
| 82 | 30576 | 39232 | 48936 | 57336 | 61664 | 68808 | 81176 |
| 83 | 31704 | 40576 | 48936 | 57336 | 63776 | 68808 | 81176 |
| 84 | 31704 | 40576 | 48936 | 57336 | 63776 | 71112 | 81176 |
| 85 | 31704 | 40576 | 51024 | 59256 | 63776 | 71112 | 84760 |
| 86 | 32856 | 42368 | 51024 | 59256 | 66592 | 71112 | 84760 |
| 87 | 32856 | 42368 | 51024 | 59256 | 66592 | 73712 | 84760 |
| 88 | 32856 | 42368 | 52752 | 61664 | 66592 | 73712 | 87936 |
| 89 | 34008 | 43816 | 52752 | 61664 | 68808 | 73712 | 87936 |
| 90 | 34008 | 43816 | 52752 | 61664 | 68808 | 75376 | 87936 |
| 91 | 34008 | 43816 | 52752 | 63776 | 68808 | 76208 | 90816 |
| 92 | 35160 | 45352 | 55056 | 63776 | 71112 | 76208 | 90816 |
| 93 | 35160 | 45352 | 55056 | 63776 | 71112 | 78704 | 90816 |
| 94 | 35160 | 45352 | 55056 | 63776 | 71112 | 78704 | 93800 |
| 95 | 36696 | 46888 | 55056 | 66592 | 73712 | 78704 | 93800 |
| 96 | 36696 | 46888 | 57336 | 66592 | 73712 | 78704 | 93800 |
| 97 | 36696 | 46888 | 57336 | 66592 | 73712 | 81176 | 93800 |
| 98 | 36696 | 46888 | 57336 | 66592 | 75376 | 81176 | 97896 |
| 99 | 37888 | 48936 | 59256 | 68808 | 75376 | 81176 | 97896 |
| 100 | 37888 | 48936 | 59256 | 68808 | 76208 | 84760 | 97896 |
| 101 | 37888 | 48936 | 59256 | 68808 | 76208 | 84760 | 97896 |
| 102 | 39232 | 48936 | 59256 | 71112 | 78704 | 84760 | 97896 |
| 103 | 39232 | 51024 | 61664 | 71112 | 78704 | 84760 | 97896 |
| 104 | 39232 | 51024 | 61664 | 71112 | 78704 | 87936 | 97896 |
| 105 | 39232 | 51024 | 61664 | 73712 | 81176 | 87936 | 97896 |
| 106 | 40576 | 51024 | 61664 | 73712 | 81176 | 87936 | 97896 |
| 107 | 40576 | 52752 | 63776 | 73712 | 81176 | 87936 | 97896 |
| 108 | 40576 | 52752 | 63776 | 73712 | 81176 | 90816 | 97896 |
| 109 | 40576 | 52752 | 63776 | 75376 | 84760 | 90816 | 97896 |
| 110 | 42368 | 52752 | 63776 | 76208 | 84760 | 90816 | 97896 |

Seventh Embodiment

In accordance with the seventh embodiment, a TBS is defined for supporting transmission efficiency of MCSs in Table 18. TBS indices 27 to 33 are newly defined for supporting 256QAM in accordance with the first embodiment. Table 19 shows such TBS indices 27 to 33 newly defined for supporting 256QAM.

TABLE 18

| $I_{MCS}$ | modulation | R | $I_{TBS}$ |
|---|---|---|---|
| 18 | 64 QAM | 466 | 16 |
| 19 | 64 QAM | 541 | 27 |
| 20 | 64 QAM | 616 | 19 |
| 21 | 64 QAM | 694 | 28 |
| 22 | 64 QAM | 772 | 22 |
| 23 | 64 QAM | 841 | 29 |
| 24 | 64 QAM | 910 | 25 |
| 25 | 256 QAM | 749 | 30 |
| 26 | 256 QAM | 815 | 31 |
| 27 | 256 QAM | 882 | 32 |
| 28 | 256 QAM | 948 | 33 |

TABLE 19

| | $I_{TBS}$ | | | | | | |
|---|---|---|---|---|---|---|---|
| $N_{PRB}$ | 27 | 28 | 29 | 30 | 31 | 32 | 33 |
| 1 | 344 | 456 | 568 | 680 | 744 | 808 | 968 |
| 2 | 744 | 936 | 1160 | 1384 | 1480 | 1608 | 1992 |
| 3 | 1128 | 1416 | 1736 | 2088 | 2280 | 2472 | 2984 |
| 4 | 1480 | 1928 | 2344 | 2792 | 2984 | 3240 | 4008 |
| 5 | 1864 | 2408 | 2984 | 3496 | 3752 | 4136 | 4968 |
| 6 | 2280 | 2856 | 3496 | 4136 | 4584 | 4968 | 5992 |
| 7 | 2664 | 3368 | 4136 | 4968 | 5352 | 5736 | 6968 |
| 8 | 2984 | 3880 | 4776 | 5544 | 5992 | 6456 | 7992 |
| 9 | 3368 | 4392 | 5352 | 6200 | 6712 | 7480 | 8760 |
| 10 | 3752 | 4776 | 5992 | 6968 | 7480 | 8248 | 9912 |
| 11 | 4136 | 5352 | 6456 | 7736 | 8248 | 9144 | 10680 |
| 12 | 4584 | 5736 | 6968 | 8248 | 9144 | 9912 | 11832 |
| 13 | 4968 | 6200 | 7736 | 9144 | 9912 | 10680 | 12960 |
| 14 | 5352 | 6712 | 8248 | 9912 | 10680 | 11448 | 13536 |
| 15 | 5736 | 7224 | 8760 | 10296 | 11448 | 12216 | 14688 |
| 16 | 5992 | 7736 | 9528 | 11064 | 12216 | 12960 | 15840 |
| 17 | 6456 | 8248 | 9912 | 11832 | 12960 | 14112 | 16992 |
| 18 | 6712 | 8760 | 10680 | 12576 | 13536 | 14688 | 17568 |
| 19 | 7224 | 9144 | 11064 | 12960 | 14688 | 15840 | 19080 |
| 20 | 7480 | 9528 | 11832 | 14112 | 15264 | 16416 | 19848 |
| 21 | 7992 | 10296 | 12216 | 14688 | 15840 | 16992 | 20616 |
| 22 | 8248 | 10680 | 12960 | 15264 | 16992 | 18336 | 21384 |
| 23 | 8760 | 11064 | 13536 | 15840 | 17568 | 19080 | 22920 |
| 24 | 9144 | 11448 | 14112 | 16992 | 18336 | 19848 | 23688 |
| 25 | 9528 | 12216 | 14688 | 17568 | 19080 | 20616 | 24496 |
| 26 | 9912 | 12576 | 15264 | 18336 | 19848 | 21384 | 25456 |
| 27 | 10296 | 12960 | 15840 | 19080 | 20616 | 22152 | 26416 |
| 28 | 10680 | 13536 | 16416 | 19848 | 21384 | 22920 | 27376 |
| 29 | 11064 | 14112 | 16992 | 20616 | 22152 | 23688 | 28336 |
| 30 | 11448 | 14688 | 17568 | 20616 | 22920 | 24496 | 29296 |
| 31 | 11832 | 15264 | 18336 | 21384 | 23688 | 25456 | 30576 |
| 32 | 12216 | 15264 | 19080 | 22152 | 24496 | 26416 | 31704 |
| 33 | 12576 | 15840 | 19080 | 22920 | 25456 | 27376 | 32856 |
| 34 | 12960 | 16416 | 19848 | 23688 | 25456 | 28336 | 64008 |
| 35 | 12960 | 16992 | 20616 | 24496 | 26416 | 28336 | 35160 |
| 36 | 13536 | 17568 | 21384 | 25456 | 27376 | 29296 | 35160 |
| 37 | 14112 | 18336 | 21384 | 25456 | 28336 | 30576 | 36696 |
| 38 | 14112 | 18336 | 22152 | 26416 | 29296 | 31704 | 37888 |
| 39 | 14688 | 19080 | 22920 | 27376 | 29296 | 31704 | 39232 |
| 40 | 15264 | 19080 | 23688 | 28336 | 30576 | 32856 | 39232 |
| 41 | 15264 | 19848 | 24496 | 28336 | 31704 | 34008 | 40576 |
| 42 | 15840 | 20616 | 24496 | 29296 | 31704 | 34008 | 40576 |
| 43 | 16416 | 20616 | 25456 | 30576 | 32856 | 35160 | 42368 |
| 44 | 16416 | 21384 | 25456 | 30576 | 34008 | 36696 | 43816 |
| 45 | 16992 | 22152 | 26416 | 31704 | 34008 | 36696 | 43816 |
| 46 | 17568 | 22152 | 27376 | 31704 | 35160 | 37888 | 45352 |
| 47 | 17568 | 22920 | 27376 | 32856 | 35160 | 39232 | 46888 |
| 48 | 18336 | 22920 | 28336 | 34008 | 36696 | 39232 | 46888 |
| 49 | 18336 | 23688 | 29296 | 34008 | 36696 | 40576 | 48936 |
| 50 | 19080 | 24496 | 29296 | 35160 | 37888 | 40576 | 48936 |
| 51 | 19080 | 24496 | 30576 | 35160 | 39232 | 42368 | 51024 |
| 52 | 19848 | 25456 | 30576 | 36696 | 39232 | 42368 | 51024 |
| 53 | 19848 | 25456 | 31704 | 36696 | 40576 | 43816 | 52752 |
| 54 | 20616 | 26416 | 31704 | 37888 | 40576 | 43816 | 52752 |
| 55 | 20616 | 26416 | 32856 | 37888 | 42368 | 45352 | 55056 |
| 56 | 21384 | 27376 | 32856 | 39232 | 42368 | 45352 | 55056 |
| 57 | 21384 | 27376 | 34008 | 39232 | 43816 | 46888 | 57336 |

TABLE 19-continued

| | $I_{TBS}$ | | | | | | |
|---|---|---|---|---|---|---|---|
| $N_{PRB}$ | 27 | 28 | 29 | 30 | 31 | 32 | 33 |
| 58 | 22152 | 28336 | 34008 | 40576 | 43816 | 46888 | 57336 |
| 59 | 22152 | 28336 | 35160 | 40576 | 45352 | 48936 | 59256 |
| 60 | 22920 | 29296 | 35160 | 42368 | 45352 | 48936 | 59256 |
| 61 | 22920 | 29296 | 35160 | 42368 | 46888 | 51024 | 61664 |
| 62 | 23688 | 30576 | 36696 | 43816 | 46888 | 51024 | 61664 |
| 63 | 23688 | 30576 | 36696 | 43816 | 48936 | 51024 | 61664 |
| 64 | 24496 | 30576 | 37888 | 45352 | 48936 | 52752 | 63776 |
| 65 | 24496 | 31704 | 37888 | 45352 | 48936 | 52752 | 63776 |
| 66 | 24496 | 31704 | 39232 | 46888 | 51024 | 55056 | 63776 |
| 67 | 25456 | 32856 | 39232 | 46888 | 51024 | 55056 | 66592 |
| 68 | 25456 | 32856 | 40576 | 46888 | 51024 | 55056 | 66592 |
| 69 | 26416 | 34008 | 40576 | 48396 | 52752 | 57336 | 68808 |
| 70 | 26416 | 34008 | 40576 | 48936 | 52752 | 57336 | 68808 |
| 71 | 26416 | 34008 | 42368 | 48936 | 55056 | 59256 | 71112 |
| 72 | 27376 | 35160 | 42368 | 51024 | 55056 | 59256 | 71112 |
| 73 | 27376 | 35160 | 42368 | 51024 | 55056 | 56256 | 71112 |
| 74 | 28336 | 36696 | 43816 | 51024 | 57336 | 61664 | 73712 |
| 75 | 28336 | 36696 | 43816 | 52752 | 57336 | 61664 | 75376 |
| 76 | 28336 | 36696 | 45352 | 52752 | 57336 | 61664 | 76208 |
| 77 | 29296 | 37888 | 45352 | 52752 | 59256 | 63776 | 76208 |
| 78 | 29296 | 37888 | 45352 | 55056 | 59256 | 63776 | 76208 |
| 79 | 29296 | 37888 | 46888 | 55056 | 59256 | 63776 | 78704 |
| 80 | 30576 | 39232 | 46888 | 55056 | 61664 | 66592 | 78704 |
| 81 | 30576 | 39232 | 46888 | 57336 | 61664 | 66592 | 81176 |
| 82 | 30576 | 39232 | 48936 | 57336 | 61664 | 66592 | 81176 |
| 83 | 31704 | 40576 | 48936 | 57336 | 63776 | 68808 | 81176 |
| 84 | 31704 | 40576 | 48936 | 59256 | 63776 | 68808 | 81176 |
| 85 | 31704 | 40576 | 51024 | 59256 | 63776 | 71112 | 84760 |
| 86 | 32856 | 42368 | 51024 | 59256 | 66592 | 71112 | 84760 |
| 87 | 32856 | 42368 | 51024 | 61664 | 66592 | 71112 | 84760 |
| 88 | 32856 | 42368 | 51024 | 61664 | 66592 | 73712 | 87936 |
| 89 | 34008 | 43816 | 52752 | 61664 | 68808 | 73712 | 87936 |
| 90 | 34008 | 43816 | 52752 | 63776 | 68808 | 73712 | 87936 |
| 91 | 34008 | 43816 | 52752 | 63776 | 68808 | 75376 | 90816 |
| 92 | 35160 | 45352 | 55056 | 63776 | 71112 | 75376 | 90816 |
| 93 | 35160 | 45352 | 55056 | 63776 | 71112 | 76208 | 90816 |
| 94 | 35160 | 45352 | 55056 | 66592 | 71112 | 76208 | 93800 |
| 95 | 36696 | 46888 | 55056 | 66592 | 71112 | 78704 | 93800 |
| 96 | 36696 | 46888 | 57336 | 66592 | 73712 | 78704 | 93800 |
| 97 | 36696 | 46888 | 57336 | 68808 | 73712 | 78704 | 93800 |
| 98 | 36696 | 46888 | 57336 | 68808 | 73712 | 81176 | 97896 |
| 99 | 37888 | 48936 | 57336 | 68808 | 75376 | 81176 | 97896 |
| 100 | 37888 | 48936 | 59256 | 68808 | 76208 | 81176 | 97896 |
| 101 | 37888 | 48936 | 59256 | 71112 | 76208 | 84760 | 97896 |
| 102 | 39232 | 48936 | 59256 | 71112 | 78704 | 84760 | 97896 |
| 103 | 39232 | 51024 | 61664 | 71112 | 78704 | 84760 | 97896 |
| 104 | 39232 | 51024 | 61664 | 73712 | 78704 | 84760 | 97896 |
| 105 | 39232 | 51024 | 61664 | 73712 | 78704 | 87936 | 97896 |
| 106 | 40576 | 51024 | 61664 | 73712 | 81176 | 87936 | 97896 |
| 107 | 40576 | 52752 | 63776 | 75376 | 81176 | 87936 | 97896 |
| 108 | 40576 | 52752 | 63776 | 75376 | 81176 | 87936 | 97896 |
| 109 | 40576 | 52752 | 63776 | 76208 | 81176 | 90816 | 97896 |
| 110 | 42368 | 52752 | 63776 | 76208 | 84760 | 90816 | 97896 |

Eighth Embodiment

In accordance with the eighth embodiment, a TBS is defined for supporting transmission efficiency of MCSs in Table 20. TBS indices 27 to 33 are newly defined for supporting 256QAM in accordance with the first embodiment.

Table 21 shows such TBS indices 27 to 33 newly defined for supporting 256QAM.

TABLE 20

| $I_{MCS}$ | modulation | R | $I_{TBS}$ |
|---|---|---|---|
| 18 | 64 QAM | 466 | 16 |
| 19 | 64 QAM | 541 | 27 |
| 20 | 64 QAM | 616 | 19 |

TABLE 20-continued

| $I_{MCS}$ | modulation | R | $I_{TBS}$ |
|---|---|---|---|
| 21 | 64 QAM | 694 | 28 |
| 22 | 64 QAM | 772 | 22 |
| 23 | 64 QAM | 841 | 29 |
| 24 | 64 QAM | 910 | 25 |
| 25 | 256 QAM | 750 | 30 |
| 26 | 256 QAM | 818 | 31 |
| 27 | 256 QAM | 885 | 32 |
| 28 | 256 QAM | 952 | 33 |

TABLE 21

| | $I_{TBS}$ | | | | | | |
|---|---|---|---|---|---|---|---|
| $N_{PRB}$ | 27 | 28 | 29 | 30 | 31 | 32 | 33 |
| 1 | 344 | 456 | 568 | 680 | 744 | 808 | 968 |
| 2 | 744 | 936 | 1160 | 1384 | 1480 | 1608 | 1992 |
| 3 | 1128 | 1416 | 1736 | 2088 | 2280 | 2472 | 2984 |
| 4 | 1480 | 1928 | 2344 | 2792 | 2984 | 3240 | 4008 |
| 5 | 1864 | 2408 | 2984 | 3496 | 3752 | 4136 | 4968 |
| 6 | 2280 | 2856 | 3496 | 4136 | 4584 | 4968 | 5992 |
| 7 | 2664 | 3368 | 4136 | 4968 | 5352 | 5736 | 6968 |
| 8 | 2984 | 3880 | 4776 | 5544 | 5992 | 6456 | 7992 |
| 9 | 3368 | 4392 | 5352 | 6200 | 6712 | 7480 | 8760 |
| 10 | 3752 | 4776 | 5992 | 6968 | 7480 | 8248 | 9912 |
| 11 | 4136 | 5352 | 6456 | 7736 | 8248 | 9144 | 10680 |
| 12 | 4584 | 5736 | 6968 | 8248 | 9144 | 9912 | 11832 |
| 13 | 4968 | 6200 | 7736 | 9144 | 9912 | 10680 | 12960 |
| 14 | 5352 | 6712 | 8248 | 9912 | 10680 | 11448 | 13536 |
| 15 | 5736 | 7224 | 8760 | 10296 | 11448 | 12216 | 14688 |
| 16 | 5992 | 7736 | 9528 | 11064 | 12216 | 12960 | 15840 |
| 17 | 6456 | 8248 | 9912 | 11832 | 12960 | 14112 | 16992 |
| 18 | 6712 | 8760 | 10680 | 12576 | 13536 | 14688 | 17568 |
| 19 | 7224 | 9144 | 11064 | 13536 | 14688 | 15840 | 19080 |
| 20 | 7480 | 9528 | 11832 | 14112 | 15264 | 16416 | 19848 |
| 21 | 7992 | 10296 | 12216 | 14688 | 15840 | 17568 | 20616 |
| 22 | 8248 | 10680 | 12960 | 15264 | 16992 | 18336 | 21384 |
| 23 | 8760 | 11064 | 13536 | 15840 | 17568 | 19080 | 22920 |
| 24 | 9144 | 11448 | 14112 | 16992 | 18336 | 19848 | 23688 |
| 25 | 9528 | 12216 | 14688 | 17568 | 19080 | 20616 | 24496 |
| 26 | 9912 | 12576 | 15264 | 18336 | 19848 | 21384 | 25456 |
| 27 | 10296 | 12960 | 15840 | 19080 | 20616 | 22152 | 26416 |
| 28 | 10680 | 13536 | 16416 | 19848 | 21384 | 22920 | 27376 |
| 29 | 11064 | 14112 | 16992 | 20616 | 22152 | 23688 | 28336 |
| 30 | 11448 | 14688 | 17568 | 20616 | 22920 | 24496 | 29296 |
| 31 | 11832 | 15264 | 18336 | 21384 | 23688 | 25456 | 30576 |
| 32 | 12216 | 15264 | 19080 | 22152 | 24496 | 26416 | 31704 |
| 33 | 12576 | 15840 | 19080 | 22920 | 25456 | 27376 | 32856 |
| 34 | 12960 | 16416 | 19848 | 23688 | 25456 | 28336 | 64008 |
| 35 | 12960 | 16992 | 20616 | 24496 | 26416 | 29296 | 35160 |
| 36 | 13536 | 17568 | 21384 | 25456 | 27376 | 29296 | 35160 |
| 37 | 14112 | 18336 | 21384 | 25456 | 28336 | 30576 | 36696 |
| 38 | 14112 | 18336 | 22152 | 26416 | 29296 | 31704 | 37888 |
| 39 | 14688 | 19080 | 22920 | 27376 | 29296 | 31704 | 39232 |
| 40 | 15264 | 19080 | 23688 | 28336 | 30576 | 32856 | 39232 |
| 41 | 15264 | 19848 | 24496 | 28336 | 31704 | 34008 | 40576 |
| 42 | 15840 | 20616 | 24496 | 29296 | 31704 | 35160 | 40576 |
| 43 | 16416 | 20616 | 25456 | 30576 | 32856 | 35160 | 42368 |
| 44 | 16416 | 21384 | 25456 | 30576 | 34008 | 36696 | 43816 |
| 45 | 16992 | 22152 | 26416 | 31704 | 34008 | 36696 | 43816 |
| 46 | 17568 | 22152 | 27376 | 31704 | 35160 | 37888 | 45352 |
| 47 | 17568 | 22920 | 27376 | 32856 | 35160 | 39232 | 46888 |
| 48 | 18336 | 22920 | 28336 | 34008 | 36696 | 39232 | 46888 |
| 49 | 18336 | 23688 | 29296 | 34008 | 37888 | 40576 | 48936 |
| 50 | 19080 | 24496 | 29296 | 35160 | 37888 | 40576 | 48936 |
| 51 | 19080 | 24496 | 30576 | 35160 | 39232 | 42368 | 51024 |
| 52 | 19848 | 25456 | 30576 | 36696 | 39232 | 43816 | 51024 |
| 53 | 19848 | 25456 | 31704 | 36696 | 40576 | 43816 | 52752 |
| 54 | 20616 | 26416 | 31704 | 3788 | 40576 | 45352 | 52752 |
| 55 | 20616 | 26416 | 32856 | 37888 | 42368 | 45352 | 55056 |
| 56 | 21384 | 27376 | 32856 | 39232 | 42368 | 46888 | 55056 |
| 57 | 21384 | 27376 | 34008 | 39232 | 43816 | 46888 | 57336 |
| 58 | 22152 | 28336 | 34008 | 40576 | 43816 | 46888 | 57336 |
| 59 | 22152 | 28336 | 35160 | 40576 | 45352 | 48936 | 59256 |
| 60 | 22920 | 29296 | 35160 | 42368 | 45352 | 48936 | 59256 |

TABLE 21-continued

| $N_{PRB}$ | 27 | 28 | 29 | 30 | 31 | 32 | 33 |
|---|---|---|---|---|---|---|---|
| 61 | 22920 | 29296 | 35160 | 42368 | 46888 | 51024 | 59256 |
| 62 | 23688 | 30576 | 36696 | 43816 | 46888 | 51024 | 61664 |
| 63 | 23688 | 30576 | 36696 | 43816 | 48936 | 52752 | 61664 |
| 64 | 24496 | 30576 | 37888 | 45352 | 48936 | 52752 | 63776 |
| 65 | 24496 | 31704 | 37888 | 45352 | 48936 | 52752 | 63776 |
| 66 | 24496 | 31704 | 39232 | 46888 | 51024 | 55056 | 63776 |
| 67 | 25456 | 32856 | 39232 | 46888 | 51024 | 55056 | 66592 |
| 68 | 25456 | 32856 | 40576 | 46888 | 52752 | 55056 | 66592 |
| 69 | 26416 | 34008 | 40576 | 48936 | 52752 | 57336 | 68808 |
| 70 | 26416 | 34008 | 40576 | 48936 | 52752 | 57336 | 68808 |
| 71 | 26416 | 34008 | 42368 | 48936 | 55056 | 59256 | 71112 |
| 72 | 27376 | 35160 | 42368 | 51024 | 55056 | 59256 | 71112 |
| 73 | 27376 | 35160 | 42368 | 51024 | 55056 | 59256 | 71112 |
| 74 | 28336 | 36696 | 43816 | 51024 | 57336 | 61664 | 73712 |
| 75 | 28336 | 36696 | 43816 | 52752 | 57336 | 61664 | 75376 |
| 76 | 28336 | 36696 | 45352 | 52752 | 57336 | 63776 | 76208 |
| 77 | 29296 | 37888 | 45352 | 52752 | 59256 | 63776 | 76208 |
| 78 | 29296 | 37888 | 45352 | 55056 | 59256 | 63776 | 76208 |
| 79 | 29296 | 37888 | 46888 | 55056 | 59256 | 66592 | 78704 |
| 80 | 30576 | 39232 | 46888 | 55056 | 61664 | 66592 | 78704 |
| 81 | 30576 | 39232 | 46888 | 57336 | 61664 | 66592 | 81176 |
| 82 | 30576 | 39232 | 48936 | 57336 | 61664 | 68808 | 81176 |
| 83 | 31704 | 40576 | 48936 | 57336 | 63776 | 68808 | 81176 |
| 84 | 31704 | 40576 | 48936 | 59256 | 63776 | 68808 | 81176 |
| 85 | 31704 | 40576 | 51024 | 59256 | 63776 | 71112 | 84760 |
| 86 | 32856 | 42368 | 51024 | 59256 | 66592 | 71112 | 84760 |
| 87 | 32856 | 42368 | 51024 | 61664 | 66592 | 71112 | 84760 |
| 88 | 32856 | 42368 | 51024 | 61664 | 66592 | 73712 | 87936 |
| 89 | 34008 | 43816 | 51664 | 61664 | 68808 | 73712 | 87936 |
| 90 | 34008 | 43816 | 52752 | 63776 | 68808 | 73712 | 87936 |
| 91 | 34008 | 43816 | 52752 | 63776 | 68808 | 75376 | 90816 |
| 92 | 35160 | 45352 | 55056 | 63776 | 71112 | 76208 | 90816 |
| 93 | 35160 | 45352 | 55056 | 63776 | 71112 | 76208 | 90816 |
| 94 | 35160 | 45352 | 55056 | 66592 | 71112 | 78704 | 93800 |
| 95 | 36696 | 46888 | 55056 | 66592 | 73712 | 78704 | 93800 |
| 96 | 36696 | 46888 | 57336 | 66592 | 73712 | 78704 | 93800 |
| 97 | 36696 | 46888 | 57336 | 68808 | 73712 | 81176 | 93800 |
| 98 | 36696 | 46888 | 57336 | 68808 | 75376 | 81176 | 97896 |
| 99 | 37888 | 48936 | 57336 | 68808 | 75376 | 81176 | 97896 |
| 100 | 37888 | 48936 | 59256 | 71112 | 76208 | 81176 | 97896 |
| 101 | 37888 | 48936 | 59256 | 71112 | 76208 | 84760 | 97896 |
| 102 | 39232 | 48936 | 59256 | 71112 | 78704 | 84760 | 97896 |
| 103 | 39232 | 51024 | 61664 | 71112 | 78704 | 84760 | 97896 |
| 104 | 39232 | 51024 | 61664 | 73712 | 78704 | 84760 | 97896 |
| 105 | 39232 | 51024 | 61664 | 73712 | 81176 | 87936 | 97896 |
| 106 | 40576 | 51024 | 61664 | 73712 | 81176 | 87936 | 97896 |
| 107 | 40576 | 52752 | 63776 | 75376 | 81176 | 87936 | 97896 |
| 108 | 40576 | 52752 | 63776 | 75376 | 81176 | 87936 | 97896 |
| 109 | 40576 | 52752 | 63776 | 76208 | 84760 | 90816 | 97896 |
| 110 | 42368 | 52752 | 63776 | 76208 | 84760 | 90816 | 97896 |

Ninth Embodiment

In accordance with the ninth embodiment, a TBS is defined for supporting transmission efficiency of MCSs in Table 22. TBS indices 27 to 33 are newly defined for supporting 256QAM in accordance with the first embodiment. Table 23 shows such TBS indices 27 to 33 newly defined for supporting 256QAM.

TABLE 22

| $I_{MCS}$ | Modulation | R | $I_{TBS}$ |
|---|---|---|---|
| 22 | 256 QAM | 710 | 27 |
| 23 | 256 QAM | 753 | 28 |
| 24 | 256 QAM | 797 | 29 |
| 25 | 256 QAM | 840 | 30 |
| 26 | 256 QAM | 882 | 31 |
| 27 | 256 QAM | 916 | 32 |
| 28 | 256 QAM | 948 | 33 |

TABLE 23

| $N_{PRB}$ | 27 | 28 | 29 | 30 | 31 | 32 | 33 |
|---|---|---|---|---|---|---|---|
| 1 | 648 | 680 | 712 | 776 | 808 | 840 | 968 |
| 2 | 1320 | 1384 | 1480 | 1544 | 1608 | 1672 | 1992 |
| 3 | 1992 | 2088 | 2216 | 2344 | 2472 | 2536 | 2984 |
| 4 | 2664 | 2792 | 2984 | 3112 | 3240 | 3368 | 4008 |
| 5 | 3368 | 3496 | 3752 | 3880 | 4136 | 4264 | 4968 |
| 6 | 4008 | 4264 | 4392 | 4776 | 4968 | 5160 | 5992 |
| 7 | 4584 | 4968 | 5160 | 5544 | 5736 | 5992 | 6968 |
| 8 | 5352 | 5544 | 5992 | 6200 | 6456 | 6712 | 7992 |
| 9 | 5992 | 6200 | 6712 | 6968 | 7480 | 7736 | 8760 |
| 10 | 6712 | 6968 | 7480 | 7736 | 8248 | 8504 | 9912 |
| 11 | 7224 | 7736 | 8248 | 8504 | 9144 | 9528 | 10680 |
| 12 | 7992 | 8504 | 8760 | 9528 | 9912 | 10296 | 11832 |
| 13 | 8504 | 9144 | 9528 | 10296 | 10680 | 11064 | 12960 |
| 14 | 9144 | 9912 | 10296 | 11064 | 11448 | 11832 | 13536 |
| 15 | 9912 | 10680 | 11064 | 11832 | 12216 | 12960 | 14688 |
| 16 | 10680 | 11064 | 11832 | 12576 | 12960 | 13536 | 15840 |
| 17 | 11064 | 11832 | 12576 | 13536 | 14112 | 14688 | 16992 |
| 18 | 11832 | 12576 | 13536 | 14112 | 14688 | 15264 | 17568 |
| 19 | 12576 | 13536 | 14112 | 14688 | 15840 | 16416 | 19080 |
| 20 | 12960 | 14112 | 14688 | 15840 | 16416 | 16992 | 19848 |
| 21 | 14112 | 14688 | 15840 | 16416 | 16992 | 18336 | 20616 |
| 22 | 14688 | 15264 | 16416 | 16992 | 18336 | 19080 | 21384 |
| 23 | 15264 | 16416 | 16992 | 18336 | 19080 | 19848 | 22920 |
| 24 | 15840 | 16992 | 17568 | 19080 | 19848 | 20616 | 23688 |
| 25 | 16416 | 17568 | 18336 | 19848 | 20616 | 21384 | 24496 |
| 26 | 16992 | 18336 | 19080 | 20616 | 21384 | 22152 | 25456 |
| 27 | 17568 | 19080 | 19848 | 21384 | 22152 | 22920 | 26416 |
| 28 | 18336 | 19848 | 20616 | 22152 | 22920 | 23688 | 27376 |
| 29 | 19080 | 20616 | 21384 | 22920 | 23688 | 24496 | 28336 |
| 30 | 19848 | 21384 | 22152 | 23688 | 24496 | 25456 | 29296 |
| 31 | 20616 | 21384 | 22920 | 24496 | 25456 | 26416 | 30576 |
| 32 | 21384 | 22152 | 23688 | 25456 | 26416 | 27376 | 31704 |
| 33 | 22152 | 22920 | 24496 | 25456 | 27376 | 28336 | 32856 |
| 34 | 22152 | 23688 | 25456 | 26416 | 28336 | 29296 | 34008 |
| 35 | 22920 | 24496 | 26416 | 27376 | 28336 | 29296 | 35160 |
| 36 | 23688 | 25456 | 26416 | 28336 | 29296 | 30576 | 35160 |
| 37 | 24496 | 26416 | 27376 | 29296 | 30576 | 31704 | 36696 |
| 38 | 25456 | 26416 | 28336 | 29296 | 31704 | 32856 | 37888 |
| 39 | 25456 | 27376 | 29296 | 30576 | 31704 | 32856 | 39232 |
| 40 | 26416 | 28336 | 29296 | 31704 | 32856 | 34008 | 39232 |
| 41 | 27376 | 28336 | 30576 | 31704 | 34008 | 35160 | 40576 |
| 42 | 27376 | 29296 | 31704 | 32856 | 34008 | 35160 | 40576 |
| 43 | 28336 | 30576 | 31704 | 34008 | 35160 | 36696 | 42368 |
| 44 | 29296 | 30576 | 32856 | 34008 | 36696 | 37888 | 43816 |
| 45 | 29296 | 31706 | 34008 | 35160 | 36696 | 37888 | 43816 |
| 46 | 30576 | 32856 | 34008 | 36696 | 37888 | 39232 | 45352 |
| 47 | 30576 | 32856 | 35160 | 36696 | 39232 | 40576 | 46888 |
| 48 | 31704 | 34008 | 35160 | 37888 | 39232 | 40576 | 46888 |
| 49 | 32856 | 34008 | 36696 | 37888 | 40576 | 42368 | 48936 |
| 50 | 32856 | 35160 | 36696 | 39232 | 40576 | 42368 | 48936 |
| 51 | 34008 | 35160 | 37888 | 40576 | 42368 | 43816 | 51024 |
| 52 | 34008 | 36696 | 39232 | 40576 | 42368 | 43816 | 51024 |
| 53 | 35160 | 36696 | 39232 | 42368 | 43816 | 45352 | 52752 |
| 54 | 35160 | 37888 | 40576 | 42368 | 43816 | 46888 | 52752 |
| 55 | 36696 | 39232 | 40576 | 43816 | 45352 | 46888 | 55056 |
| 56 | 36696 | 39232 | 42368 | 43816 | 45352 | 46888 | 55056 |
| 57 | 37888 | 40576 | 42368 | 45352 | 46888 | 48936 | 57336 |
| 58 | 37888 | 40576 | 43816 | 45352 | 46888 | 48936 | 57336 |
| 59 | 39232 | 40576 | 43816 | 45352 | 48936 | 51024 | 59256 |
| 60 | 39232 | 42368 | 45352 | 46888 | 48936 | 51024 | 59256 |
| 61 | 40576 | 42368 | 45352 | 46888 | 51024 | 52752 | 59256 |
| 62 | 40576 | 43816 | 45352 | 48936 | 51024 | 52752 | 61664 |
| 63 | 42368 | 43816 | 46888 | 48936 | 51024 | 52752 | 61664 |
| 64 | 42368 | 45352 | 46888 | 51024 | 52752 | 55056 | 63776 |
| 65 | 42368 | 45352 | 48936 | 51024 | 52752 | 55056 | 63776 |
| 66 | 43816 | 46888 | 48936 | 51024 | 55056 | 57336 | 63776 |
| 67 | 43816 | 46888 | 48936 | 52752 | 55056 | 57336 | 66592 |
| 68 | 45352 | 46888 | 51024 | 52752 | 55056 | 57336 | 66592 |
| 69 | 45352 | 48936 | 51024 | 55056 | 57336 | 59256 | 68808 |
| 70 | 46888 | 48936 | 52752 | 55056 | 57336 | 59256 | 68808 |
| 71 | 46888 | 48936 | 52752 | 55056 | 59256 | 61664 | 71112 |
| 72 | 46888 | 51024 | 52752 | 57336 | 59256 | 61664 | 71112 |
| 73 | 48936 | 51024 | 55056 | 57336 | 59256 | 61664 | 71112 |
| 74 | 48936 | 52752 | 55056 | 57336 | 61664 | 63776 | 73712 |
| 75 | 48936 | 52752 | 55056 | 59256 | 61664 | 63776 | 75376 |
| 76 | 51024 | 52752 | 57336 | 59256 | 61664 | 63776 | 76208 |

TABLE 23-continued

| | $I_{TBS}$ | | | | | | |
|---|---|---|---|---|---|---|---|
| $N_{PRB}$ | 27 | 28 | 29 | 30 | 31 | 32 | 33 |
| 77 | 51024 | 55056 | 57336 | 59256 | 63776 | 66592 | 76208 |
| 78 | 51024 | 55056 | 57336 | 61664 | 63776 | 66592 | 76208 |
| 79 | 52752 | 55056 | 59256 | 61664 | 63776 | 66592 | 78704 |
| 80 | 52752 | 57336 | 59256 | 61664 | 66592 | 68808 | 78704 |
| 81 | 52752 | 57336 | 59256 | 63776 | 66592 | 68808 | 81176 |
| 82 | 55056 | 57336 | 61664 | 63776 | 66592 | 71112 | 81176 |
| 83 | 55056 | 59256 | 61664 | 63776 | 68808 | 71112 | 81176 |
| 84 | 55056 | 59256 | 61664 | 66592 | 68808 | 71112 | 81176 |
| 85 | 57336 | 59256 | 63776 | 66592 | 71112 | 73712 | 84760 |
| 86 | 57336 | 59256 | 63776 | 66592 | 71112 | 73712 | 84760 |
| 87 | 57336 | 61664 | 63776 | 68808 | 71112 | 73712 | 84760 |
| 88 | 59256 | 61664 | 66592 | 68808 | 73712 | 75376 | 87936 |
| 89 | 59256 | 61664 | 66592 | 68808 | 73712 | 76208 | 87936 |
| 90 | 59256 | 63776 | 66592 | 71112 | 73712 | 76208 | 87936 |
| 91 | 59256 | 63776 | 66592 | 71112 | 75376 | 78704 | 90816 |
| 92 | 61664 | 63776 | 68808 | 71112 | 75376 | 78704 | 90816 |
| 93 | 61664 | 66592 | 68808 | 73712 | 76208 | 78704 | 90816 |
| 94 | 61664 | 66592 | 68808 | 73712 | 76208 | 81176 | 93800 |
| 95 | 63776 | 66592 | 71112 | 73712 | 78704 | 81176 | 93800 |
| 96 | 63776 | 66592 | 71112 | 75376 | 78704 | 81176 | 93800 |
| 97 | 63776 | 68808 | 71112 | 76208 | 78704 | 81176 | 93800 |
| 98 | 63776 | 68808 | 73712 | 76208 | 81176 | 84760 | 97896 |
| 99 | 66592 | 68808 | 73712 | 78704 | 81176 | 84760 | 97896 |
| 100 | 66592 | 71112 | 73712 | 78704 | 81176 | 84760 | 97896 |
| 101 | 66592 | 71112 | 75376 | 78704 | 84760 | 87936 | 97896 |
| 102 | 66592 | 71112 | 76208 | 81176 | 84760 | 87936 | 97896 |
| 103 | 68808 | 71112 | 76208 | 81176 | 84760 | 87936 | 97896 |
| 104 | 68808 | 73712 | 76208 | 81176 | 84760 | 87936 | 97896 |
| 105 | 68808 | 73712 | 78704 | 81176 | 87936 | 90816 | 97896 |
| 106 | 71112 | 73712 | 78704 | 84760 | 87936 | 90816 | 97896 |
| 107 | 71112 | 75376 | 78704 | 84760 | 87936 | 90816 | 97896 |
| 108 | 71112 | 76208 | 81176 | 84760 | 87936 | 93800 | 97896 |
| 109 | 71112 | 76208 | 81176 | 84760 | 90816 | 93800 | 97896 |
| 110 | 73712 | 76208 | 81176 | 84760 | 90816 | 93800 | 97896 |

Tenth Embodiment

In accordance with the tenth embodiment, a TBS is defined for supporting transmission efficiency of MCSs in Table 24. TBS indices 27 to 33 are newly defined for supporting 256QAM in accordance with the first embodiment. Table 25 shows such TBS indices 27 to 33 newly defined for supporting 256QAM.

TABLE 24

| $I_{MCS}$ | Modulation | R | $I_{TBS}$ |
|---|---|---|---|
| 22 | 256 QAM | 711 | 27 |
| 23 | 256 QAM | 755 | 28 |
| 24 | 256 QAM | 800 | 29 |
| 25 | 256 QAM | 844 | 30 |
| 26 | 256 QAM | 886 | 31 |
| 27 | 256 QAM | 920 | 32 |
| 28 | 256 QAM | 952 | 33 |

TABLE 25

| | $I_{TBS}$ | | | | | | |
|---|---|---|---|---|---|---|---|
| $N_{PRB}$ | 27 | 28 | 29 | 30 | 31 | 32 | 33 |
| 1 | 648 | 680 | 712 | 776 | 808 | 840 | 968 |
| 2 | 1320 | 1384 | 1480 | 1544 | 1608 | 1672 | 1992 |
| 3 | 1992 | 2088 | 2216 | 2344 | 2472 | 2536 | 2984 |
| 4 | 2664 | 2792 | 2984 | 3112 | 3240 | 3368 | 4008 |
| 5 | 3368 | 3496 | 3752 | 3880 | 4136 | 4264 | 4968 |
| 6 | 4008 | 4264 | 4392 | 4776 | 4968 | 5160 | 5992 |
| 7 | 4584 | 4968 | 5160 | 5544 | 5736 | 5992 | 6968 |

TABLE 25-continued

| | $I_{TBS}$ | | | | | | |
|---|---|---|---|---|---|---|---|
| $N_{PRB}$ | 27 | 28 | 29 | 30 | 31 | 32 | 33 |
| 8 | 5352 | 5544 | 5992 | 6200 | 6456 | 6712 | 7992 |
| 9 | 5992 | 6200 | 6712 | 6968 | 7480 | 7736 | 8760 |
| 10 | 6712 | 6968 | 7480 | 7736 | 8248 | 8504 | 9912 |
| 11 | 7224 | 7736 | 8248 | 8504 | 9144 | 9528 | 10680 |
| 12 | 7992 | 8504 | 8760 | 9528 | 9912 | 10296 | 11832 |
| 13 | 8504 | 9144 | 9528 | 10296 | 10680 | 11064 | 12960 |
| 14 | 9144 | 9912 | 10296 | 11064 | 11448 | 11832 | 13536 |
| 15 | 9912 | 10680 | 11064 | 11832 | 12216 | 12960 | 14688 |
| 16 | 10680 | 11064 | 11832 | 12576 | 12960 | 13536 | 15840 |
| 17 | 11064 | 11832 | 12576 | 13536 | 14112 | 14688 | 16992 |
| 18 | 11832 | 12576 | 13536 | 14112 | 14688 | 15264 | 17568 |
| 19 | 12576 | 13536 | 14112 | 14688 | 15840 | 16416 | 19080 |
| 20 | 12960 | 14112 | 14688 | 15840 | 16416 | 16992 | 19848 |
| 21 | 14112 | 14688 | 15840 | 16416 | 16992 | 18336 | 20616 |
| 22 | 14688 | 15264 | 16416 | 16992 | 18336 | 19080 | 21384 |
| 23 | 15264 | 16416 | 16992 | 18336 | 19080 | 19848 | 22920 |
| 24 | 15840 | 16992 | 17568 | 19080 | 19848 | 20616 | 23688 |
| 25 | 16416 | 17568 | 18336 | 19848 | 20616 | 21384 | 24496 |
| 26 | 16992 | 18336 | 19080 | 20616 | 21384 | 22152 | 25456 |
| 27 | 17568 | 19080 | 19848 | 21384 | 22152 | 22920 | 26416 |
| 28 | 18336 | 19848 | 20616 | 22152 | 22920 | 23688 | 27376 |
| 29 | 19080 | 20616 | 21384 | 22920 | 23688 | 24496 | 28336 |
| 30 | 19848 | 21384 | 22152 | 23688 | 24496 | 25456 | 29296 |
| 31 | 20616 | 21384 | 22920 | 24496 | 25456 | 26416 | 30576 |
| 32 | 21384 | 22152 | 23688 | 25456 | 26416 | 27376 | 31704 |
| 33 | 22152 | 22920 | 24496 | 25456 | 27376 | 28336 | 32856 |
| 34 | 22152 | 23688 | 25456 | 26416 | 28336 | 29296 | 34008 |
| 35 | 22920 | 24496 | 26416 | 27376 | 28336 | 29296 | 35160 |
| 36 | 23688 | 25456 | 26416 | 28336 | 29296 | 30576 | 35160 |
| 37 | 24496 | 26416 | 27376 | 29296 | 30576 | 31704 | 36696 |
| 38 | 25456 | 26416 | 28336 | 29296 | 31704 | 32856 | 37888 |
| 39 | 25456 | 27376 | 29296 | 30576 | 31704 | 32856 | 39232 |
| 40 | 26416 | 28336 | 29296 | 31704 | 32856 | 34008 | 39232 |
| 41 | 27376 | 28336 | 30576 | 31704 | 34008 | 35160 | 40576 |
| 42 | 27376 | 29296 | 31704 | 32856 | 34008 | 35160 | 42368 |
| 43 | 28336 | 30576 | 31704 | 34008 | 35160 | 36696 | 42368 |
| 44 | 29296 | 30576 | 32856 | 34008 | 36696 | 37888 | 43816 |
| 45 | 29296 | 31706 | 34008 | 35160 | 36696 | 37888 | 43816 |
| 46 | 30576 | 32856 | 34008 | 36696 | 37888 | 39232 | 45352 |
| 47 | 30576 | 32856 | 35160 | 36696 | 39232 | 40576 | 46888 |
| 48 | 31704 | 34008 | 35160 | 37888 | 39232 | 40576 | 46888 |
| 49 | 32856 | 34008 | 36696 | 37888 | 40576 | 42368 | 48936 |
| 50 | 32856 | 35160 | 36696 | 39232 | 40576 | 42368 | 48936 |
| 51 | 34008 | 35160 | 37888 | 40576 | 42368 | 43816 | 51024 |
| 52 | 34008 | 36696 | 39232 | 40576 | 42368 | 43816 | 51024 |
| 53 | 35160 | 36696 | 39232 | 42368 | 43816 | 45352 | 52752 |
| 54 | 35160 | 37888 | 40576 | 42368 | 43816 | 46888 | 52752 |
| 55 | 36696 | 39232 | 40576 | 43816 | 45352 | 46888 | 55056 |
| 56 | 36696 | 39232 | 42368 | 43816 | 45352 | 46888 | 55056 |
| 57 | 37888 | 40576 | 42368 | 45352 | 46888 | 48936 | 57336 |
| 58 | 37888 | 40576 | 43816 | 45352 | 46888 | 48936 | 57336 |
| 59 | 39232 | 40576 | 43816 | 46888 | 48936 | 51024 | 59256 |
| 60 | 39232 | 42368 | 45352 | 46888 | 48936 | 51024 | 59256 |
| 61 | 40576 | 42368 | 45352 | 46888 | 51024 | 52752 | 59256 |
| 62 | 40576 | 43816 | 45352 | 48936 | 51024 | 52752 | 61664 |
| 63 | 42368 | 43816 | 46888 | 48936 | 51024 | 52752 | 61664 |
| 64 | 42368 | 45352 | 46888 | 51024 | 52752 | 55056 | 63776 |
| 65 | 42368 | 45352 | 48936 | 51024 | 52752 | 55056 | 63776 |
| 66 | 43816 | 46888 | 48936 | 51024 | 55056 | 57336 | 63776 |
| 67 | 43816 | 46888 | 48936 | 52752 | 55056 | 57336 | 66592 |
| 68 | 45352 | 46888 | 51024 | 52752 | 55056 | 57336 | 66592 |
| 69 | 45352 | 48936 | 51024 | 55056 | 57336 | 59256 | 68808 |
| 70 | 46888 | 48936 | 52752 | 55056 | 57336 | 59256 | 68808 |
| 71 | 46888 | 48936 | 52752 | 55056 | 59256 | 61664 | 71112 |
| 72 | 46888 | 51024 | 52752 | 57336 | 59256 | 61664 | 71112 |
| 73 | 48936 | 51024 | 55056 | 57336 | 59256 | 61664 | 71112 |
| 74 | 48936 | 52752 | 55056 | 57336 | 61664 | 63776 | 73712 |
| 75 | 48936 | 52752 | 55056 | 59256 | 61664 | 63776 | 75376 |
| 76 | 51024 | 52752 | 57336 | 59256 | 61664 | 63776 | 76208 |
| 77 | 51024 | 55056 | 57336 | 59256 | 63776 | 66592 | 76208 |
| 78 | 51024 | 55056 | 57336 | 61664 | 63776 | 66592 | 76208 |
| 79 | 52752 | 55056 | 59256 | 61664 | 63776 | 66592 | 78704 |
| 80 | 52752 | 57336 | 59256 | 61664 | 66592 | 68808 | 78704 |
| 81 | 52752 | 57336 | 59256 | 63776 | 66592 | 68808 | 81176 |
| 82 | 55056 | 57336 | 61664 | 63776 | 66592 | 71112 | 81176 |
| 83 | 55056 | 59256 | 61664 | 63776 | 68808 | 71112 | 81176 |

TABLE 25-continued

| $N_{PRB}$ | 27 | 28 | 29 | 30 | 31 | 32 | 33 |
|---|---|---|---|---|---|---|---|
| 84 | 55056 | 59256 | 61664 | 66592 | 68808 | 71112 | 81176 |
| 85 | 57336 | 59256 | 63776 | 66592 | 71112 | 73712 | 84760 |
| 86 | 57336 | 59256 | 63776 | 66592 | 71112 | 73712 | 84760 |
| 87 | 57336 | 61664 | 63776 | 68808 | 71112 | 73712 | 84760 |
| 88 | 59256 | 61664 | 66592 | 68808 | 73712 | 75376 | 87936 |
| 89 | 59256 | 61664 | 66592 | 68808 | 73712 | 76208 | 87936 |
| 90 | 59256 | 63776 | 66592 | 71112 | 73712 | 76208 | 87936 |
| 91 | 59256 | 63776 | 66592 | 75376 | 78704 | 90816 |  |
| 92 | 61664 | 63776 | 68808 | 71112 | 75376 | 78704 | 90816 |
| 93 | 61664 | 66592 | 68808 | 73712 | 76208 | 78704 | 90816 |
| 94 | 61664 | 66592 | 68808 | 73712 | 76208 | 81176 | 93800 |
| 95 | 63776 | 66592 | 71112 | 73712 | 78704 | 81176 | 93800 |
| 96 | 63776 | 66592 | 71112 | 75376 | 78704 | 81176 | 93800 |
| 97 | 63776 | 68808 | 71112 | 76208 | 78704 | 81176 | 93800 |
| 98 | 63776 | 68808 | 73712 | 76208 | 81176 | 84760 | 97896 |
| 99 | 66592 | 68808 | 73712 | 78704 | 81176 | 84760 | 97896 |
| 100 | 66592 | 71112 | 73712 | 78704 | 81176 | 84760 | 97896 |
| 101 | 66592 | 71112 | 75376 | 78704 | 84760 | 87936 | 97896 |
| 102 | 66592 | 71112 | 76208 | 81176 | 84760 | 87936 | 97896 |
| 103 | 68808 | 71112 | 76208 | 81176 | 84760 | 87936 | 97896 |
| 104 | 68808 | 73712 | 76208 | 81176 | 84760 | 87936 | 97896 |
| 105 | 68808 | 73712 | 78704 | 81176 | 87936 | 90816 | 97896 |
| 106 | 71112 | 73712 | 78704 | 84760 | 87936 | 90816 | 97896 |
| 107 | 71112 | 75376 | 78704 | 84760 | 87936 | 90816 | 97896 |
| 108 | 71112 | 76208 | 81176 | 84760 | 87936 | 93800 | 97896 |
| 109 | 71112 | 76208 | 81176 | 84760 | 90816 | 93800 | 97896 |
| 110 | 73712 | 78704 | 81176 | 87936 | 90816 | 93800 | 97896 |

Eleventh Embodiment

In accordance with the eleventh embodiment, a TBS is defined for supporting transmission efficiency of MCSs of Table 26. TBS indices 27 to 33 are newly defined for supporting 256QAM in accordance with the first embodiment. Table 27 shows such TBS indices 27 to 33 newly defined for supporting 256QAM.

TABLE 26

| $I_{MCS}$ | Modulation | R | $I_{TBS}$ |
|---|---|---|---|
| 22 | 256 QAM | 710 | 27 |
| 23 | 256 QAM | 754 | 28 |
| 24 | 256 QAM | 797 | 29 |
| 25 | 256 QAM | 840 | 30 |
| 26 | 256 QAM | 882 | 31 |
| 27 | 256 QAM | 915 | 32 |
| 28 | 256 QAM | 948 | 33 |

TABLE 27

| $N_{PRB}$ | 27 | 28 | 29 | 30 | 31 | 32 | 33 |
|---|---|---|---|---|---|---|---|
| 1 | 648 | 680 | 712 | 776 | 808 | 840 | 968 |
| 2 | 1320 | 1384 | 1480 | 1544 | 1608 | 1672 | 1992 |
| 3 | 1992 | 2088 | 2216 | 2344 | 2472 | 2536 | 2984 |
| 4 | 2664 | 2792 | 2984 | 3112 | 3240 | 3368 | 4008 |
| 5 | 3368 | 3496 | 3752 | 3880 | 4136 | 4264 | 4968 |
| 6 | 4008 | 4264 | 4392 | 4776 | 4968 | 5160 | 5992 |
| 7 | 4584 | 4968 | 5160 | 5544 | 5736 | 5992 | 6968 |
| 8 | 5352 | 5544 | 5992 | 6200 | 6456 | 6712 | 7992 |
| 9 | 5992 | 6200 | 6712 | 6968 | 7480 | 7736 | 8760 |
| 10 | 6712 | 6968 | 7480 | 7736 | 8248 | 8504 | 9912 |
| 11 | 7224 | 7736 | 8248 | 8504 | 9144 | 9528 | 10680 |
| 12 | 7992 | 8504 | 8760 | 9528 | 9912 | 10296 | 11832 |
| 13 | 8504 | 9144 | 9528 | 10296 | 10680 | 11064 | 12960 |
| 14 | 9144 | 9912 | 10296 | 11064 | 11448 | 11832 | 13536 |

TABLE 27-continued

| $N_{PRB}$ | 27 | 28 | 29 | 30 | 31 | 32 | 33 |
|---|---|---|---|---|---|---|---|
| 15 | 9912 | 10680 | 11064 | 11832 | 12216 | 12960 | 14688 |
| 16 | 10680 | 11064 | 11832 | 12575 | 12960 | 13535 | 15840 |
| 17 | 11064 | 11832 | 12576 | 13536 | 14112 | 14688 | 16992 |
| 18 | 11832 | 12576 | 13536 | 14112 | 14688 | 15264 | 17568 |
| 19 | 12576 | 13536 | 14112 | 14688 | 15840 | 16416 | 19080 |
| 20 | 12960 | 14112 | 14688 | 15840 | 16416 | 16992 | 19848 |
| 21 | 14112 | 14688 | 15840 | 16416 | 16992 | 18336 | 20616 |
| 22 | 14688 | 15264 | 16416 | 16992 | 18336 | 19080 | 21384 |
| 23 | 15264 | 16416 | 16992 | 18336 | 19080 | 19848 | 22920 |
| 24 | 15840 | 16992 | 17568 | 19080 | 19848 | 20616 | 23688 |
| 25 | 16416 | 17568 | 18336 | 19848 | 20616 | 21384 | 24496 |
| 26 | 16992 | 18336 | 19080 | 20616 | 21384 | 22152 | 25456 |
| 27 | 17568 | 19080 | 19848 | 21384 | 22152 | 22920 | 26416 |
| 28 | 18336 | 19848 | 20616 | 22152 | 22920 | 23688 | 27376 |
| 29 | 19080 | 20616 | 21384 | 22920 | 23688 | 24496 | 28336 |
| 30 | 19848 | 21384 | 22152 | 23688 | 24496 | 25456 | 29296 |
| 31 | 20616 | 21384 | 22920 | 24496 | 25456 | 26416 | 30576 |
| 32 | 21384 | 22152 | 23688 | 25456 | 26416 | 27376 | 31704 |
| 33 | 22152 | 22920 | 24496 | 25456 | 27376 | 28336 | 32856 |
| 34 | 22152 | 23688 | 25456 | 26416 | 28336 | 29296 | 34008 |
| 35 | 22920 | 24496 | 26416 | 27376 | 28336 | 29296 | 35160 |
| 36 | 23688 | 25456 | 26416 | 28336 | 29296 | 30576 | 35160 |
| 37 | 24496 | 26416 | 27376 | 29296 | 30576 | 31704 | 36696 |
| 38 | 25456 | 26416 | 28336 | 29296 | 31704 | 32856 | 37888 |
| 39 | 25456 | 27376 | 29296 | 30576 | 31704 | 32856 | 39232 |
| 40 | 26416 | 28336 | 29296 | 31704 | 32856 | 34008 | 39232 |
| 41 | 27376 | 28336 | 30576 | 31704 | 34008 | 35160 | 40576 |
| 42 | 27376 | 29296 | 31704 | 32856 | 34008 | 35160 | 40576 |
| 43 | 28336 | 30576 | 31704 | 34008 | 35160 | 36696 | 42368 |
| 44 | 29296 | 30576 | 32856 | 34008 | 36696 | 37888 | 43816 |
| 45 | 29296 | 31706 | 34008 | 35160 | 36696 | 37888 | 43816 |
| 46 | 30576 | 32856 | 34008 | 36696 | 37888 | 39232 | 45352 |
| 47 | 30576 | 32856 | 35160 | 36696 | 39232 | 40576 | 46888 |
| 48 | 31704 | 34008 | 35160 | 37888 | 39232 | 40576 | 46888 |
| 49 | 32856 | 34008 | 36696 | 37888 | 40576 | 42368 | 48936 |
| 50 | 32856 | 35160 | 36696 | 39232 | 40576 | 42368 | 48936 |
| 51 | 34008 | 35160 | 37888 | 40576 | 42368 | 43816 | 51024 |
| 52 | 34008 | 36696 | 39232 | 40576 | 42368 | 43816 | 51024 |
| 53 | 35160 | 36696 | 39232 | 42368 | 43816 | 45352 | 52752 |
| 54 | 35160 | 37888 | 40576 | 42368 | 43816 | 46888 | 52752 |
| 55 | 36696 | 39232 | 40576 | 43816 | 45352 | 46888 | 55056 |
| 56 | 36696 | 39232 | 42368 | 43816 | 45352 | 46888 | 55056 |
| 57 | 37888 | 40576 | 42368 | 45352 | 46888 | 48936 | 57336 |
| 58 | 37888 | 40576 | 43816 | 45352 | 46888 | 48936 | 57336 |
| 59 | 39232 | 40576 | 43816 | 46888 | 48936 | 51024 | 59256 |
| 60 | 39232 | 42368 | 45352 | 46888 | 48936 | 51024 | 59256 |
| 61 | 40576 | 42368 | 45352 | 46888 | 51024 | 52752 | 59256 |
| 62 | 40576 | 43816 | 45352 | 48936 | 51024 | 52752 | 61664 |
| 63 | 42368 | 43816 | 46888 | 48936 | 51024 | 52752 | 61664 |
| 64 | 42368 | 45352 | 46888 | 51024 | 52752 | 55056 | 63776 |
| 65 | 42368 | 45352 | 48936 | 51024 | 52752 | 55056 | 63776 |
| 66 | 43816 | 46888 | 48936 | 51024 | 55056 | 57336 | 63776 |
| 67 | 43816 | 46888 | 48936 | 52752 | 55056 | 57336 | 66592 |
| 68 | 45352 | 46888 | 51024 | 52752 | 55056 | 57336 | 66592 |
| 69 | 45352 | 48936 | 51024 | 55056 | 57336 | 59256 | 68808 |
| 70 | 46888 | 48936 | 52752 | 55056 | 57336 | 59256 | 68808 |
| 71 | 46888 | 48936 | 52752 | 57336 | 59256 | 61664 | 71112 |
| 72 | 46888 | 51024 | 52752 | 57336 | 59256 | 61664 | 71112 |
| 73 | 48936 | 51024 | 55056 | 57336 | 59256 | 61664 | 71112 |
| 74 | 48936 | 52752 | 55056 | 57336 | 61664 | 63776 | 73712 |
| 75 | 48936 | 52752 | 55056 | 59256 | 61664 | 63776 | 75376 |
| 76 | 51024 | 52752 | 57336 | 59256 | 61664 | 63776 | 76208 |
| 77 | 51024 | 55056 | 57336 | 59256 | 63776 | 66592 | 76208 |
| 78 | 51024 | 55056 | 57336 | 61664 | 63776 | 66592 | 76208 |
| 79 | 52752 | 55056 | 59256 | 61664 | 63776 | 66592 | 78704 |
| 80 | 52752 | 57336 | 59256 | 61664 | 66592 | 68808 | 78704 |
| 81 | 52752 | 57336 | 59256 | 63776 | 66592 | 68808 | 81176 |
| 82 | 55056 | 57336 | 61664 | 63776 | 66592 | 71112 | 81176 |
| 83 | 55056 | 59256 | 61664 | 63776 | 68808 | 71112 | 81176 |
| 84 | 55056 | 59256 | 61664 | 66592 | 68808 | 71112 | 81176 |
| 85 | 57336 | 59256 | 63776 | 66592 | 71112 | 73712 | 84760 |
| 86 | 57336 | 59256 | 63776 | 66592 | 71112 | 73712 | 84760 |
| 87 | 57336 | 61664 | 63776 | 68808 | 71112 | 73712 | 84760 |
| 88 | 59256 | 61664 | 66592 | 68808 | 73712 | 75376 | 87936 |
| 89 | 59256 | 61664 | 66592 | 68808 | 73712 | 76208 | 87936 |
| 90 | 59256 | 63776 | 66592 | 71112 | 73712 | 76208 | 87936 |

TABLE 27-continued

| $N_{PRB}$ | 27 | 28 | 29 | 30 | 31 | 32 | 33 |
|---|---|---|---|---|---|---|---|
| 91 | 59256 | 63776 | 66592 | 71112 | 75376 | 78704 | 90816 |
| 92 | 61664 | 63776 | 68808 | 71112 | 75376 | 78704 | 90816 |
| 93 | 61664 | 66592 | 68808 | 73712 | 76208 | 78704 | 90816 |
| 94 | 61664 | 66592 | 68808 | 73712 | 76208 | 81176 | 93800 |
| 95 | 63776 | 66592 | 71112 | 73712 | 78704 | 81176 | 93800 |
| 96 | 63776 | 66592 | 71112 | 75376 | 78704 | 81176 | 93800 |
| 97 | 63776 | 68808 | 71112 | 76208 | 78704 | 81176 | 93800 |
| 98 | 63776 | 68808 | 73712 | 76208 | 81176 | 84760 | 97896 |
| 99 | 66592 | 68808 | 73712 | 78704 | 81176 | 84760 | 97896 |
| 100 | 66592 | 71112 | 73712 | 78704 | 81176 | 84760 | 97896 |
| 101 | 66592 | 71112 | 75376 | 78704 | 84760 | 87936 | 97896 |
| 102 | 66592 | 71112 | 76208 | 81176 | 84760 | 87936 | 97896 |
| 103 | 68808 | 71112 | 76208 | 81176 | 84760 | 87936 | 97896 |
| 104 | 68808 | 73712 | 76208 | 81176 | 84760 | 87936 | 97896 |
| 105 | 68808 | 73712 | 78704 | 81176 | 87936 | 90816 | 97896 |
| 106 | 71112 | 73712 | 78704 | 84760 | 87936 | 90816 | 97896 |
| 107 | 71112 | 75376 | 78704 | 84760 | 87936 | 90816 | 97896 |
| 108 | 71112 | 76208 | 81176 | 84760 | 87936 | 93800 | 97896 |
| 109 | 71112 | 76208 | 81176 | 84760 | 90816 | 93800 | 97896 |
| 110 | 73712 | 76208 | 81176 | 84760 | 90816 | 93800 | 97896 |

Twelfth Embodiment

In accordance with the twelfth embodiment, a TBS is defined for supporting transmission efficiency of MCSs in Table 28. TBS indices 27 to 33 are newly defined for supporting 256QAM in accordance with the first embodiment. Table 29 shows such TBS indices 27 to 33 newly defined for supporting 256QAM.

TABLE 28

| $I_{MCS}$ | Modulation | R | $I_{TBS}$ |
|---|---|---|---|
| 22 | 256 QAM | 711 | 27 |
| 23 | 256 QAM | 756 | 28 |
| 24 | 256 QAM | 800 | 29 |
| 25 | 256 QAM | 843 | 30 |
| 26 | 256 QAM | 886 | 31 |
| 27 | 256 QAM | 919 | 32 |
| 28 | 256 QAM | 952 | 33 |

TABLE 29

| $N_{PRB}$ | 27 | 28 | 29 | 30 | 31 | 32 | 33 |
|---|---|---|---|---|---|---|---|
| 1 | 648 | 680 | 712 | 776 | 808 | 840 | 968 |
| 2 | 1320 | 1384 | 1480 | 1544 | 1608 | 1672 | 1992 |
| 3 | 1992 | 2088 | 2216 | 2344 | 2472 | 2536 | 2984 |
| 4 | 2664 | 2792 | 2984 | 3112 | 3240 | 3368 | 4008 |
| 5 | 3368 | 3496 | 3752 | 3880 | 4136 | 4264 | 4968 |
| 6 | 4008 | 4264 | 4392 | 4776 | 4968 | 5160 | 5992 |
| 7 | 4584 | 4968 | 5160 | 5544 | 5736 | 5992 | 6968 |
| 8 | 5352 | 5544 | 5992 | 6200 | 6456 | 6712 | 7992 |
| 9 | 5992 | 6200 | 6712 | 6968 | 7480 | 7736 | 8760 |
| 10 | 6712 | 6968 | 7480 | 7736 | 8248 | 8504 | 9912 |
| 11 | 7224 | 7736 | 8248 | 8504 | 9144 | 9528 | 10680 |
| 12 | 7992 | 8504 | 8760 | 9528 | 9912 | 10296 | 11832 |
| 13 | 8504 | 9144 | 9528 | 10296 | 10680 | 11064 | 12960 |
| 14 | 9144 | 9912 | 10296 | 11064 | 11448 | 11832 | 13536 |
| 15 | 9912 | 10680 | 11064 | 11832 | 12216 | 12960 | 14688 |
| 16 | 10680 | 11064 | 11832 | 12575 | 12960 | 13535 | 15840 |
| 17 | 11064 | 11832 | 12576 | 13536 | 14112 | 14688 | 16992 |
| 18 | 11832 | 12576 | 13536 | 14112 | 14688 | 15264 | 17568 |
| 19 | 12576 | 13536 | 14112 | 14688 | 15840 | 16416 | 19080 |
| 20 | 12960 | 14112 | 14688 | 15840 | 16416 | 16992 | 19848 |
| 21 | 14112 | 14688 | 15840 | 16416 | 16992 | 18336 | 20616 |

TABLE 29-continued

| $N_{PRB}$ | 27 | 28 | 29 | 30 | 31 | 32 | 33 |
|---|---|---|---|---|---|---|---|
| 22 | 14688 | 15264 | 16416 | 16992 | 18336 | 19080 | 21384 |
| 23 | 15264 | 16416 | 16992 | 18336 | 19080 | 19848 | 22920 |
| 24 | 15840 | 16992 | 17568 | 19080 | 19848 | 20616 | 23688 |
| 25 | 16416 | 17568 | 18336 | 19848 | 20616 | 21384 | 24496 |
| 26 | 16992 | 18336 | 19080 | 20616 | 21384 | 22152 | 25456 |
| 27 | 17568 | 19080 | 19848 | 21384 | 22152 | 22920 | 26416 |
| 28 | 18336 | 19848 | 20616 | 22152 | 22920 | 23688 | 27376 |
| 29 | 19080 | 20616 | 21384 | 22920 | 23688 | 24496 | 28336 |
| 30 | 19848 | 21384 | 22152 | 23688 | 24496 | 25456 | 29296 |
| 31 | 20616 | 21384 | 22920 | 24496 | 25456 | 26416 | 30576 |
| 32 | 21384 | 22152 | 23688 | 25456 | 26416 | 27376 | 31704 |
| 33 | 22152 | 22920 | 24496 | 25456 | 27376 | 28336 | 32856 |
| 34 | 22152 | 23688 | 25456 | 26416 | 28336 | 29296 | 34008 |
| 35 | 22920 | 24496 | 26416 | 27376 | 29296 | 30576 | 35160 |
| 36 | 23688 | 25456 | 26416 | 28336 | 29296 | 30576 | 35160 |
| 37 | 24496 | 26416 | 27376 | 29296 | 30576 | 31704 | 36696 |
| 38 | 25456 | 26416 | 28336 | 29296 | 31704 | 32856 | 37888 |
| 39 | 25456 | 27376 | 29296 | 30576 | 31704 | 32856 | 39232 |
| 40 | 26416 | 28336 | 29296 | 31704 | 32856 | 34008 | 39232 |
| 41 | 27376 | 28336 | 30576 | 31704 | 34008 | 35160 | 40576 |
| 42 | 27376 | 29296 | 31704 | 32856 | 34008 | 35160 | 40576 |
| 43 | 28336 | 30576 | 31704 | 34008 | 35160 | 36696 | 42368 |
| 44 | 29296 | 30576 | 32856 | 34008 | 36696 | 37888 | 43816 |
| 45 | 29296 | 31706 | 34008 | 35160 | 36696 | 37888 | 43816 |
| 46 | 30576 | 32856 | 34008 | 36696 | 37888 | 39232 | 45352 |
| 47 | 30576 | 32856 | 35160 | 36696 | 39232 | 40576 | 46888 |
| 48 | 31704 | 34008 | 35160 | 37888 | 39232 | 40576 | 46888 |
| 49 | 32856 | 34008 | 36696 | 37888 | 40576 | 42368 | 48936 |
| 50 | 32856 | 35160 | 36696 | 39232 | 40576 | 42368 | 48936 |
| 51 | 34008 | 35160 | 37888 | 40576 | 42368 | 43816 | 51024 |
| 52 | 34008 | 36696 | 39232 | 40576 | 42368 | 43816 | 51024 |
| 53 | 35160 | 36696 | 39232 | 42368 | 43816 | 45352 | 52752 |
| 54 | 35160 | 37888 | 40576 | 42368 | 43816 | 46888 | 52752 |
| 55 | 36696 | 39232 | 40576 | 43816 | 45352 | 46888 | 55056 |
| 56 | 36696 | 39232 | 42368 | 43816 | 45352 | 46888 | 55056 |
| 57 | 37888 | 40576 | 42368 | 45352 | 46888 | 48936 | 57336 |
| 58 | 37888 | 40576 | 43816 | 45352 | 46888 | 48936 | 57336 |
| 59 | 39232 | 40576 | 43816 | 46888 | 48936 | 51024 | 59256 |
| 60 | 39232 | 42368 | 45352 | 46888 | 48936 | 51024 | 59256 |
| 61 | 40576 | 42368 | 45352 | 46888 | 51024 | 52752 | 59256 |
| 62 | 40576 | 43816 | 45352 | 48936 | 51024 | 52752 | 61664 |
| 63 | 42368 | 43816 | 46888 | 48936 | 51024 | 52752 | 61664 |
| 64 | 42368 | 45352 | 46888 | 51024 | 52752 | 55056 | 63776 |
| 65 | 42368 | 45352 | 48936 | 51024 | 52752 | 55056 | 63776 |
| 66 | 43816 | 46888 | 48936 | 51024 | 55056 | 57336 | 63776 |
| 67 | 43816 | 46888 | 48936 | 52752 | 55056 | 57336 | 66592 |
| 68 | 45352 | 46888 | 51024 | 52752 | 55056 | 57336 | 66592 |
| 69 | 45352 | 48936 | 51024 | 55056 | 57336 | 59256 | 68808 |
| 70 | 46888 | 48936 | 52752 | 55056 | 57336 | 59256 | 68808 |
| 71 | 46888 | 48936 | 52752 | 55056 | 59256 | 61664 | 71112 |
| 72 | 46888 | 51024 | 52752 | 57336 | 59256 | 61664 | 71112 |
| 73 | 48936 | 51024 | 55056 | 57336 | 59256 | 61664 | 71112 |
| 74 | 48936 | 52752 | 55056 | 57336 | 61664 | 63776 | 73712 |
| 75 | 48936 | 52752 | 55056 | 59256 | 61664 | 63776 | 75376 |
| 76 | 51024 | 52752 | 57336 | 59256 | 61664 | 63776 | 76208 |
| 77 | 51024 | 55056 | 57336 | 59256 | 63776 | 66592 | 76208 |
| 78 | 51024 | 55056 | 57336 | 61664 | 63776 | 66592 | 76208 |
| 79 | 52752 | 55056 | 59256 | 61664 | 63776 | 66592 | 78704 |
| 80 | 52752 | 57336 | 59256 | 61664 | 66592 | 68808 | 78704 |
| 81 | 52752 | 57336 | 59256 | 63776 | 66592 | 68808 | 81176 |
| 82 | 55056 | 57336 | 61664 | 63776 | 66592 | 71112 | 81176 |
| 83 | 55056 | 59256 | 61664 | 63776 | 68808 | 71112 | 81176 |
| 84 | 55056 | 59256 | 61664 | 66592 | 68808 | 71112 | 81176 |
| 85 | 57336 | 59256 | 63776 | 66592 | 71112 | 73712 | 84760 |
| 86 | 57336 | 59256 | 63776 | 66592 | 71112 | 73712 | 84760 |
| 87 | 57336 | 61664 | 63776 | 68808 | 71112 | 73712 | 84760 |
| 88 | 59256 | 61664 | 66592 | 68808 | 73712 | 75376 | 87936 |
| 89 | 59256 | 61664 | 66592 | 68808 | 73712 | 76208 | 87936 |
| 90 | 59256 | 63776 | 66592 | 71112 | 73712 | 76208 | 87936 |
| 91 | 59256 | 63776 | 66592 | 71112 | 75376 | 78704 | 90816 |
| 92 | 61664 | 63776 | 68808 | 71112 | 75376 | 78704 | 90816 |
| 93 | 61664 | 66592 | 68808 | 73712 | 76208 | 78704 | 90816 |
| 94 | 61664 | 66592 | 68808 | 73712 | 76208 | 81176 | 93800 |
| 95 | 63776 | 66592 | 71112 | 73712 | 78704 | 81176 | 93800 |
| 96 | 63776 | 66592 | 71112 | 75376 | 78704 | 81176 | 93800 |
| 97 | 63776 | 68808 | 71112 | 76208 | 78704 | 81176 | 93800 |

TABLE 29-continued

| $N_{PRB}$ | 27 | 28 | 29 | 30 | 31 | 32 | 33 |
|---|---|---|---|---|---|---|---|
| 98 | 63776 | 68808 | 73712 | 76208 | 81176 | 84760 | 97896 |
| 99 | 66592 | 68808 | 73712 | 78704 | 81176 | 84760 | 97896 |
| 100 | 66592 | 71112 | 73712 | 78704 | 81176 | 84760 | 97896 |
| 101 | 66592 | 71112 | 75376 | 78704 | 84760 | 87936 | 97896 |
| 102 | 66592 | 71112 | 76208 | 81176 | 84760 | 87936 | 97896 |
| 103 | 68808 | 71112 | 76208 | 81176 | 84760 | 87936 | 97896 |
| 104 | 68808 | 73712 | 76208 | 81176 | 84760 | 87936 | 97896 |
| 105 | 68808 | 73712 | 78704 | 81176 | 87936 | 90816 | 97896 |
| 106 | 71112 | 73712 | 78704 | 84760 | 87936 | 90816 | 97896 |
| 107 | 71112 | 75376 | 78704 | 84760 | 87936 | 90816 | 97896 |
| 108 | 71112 | 76208 | 81176 | 84760 | 87936 | 93800 | 97896 |
| 109 | 71112 | 76208 | 81176 | 84760 | 90816 | 93800 | 97896 |
| 110 | 73712 | 78704 | 81176 | 87936 | 90816 | 93800 | 97896 |

Thirteenth Embodiment

In accordance with the thirteenth embodiment, a TBS is defined for supporting transmission efficiency of MCSs in Table 30. TBS indices 27 to 33 are newly defined for supporting 256QAM in accordance with the first embodiment. Table 31 shows such TBS indices 27 to 33 newly defined for supporting 256QAM.

TABLE 30

| $I_{MCS}$ | Modulation | R | $I_{TBS}$ |
|---|---|---|---|
| 22 | 256 QAM | 711 | 27 |
| 23 | 256 QAM | 753 | 28 |
| 24 | 256 QAM | 797 | 29 |
| 25 | 256 QAM | 840 | 30 |
| 26 | 256 QAM | 882 | 31 |
| 27 | 256 QAM | 916 | 32 |
| 28 | 256 QAM | 948 | 33 |

TABLE 31

| $N_{PRB}$ | 27 | 28 | 29 | 30 | 31 | 32 | 33 |
|---|---|---|---|---|---|---|---|
| 1 | 648 | 680 | 712 | 776 | 808 | 840 | 968 |
| 2 | 1320 | 1384 | 1480 | 1544 | 1608 | 1672 | 1992 |
| 3 | 1992 | 2088 | 2216 | 2344 | 2472 | 2536 | 2984 |
| 4 | 2664 | 2792 | 2984 | 3112 | 3240 | 3368 | 4008 |
| 5 | 3368 | 3496 | 3752 | 3880 | 4136 | 4264 | 4968 |
| 6 | 4008 | 4264 | 4392 | 4776 | 4968 | 5160 | 5992 |
| 7 | 4584 | 4968 | 5160 | 5544 | 5736 | 5992 | 6968 |
| 8 | 5352 | 5544 | 5992 | 6200 | 6456 | 6712 | 7992 |
| 9 | 5992 | 6200 | 6712 | 6968 | 7480 | 7736 | 8760 |
| 10 | 6712 | 6968 | 7480 | 7736 | 8248 | 8504 | 9912 |
| 11 | 7224 | 7736 | 8248 | 8504 | 9144 | 9528 | 10680 |
| 12 | 7992 | 8504 | 8760 | 9528 | 9912 | 10296 | 11832 |
| 13 | 8504 | 9144 | 9528 | 10296 | 10680 | 11064 | 12960 |
| 14 | 9144 | 9912 | 10296 | 11064 | 11448 | 11832 | 13536 |
| 15 | 9912 | 10680 | 11832 | 11064 | 12216 | 12960 | 14688 |
| 16 | 10680 | 11064 | 11832 | 12575 | 12960 | 13535 | 15840 |
| 17 | 11064 | 11832 | 12576 | 13536 | 14112 | 14688 | 16992 |
| 18 | 11832 | 12576 | 13536 | 14112 | 14688 | 15264 | 17568 |
| 19 | 12576 | 13536 | 14112 | 14688 | 15840 | 16416 | 19080 |
| 20 | 12960 | 14112 | 14688 | 15840 | 16416 | 16992 | 19848 |
| 21 | 14112 | 14688 | 15840 | 16416 | 16992 | 18336 | 20616 |
| 22 | 14688 | 15264 | 16416 | 16992 | 18336 | 19080 | 21384 |
| 23 | 15264 | 16416 | 16992 | 18336 | 19080 | 19848 | 22920 |
| 24 | 15840 | 16992 | 17568 | 19080 | 19848 | 20616 | 23688 |
| 25 | 16416 | 17568 | 18336 | 19848 | 20616 | 21384 | 24496 |
| 26 | 16992 | 18336 | 19080 | 20616 | 21384 | 22152 | 25456 |
| 27 | 17568 | 19080 | 19848 | 21384 | 22152 | 22920 | 26416 |
| 28 | 18336 | 19848 | 20616 | 22152 | 22920 | 23688 | 27376 |

TABLE 31-continued

| $N_{PRB}$ | 27 | 28 | 29 | 30 | 31 | 32 | 33 |
|---|---|---|---|---|---|---|---|
| 29 | 19080 | 20616 | 21384 | 22920 | 23688 | 24496 | 28336 |
| 30 | 19848 | 21384 | 22152 | 23688 | 24496 | 25456 | 29296 |
| 31 | 20616 | 21384 | 22920 | 24496 | 25456 | 26416 | 30576 |
| 32 | 21384 | 22152 | 23688 | 25456 | 26416 | 27376 | 31704 |
| 33 | 22152 | 22920 | 24496 | 25456 | 27376 | 28336 | 32856 |
| 34 | 22152 | 23688 | 25456 | 26416 | 28336 | 29296 | 34008 |
| 35 | 22920 | 24496 | 26416 | 27376 | 29296 | 30576 | 35160 |
| 36 | 23688 | 25456 | 26416 | 28336 | 29296 | 30576 | 35160 |
| 37 | 24496 | 26416 | 27376 | 29296 | 30576 | 31704 | 36696 |
| 38 | 25456 | 26416 | 28336 | 29296 | 31704 | 32856 | 37888 |
| 39 | 25456 | 27376 | 29296 | 30576 | 31704 | 32856 | 39232 |
| 40 | 26416 | 28336 | 29296 | 31704 | 32856 | 34008 | 39232 |
| 41 | 27376 | 28336 | 30576 | 31704 | 34008 | 35160 | 40576 |
| 42 | 27376 | 29296 | 31704 | 32856 | 34008 | 35160 | 40576 |
| 43 | 28336 | 30576 | 31704 | 34008 | 35160 | 36696 | 42368 |
| 44 | 29296 | 30576 | 32856 | 34008 | 36696 | 37888 | 43816 |
| 45 | 29296 | 31706 | 34008 | 35160 | 36696 | 37888 | 43816 |
| 46 | 30576 | 32856 | 34008 | 36696 | 37888 | 39232 | 45352 |
| 47 | 30576 | 32856 | 35160 | 36696 | 39232 | 40576 | 46888 |
| 48 | 31704 | 34008 | 35160 | 37888 | 39232 | 40576 | 46888 |
| 49 | 32856 | 34008 | 36696 | 37888 | 40576 | 42368 | 48936 |
| 50 | 32856 | 35160 | 36696 | 39232 | 40576 | 42368 | 48936 |
| 51 | 34008 | 35160 | 37888 | 40576 | 42368 | 43816 | 51024 |
| 52 | 34008 | 36696 | 39232 | 40576 | 42368 | 43816 | 51024 |
| 53 | 35160 | 36696 | 39232 | 42368 | 43816 | 45352 | 52752 |
| 54 | 35160 | 37888 | 40576 | 42368 | 43816 | 46888 | 52752 |
| 55 | 36696 | 39232 | 40576 | 43816 | 45352 | 46888 | 55056 |
| 56 | 36696 | 39232 | 42368 | 43816 | 45352 | 46888 | 55056 |
| 57 | 37888 | 40576 | 42368 | 45352 | 46888 | 48936 | 57336 |
| 58 | 37888 | 40576 | 43816 | 45352 | 46888 | 48936 | 57336 |
| 59 | 39232 | 40576 | 43816 | 46888 | 48936 | 51024 | 59256 |
| 60 | 39232 | 42368 | 45352 | 46888 | 48936 | 51024 | 59256 |
| 61 | 40576 | 42368 | 45352 | 46888 | 51024 | 52752 | 59256 |
| 62 | 40576 | 43816 | 45352 | 48936 | 51024 | 52752 | 61664 |
| 63 | 42368 | 43816 | 46888 | 48936 | 51024 | 52752 | 61664 |
| 64 | 42368 | 45352 | 46888 | 51024 | 52752 | 55056 | 63776 |
| 65 | 42368 | 45352 | 48936 | 51024 | 52752 | 55056 | 63776 |
| 66 | 43816 | 46888 | 48936 | 51024 | 55056 | 57336 | 63776 |
| 67 | 43816 | 46888 | 48936 | 52752 | 55056 | 57336 | 66592 |
| 68 | 45352 | 46888 | 51024 | 52752 | 55056 | 57336 | 66592 |
| 69 | 45352 | 48936 | 51024 | 55056 | 57336 | 59256 | 68808 |
| 70 | 46888 | 48936 | 52752 | 55056 | 57336 | 59256 | 68808 |
| 71 | 46888 | 48936 | 52752 | 55056 | 59256 | 61664 | 71112 |
| 72 | 46888 | 51024 | 52752 | 57336 | 59256 | 61664 | 71112 |
| 73 | 48936 | 51024 | 55056 | 57336 | 59256 | 61664 | 71112 |
| 74 | 48936 | 52752 | 55056 | 57336 | 61664 | 63776 | 73712 |
| 75 | 48936 | 52752 | 55056 | 59256 | 61664 | 63776 | 75376 |
| 76 | 51024 | 52752 | 57336 | 59256 | 61664 | 63776 | 76208 |
| 77 | 51024 | 55056 | 57336 | 59256 | 63776 | 66592 | 76208 |
| 78 | 51024 | 55056 | 57336 | 61664 | 63776 | 66592 | 76208 |
| 79 | 52752 | 55056 | 59256 | 61664 | 63776 | 66592 | 78704 |
| 80 | 52752 | 57336 | 59256 | 61664 | 66592 | 68808 | 78704 |
| 81 | 52752 | 57336 | 59256 | 63776 | 66592 | 68808 | 81176 |
| 82 | 55056 | 57336 | 61664 | 63776 | 66592 | 71112 | 81176 |
| 83 | 55056 | 59256 | 61664 | 63776 | 68808 | 71112 | 81176 |
| 84 | 55056 | 59256 | 61664 | 66592 | 68808 | 71112 | 81176 |
| 85 | 57336 | 59256 | 63776 | 66592 | 71112 | 73712 | 84760 |
| 86 | 57336 | 59256 | 63776 | 66592 | 71112 | 73712 | 84760 |
| 87 | 57336 | 61664 | 63776 | 68808 | 71112 | 73712 | 84760 |
| 88 | 59256 | 61664 | 66592 | 68808 | 73712 | 75376 | 87936 |
| 89 | 59256 | 61664 | 66592 | 68808 | 73712 | 76208 | 87936 |
| 90 | 59256 | 63776 | 66592 | 71112 | 73712 | 76208 | 87936 |
| 91 | 59256 | 63776 | 66592 | 71112 | 75376 | 78704 | 90816 |
| 92 | 61664 | 63776 | 68808 | 71112 | 75376 | 78704 | 90816 |
| 93 | 61664 | 66592 | 68808 | 73712 | 76208 | 78704 | 90816 |
| 94 | 61664 | 66592 | 68808 | 73712 | 76208 | 81176 | 93800 |
| 95 | 63776 | 66592 | 71112 | 73712 | 78704 | 81176 | 93800 |
| 96 | 63776 | 66592 | 71112 | 75376 | 78704 | 81176 | 93800 |
| 97 | 63776 | 68808 | 71112 | 76208 | 78704 | 81176 | 93800 |
| 98 | 63776 | 68808 | 73712 | 76208 | 81176 | 84760 | 97896 |
| 99 | 66592 | 68808 | 73712 | 78704 | 81176 | 84760 | 97896 |
| 100 | 66592 | 71112 | 73712 | 78704 | 81176 | 84760 | 97896 |
| 101 | 66592 | 71112 | 75376 | 78704 | 84760 | 87936 | 97896 |
| 102 | 66592 | 71112 | 76208 | 81176 | 84760 | 87936 | 97896 |
| 103 | 68808 | 71112 | 76208 | 81176 | 84760 | 87936 | 97896 |
| 104 | 68808 | 73712 | 76208 | 81176 | 84760 | 87936 | 97896 |

TABLE 31-continued

| $N_{PRB}$ | \multicolumn{7}{c}{$I_{TBS}$} |
|---|---|---|---|---|---|---|---|
| | 27 | 28 | 29 | 30 | 31 | 32 | 33 |
| 105 | 68808 | 73712 | 78704 | 81176 | 87936 | 90816 | 97896 |
| 106 | 71112 | 73712 | 78704 | 84760 | 87936 | 90816 | 97896 |
| 107 | 71112 | 75376 | 78704 | 84760 | 87936 | 90816 | 97896 |
| 108 | 71112 | 76208 | 81176 | 84760 | 87936 | 93800 | 97896 |
| 109 | 71112 | 76208 | 81176 | 84760 | 90816 | 93800 | 97896 |
| 110 | 73712 | 76208 | 81176 | 84760 | 90816 | 93800 | 97896 |

Fourteenth Embodiment

In accordance with the fourteenth embodiment, a TBS is defined for supporting transmission efficiency of MCSs of Table 32. TBS indices 27 to 33 are newly defined for supporting 256QAM in accordance with the first embodiment. Table 33 shows such TBS indices 27 to 33 newly defined for supporting 256QAM.

TABLE 32

| $I_{MCS}$ | Modulation | R | $I_{TBS}$ |
|---|---|---|---|
| 22 | 256 QAM | 711 | 27 |
| 23 | 256 QAM | 754 | 28 |
| 24 | 256 QAM | 797 | 29 |
| 25 | 256 QAM | 840 | 30 |
| 26 | 256 QAM | 882 | 31 |
| 27 | 256 QAM | 915 | 32 |
| 28 | 256 QAM | 948 | 33 |

TABLE 33

| $N_{PRB}$ | \multicolumn{7}{c}{$I_{TBS}$} |
|---|---|---|---|---|---|---|---|
| | 27 | 28 | 29 | 30 | 31 | 32 | 33 |
| 1 | 648 | 680 | 712 | 776 | 808 | 840 | 968 |
| 2 | 1320 | 1384 | 1480 | 1544 | 1608 | 1672 | 1992 |
| 3 | 1992 | 2088 | 2216 | 2344 | 2472 | 2536 | 2984 |
| 4 | 2664 | 2792 | 2984 | 3112 | 3240 | 3368 | 4008 |
| 5 | 3368 | 3496 | 3752 | 3880 | 4136 | 4264 | 4968 |
| 6 | 4008 | 4264 | 4392 | 4776 | 4968 | 5160 | 5992 |
| 7 | 4584 | 4968 | 5160 | 5544 | 5736 | 5992 | 6968 |
| 8 | 5352 | 5544 | 5992 | 6200 | 6456 | 6712 | 7992 |
| 9 | 5992 | 6200 | 6712 | 6968 | 7480 | 7736 | 8760 |
| 10 | 6712 | 6968 | 7480 | 7736 | 8248 | 8504 | 9912 |
| 11 | 7224 | 7736 | 8248 | 8504 | 9144 | 9528 | 10680 |
| 12 | 7992 | 8504 | 8760 | 9528 | 9912 | 10296 | 11832 |
| 13 | 8504 | 9144 | 9528 | 10296 | 10680 | 11064 | 12960 |
| 14 | 9144 | 9912 | 10296 | 11064 | 11448 | 11832 | 13536 |
| 15 | 9912 | 10680 | 11064 | 11832 | 12216 | 12960 | 14688 |
| 16 | 10680 | 11064 | 11832 | 12575 | 12960 | 13535 | 15840 |
| 17 | 11064 | 11832 | 12576 | 13536 | 14112 | 14688 | 16992 |
| 18 | 11832 | 12576 | 13536 | 14112 | 14688 | 15264 | 17568 |
| 19 | 12576 | 13536 | 14112 | 14688 | 15840 | 16416 | 19080 |
| 20 | 12960 | 14112 | 14688 | 15840 | 16416 | 16992 | 19848 |
| 21 | 14112 | 14688 | 15840 | 16416 | 16992 | 18336 | 20616 |
| 22 | 14688 | 15264 | 16416 | 16992 | 18336 | 19080 | 21384 |
| 23 | 15264 | 16416 | 16992 | 18336 | 19080 | 19848 | 22920 |
| 24 | 15840 | 16992 | 17568 | 19080 | 19848 | 20616 | 23688 |
| 25 | 16416 | 17568 | 18336 | 19848 | 20616 | 21384 | 24496 |
| 26 | 16992 | 18336 | 19080 | 20616 | 21384 | 22152 | 25456 |
| 27 | 17568 | 19080 | 19848 | 21384 | 22152 | 22920 | 26416 |
| 28 | 18336 | 19848 | 20616 | 22152 | 22920 | 23688 | 27376 |
| 29 | 19080 | 20616 | 21384 | 22920 | 23688 | 24496 | 28336 |
| 30 | 19848 | 21384 | 22152 | 23688 | 24496 | 25456 | 29296 |
| 31 | 20616 | 21384 | 22920 | 24496 | 25456 | 26416 | 30576 |
| 32 | 21384 | 22152 | 23688 | 25456 | 26416 | 27376 | 31704 |
| 33 | 22152 | 22920 | 24496 | 25456 | 27376 | 28336 | 32856 |
| 34 | 22920 | 23688 | 25456 | 26416 | 28336 | 29296 | 34008 |
| 35 | 22920 | 24496 | 26416 | 27376 | 29296 | 30576 | 35160 |
| 36 | 23688 | 25456 | 26416 | 28336 | 29296 | 30576 | 35160 |
| 37 | 24496 | 26416 | 27376 | 29296 | 30576 | 31704 | 36696 |
| 38 | 25456 | 26416 | 28336 | 29296 | 31704 | 32856 | 37888 |
| 39 | 25456 | 27376 | 29296 | 30576 | 31704 | 32856 | 39232 |
| 40 | 26416 | 28336 | 29296 | 31704 | 32856 | 34008 | 39232 |
| 41 | 27376 | 28336 | 30576 | 31704 | 34008 | 35160 | 40576 |
| 42 | 27376 | 29296 | 31704 | 32856 | 34008 | 35160 | 40576 |
| 43 | 28336 | 30576 | 31704 | 34008 | 35160 | 36696 | 42368 |
| 44 | 29296 | 30576 | 32856 | 34008 | 36696 | 37888 | 43816 |
| 45 | 29296 | 31706 | 34008 | 35160 | 36696 | 37888 | 43816 |
| 46 | 30576 | 32856 | 34008 | 36696 | 37888 | 39232 | 45352 |
| 47 | 30576 | 32856 | 35160 | 36696 | 39232 | 40576 | 46888 |
| 48 | 31704 | 34008 | 35160 | 37888 | 39232 | 40576 | 46888 |
| 49 | 32856 | 34008 | 36696 | 37888 | 40576 | 42368 | 48936 |
| 50 | 32856 | 35160 | 36696 | 39232 | 40576 | 42368 | 48936 |
| 51 | 34008 | 35160 | 37888 | 40576 | 42368 | 43816 | 51024 |
| 52 | 34008 | 36696 | 39232 | 40576 | 42368 | 43816 | 51024 |
| 53 | 35160 | 36696 | 39232 | 42368 | 43816 | 45352 | 52752 |
| 54 | 35160 | 37888 | 40576 | 42368 | 43816 | 46888 | 52752 |
| 55 | 36696 | 39232 | 40576 | 43816 | 45352 | 46888 | 55056 |
| 56 | 36696 | 39232 | 42368 | 43816 | 45352 | 46888 | 55056 |
| 57 | 37888 | 40576 | 42368 | 45352 | 46888 | 48936 | 57336 |
| 58 | 37888 | 40576 | 43816 | 45352 | 46888 | 48936 | 57336 |
| 59 | 39232 | 40576 | 43816 | 46888 | 48936 | 51024 | 59256 |
| 60 | 39232 | 42368 | 45352 | 46888 | 48936 | 51024 | 59256 |
| 61 | 40576 | 42368 | 45352 | 46888 | 51024 | 52752 | 59256 |
| 62 | 40576 | 43816 | 45352 | 48936 | 51024 | 52752 | 61664 |
| 63 | 42368 | 43816 | 46888 | 48936 | 51024 | 52752 | 61664 |
| 64 | 42368 | 45352 | 46888 | 51024 | 52752 | 55056 | 63776 |
| 65 | 42368 | 45352 | 48936 | 51024 | 52752 | 55056 | 63776 |
| 66 | 43816 | 46888 | 48936 | 51024 | 55056 | 57336 | 63776 |
| 67 | 43816 | 46888 | 48936 | 52752 | 55056 | 57336 | 66592 |
| 68 | 45352 | 46888 | 51024 | 52752 | 55056 | 57336 | 66592 |
| 69 | 45352 | 48936 | 51024 | 52752 | 55056 | 59256 | 68808 |
| 70 | 46888 | 48936 | 52752 | 55056 | 57336 | 59256 | 68808 |
| 71 | 46888 | 48936 | 52752 | 55056 | 59256 | 61664 | 71112 |
| 72 | 46888 | 51024 | 52752 | 57336 | 59256 | 61664 | 71112 |
| 73 | 48936 | 51024 | 55056 | 57336 | 59256 | 61664 | 71112 |
| 74 | 48936 | 52752 | 55056 | 57336 | 61664 | 63776 | 73712 |
| 75 | 48936 | 52752 | 55056 | 59256 | 61664 | 63776 | 75376 |
| 76 | 51024 | 52752 | 57336 | 59256 | 61664 | 63776 | 76208 |
| 77 | 51024 | 55056 | 57336 | 59256 | 63776 | 66592 | 76208 |
| 78 | 51024 | 55056 | 57336 | 61664 | 63776 | 66592 | 76208 |
| 79 | 52752 | 55056 | 59256 | 61664 | 63776 | 66592 | 78704 |
| 80 | 52752 | 57336 | 59256 | 61664 | 66592 | 68808 | 78704 |
| 81 | 52752 | 57336 | 59256 | 63776 | 66592 | 68808 | 81176 |
| 82 | 55056 | 57336 | 61664 | 63776 | 66592 | 71112 | 81176 |
| 83 | 55056 | 59256 | 61664 | 63776 | 68808 | 71112 | 81176 |
| 84 | 55056 | 59256 | 61664 | 66592 | 68808 | 71112 | 81176 |
| 85 | 57336 | 59256 | 63776 | 66592 | 71112 | 73712 | 84760 |
| 86 | 57336 | 59256 | 63776 | 66592 | 71112 | 73712 | 84760 |
| 87 | 57336 | 61664 | 63776 | 68808 | 71112 | 73712 | 84760 |
| 88 | 59256 | 61664 | 66592 | 68808 | 73712 | 75376 | 87936 |
| 89 | 59256 | 61664 | 66592 | 68808 | 73712 | 76208 | 87936 |
| 90 | 59256 | 63776 | 66592 | 71112 | 73712 | 76208 | 87936 |
| 91 | 59256 | 63776 | 66592 | 71112 | 75376 | 78704 | 90816 |
| 92 | 61664 | 63776 | 68808 | 71112 | 75376 | 78704 | 90816 |
| 93 | 61664 | 66592 | 68808 | 73712 | 76208 | 78704 | 90816 |
| 94 | 61664 | 66592 | 68808 | 73712 | 76208 | 81176 | 93800 |
| 95 | 63776 | 66592 | 71112 | 73712 | 78704 | 81176 | 93800 |
| 96 | 63776 | 66592 | 71112 | 75376 | 78704 | 81176 | 93800 |
| 97 | 63776 | 68808 | 71112 | 76208 | 78704 | 81176 | 93800 |
| 98 | 63776 | 68808 | 73712 | 76208 | 81176 | 84760 | 97896 |
| 99 | 66592 | 68808 | 73712 | 78704 | 81176 | 84760 | 97896 |
| 100 | 66592 | 71112 | 73712 | 78704 | 81176 | 84760 | 97896 |
| 101 | 66592 | 71112 | 75376 | 78704 | 84760 | 87936 | 97896 |
| 102 | 66592 | 71112 | 76208 | 81176 | 84760 | 87936 | 97896 |
| 103 | 68808 | 71112 | 76208 | 81176 | 84760 | 87936 | 97896 |
| 104 | 68808 | 73712 | 76208 | 81176 | 84760 | 87936 | 97896 |
| 105 | 68808 | 73712 | 78704 | 81176 | 87936 | 90816 | 97896 |
| 106 | 71112 | 73712 | 78704 | 84760 | 87936 | 90816 | 97896 |
| 107 | 71112 | 75376 | 78704 | 84760 | 87936 | 90816 | 97896 |
| 108 | 71112 | 76208 | 81176 | 84760 | 87936 | 93800 | 97896 |
| 109 | 71112 | 76208 | 81176 | 84760 | 90816 | 93800 | 97896 |
| 110 | 73712 | 76208 | 81176 | 84760 | 90816 | 93800 | 97896 |

Fifteenth Embodiment

In accordance with the fifteenth embodiment, a TBS is defined for supporting transmission efficiency of MCSs in Table 34. TBS indices 27 to 33 are newly defined for supporting 256QAM in accordance with the first embodiment. Table 35 shows such TBS indices 27 to 33 newly defined for supporting 256QAM.

TABLE 34

| $I_{MCS}$ | Modulation | R | $I_{TBS}$ |
|---|---|---|---|
| 22 | 256QAM | 711 | 27 |
| 23 | 256QAM | 754 | 28 |

TABLE 34-continued

| $I_{MCS}$ | Modulation | R | $I_{TBS}$ |
|---|---|---|---|
| 24 | 256QAM | 797 | 29 |
| 25 | 256QAM | 839.5 | 30 |
| 26 | 256QAM | 882 | 31 |
| 27 | 256QAM | 915 | 32 |
| 28 | 256QAM | 948 | 33 |

TABLE 35

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 27 | 648 | 1320 | 1992 | 2664 | 3368 | 4008 | 4584 | 5352 | 5992 | 6712 |
| 28 | 680 | 1384 | 2088 | 2792 | 3496 | 4264 | 4968 | 5544 | 6200 | 6968 |
| 29 | 712 | 1480 | 2216 | 2984 | 3752 | 4392 | 5160 | 5992 | 6712 | 7480 |
| 30 | 776 | 1544 | 2344 | 3112 | 3880 | 4776 | 5544 | 6200 | 6968 | 7736 |
| 31 | 808 | 1608 | 2472 | 3240 | 4136 | 4968 | 5736 | 6456 | 7480 | 8248 |
| 32 | 840 | 1672 | 2536 | 3368 | 4264 | 5160 | 5992 | 6712 | 7736 | 8504 |
| 33 | 968 | 1992 | 2984 | 4008 | 4968 | 5992 | 6968 | 7992 | 8760 | 9912 |

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 27 | 7224 | 7992 | 8504 | 9144 | 9912 | 10680 | 11448 | 11832 | 12576 | 12960 |
| 28 | 7736 | 8504 | 9144 | 9912 | 10680 | 11064 | 11832 | 12576 | 13536 | 14112 |
| 29 | 8248 | 8760 | 9528 | 10296 | 11064 | 11832 | 12576 | 13536 | 14112 | 14688 |
| 30 | 8504 | 9528 | 10296 | 11064 | 11832 | 12576 | 13536 | 14112 | 14688 | 15840 |
| 31 | 9144 | 9912 | 10680 | 11448 | 12216 | 12960 | 14112 | 14688 | 15840 | 16416 |
| 32 | 9528 | 10296 | 11064 | 11832 | 12960 | 13536 | 14688 | 15264 | 16416 | 16992 |
| 33 | 10680 | 11832 | 12960 | 13536 | 14688 | 15840 | 16992 | 17568 | 19080 | 19848 |

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 27 | 14112 | 14688 | 15264 | 15840 | 16416 | 16992 | 17568 | 18336 | 19080 | 19848 |
| 28 | 14688 | 15264 | 16416 | 16992 | 17568 | 18336 | 19080 | 19848 | 20616 | 21384 |
| 29 | 15840 | 16416 | 16992 | 17568 | 18336 | 19080 | 19848 | 20616 | 21384 | 22152 |
| 30 | 16416 | 16992 | 18336 | 19080 | 19848 | 20616 | 21384 | 22152 | 22920 | 23688 |
| 31 | 16992 | 18336 | 19080 | 19848 | 20616 | 21384 | 22152 | 22920 | 23688 | 24496 |
| 32 | 17568 | 19080 | 19848 | 20616 | 21384 | 22152 | 22920 | 23688 | 24496 | 25456 |
| 33 | 20616 | 21384 | 22920 | 23688 | 24496 | 25456 | 26416 | 27376 | 28336 | 29296 |

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 27 | 20616 | 21384 | 22152 | 22920 | 22920 | 23688 | 24496 | 25456 | 25456 | 26416 |
| 28 | 22152 | 22152 | 22920 | 23688 | 24496 | 25456 | 26416 | 26416 | 27376 | 28336 |
| 29 | 22920 | 23688 | 24496 | 25456 | 26416 | 26416 | 27376 | 28336 | 29296 | 29296 |
| 30 | 24496 | 25456 | 25456 | 26416 | 27376 | 28336 | 29296 | 29296 | 30576 | 31704 |
| 31 | 25456 | 26416 | 27376 | 28336 | 28336 | 29296 | 30576 | 31704 | 31704 | 32856 |
| 32 | 26416 | 27376 | 28336 | 29296 | 29296 | 30576 | 31704 | 32856 | 32856 | 34008 |
| 33 | 30576 | 31704 | 32856 | 34008 | 35160 | 35160 | 36696 | 37888 | 39232 | 39232 |

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 27 | 27376 | 27376 | 28336 | 29296 | 29296 | 30576 | 31704 | 31704 | 32856 | 32856 |
| 28 | 29296 | 29296 | 30576 | 30576 | 31704 | 32856 | 32856 | 34008 | 34008 | 35160 |
| 29 | 30576 | 31704 | 31704 | 32856 | 34008 | 34008 | 35160 | 35160 | 36696 | 36696 |
| 30 | 31704 | 32856 | 34008 | 34008 | 35160 | 36696 | 36696 | 37888 | 37888 | 39232 |
| 31 | 34008 | 34008 | 35160 | 36696 | 36696 | 37888 | 39232 | 39232 | 40576 | 40576 |
| 32 | 35160 | 35160 | 36696 | 37888 | 37888 | 39232 | 40576 | 40576 | 42368 | 42368 |
| 33 | 40576 | 40576 | 42368 | 43816 | 43816 | 45352 | 46888 | 46888 | 48936 | 48936 |

TABLE 35-continued

| $I_{TBS}$ | \multicolumn{10}{c}{$N_{PRB}$} |
|---|---|---|---|---|---|---|---|---|---|---|
| | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| 28 | 35160 | 36696 | 36696 | 37888 | 39232 | 39232 | 40576 | 40576 | 42368 | 42368 |
| 29 | 37888 | 39232 | 39232 | 40576 | 40576 | 42368 | 42368 | 43816 | 43816 | 45352 |
| 30 | 40576 | 40576 | 42368 | 42368 | 42368 | 43816 | 45352 | 45352 | 46888 | 46888 |
| 31 | 42368 | 42368 | 43816 | 43816 | 45352 | 45352 | 46888 | 46888 | 48936 | 48936 |
| 32 | 43816 | 43816 | 45352 | 45352 | 46888 | 46888 | 48936 | 48936 | 51024 | 51024 |
| 33 | 51024 | 51024 | 52752 | 52752 | 55056 | 55056 | 57336 | 57336 | 59256 | 59256 |

| $I_{TBS}$ | \multicolumn{10}{c}{$N_{PRB}$} |
|---|---|---|---|---|---|---|---|---|---|---|
| | 61 | 62 | 63 | 64 | 65 | 66 | 67 | 68 | 69 | 70 |
| 27 | 40576 | 40576 | 42368 | 42368 | 43816 | 43816 | 43816 | 45352 | 45352 | 46888 |
| 28 | 42368 | 43816 | 43816 | 45352 | 45352 | 46888 | 46888 | 46888 | 48936 | 48936 |
| 29 | 45352 | 45352 | 46888 | 46888 | 48936 | 48936 | 48936 | 51024 | 51024 | 52752 |
| 30 | 46888 | 48936 | 48936 | 51024 | 51024 | 51024 | 52752 | 52752 | 55056 | 55056 |
| 31 | 51024 | 51024 | 51024 | 52752 | 52752 | 55056 | 55056 | 55056 | 57336 | 57336 |
| 32 | 52752 | 52752 | 52752 | 55056 | 55056 | 57336 | 57336 | 57336 | 59256 | 59256 |
| 33 | 59256 | 61664 | 61664 | 63776 | 63776 | 63776 | 66592 | 66592 | 68808 | 68808 |

| $I_{TBS}$ | \multicolumn{10}{c}{$N_{PRB}$} |
|---|---|---|---|---|---|---|---|---|---|---|
| | 71 | 72 | 73 | 74 | 75 | 76 | 77 | 78 | 79 | 80 |
| 27 | 46888 | 46888 | 48936 | 48936 | 48936 | 51024 | 51024 | 51024 | 52752 | 52752 |
| 28 | 48936 | 51024 | 51024 | 52752 | 52752 | 52752 | 55056 | 55056 | 55056 | 57336 |
| 29 | 52752 | 52752 | 55056 | 55056 | 55056 | 57336 | 57336 | 57336 | 59256 | 59256 |
| 30 | 55056 | 57336 | 57336 | 57336 | 59256 | 59256 | 59256 | 61664 | 61664 | 61664 |
| 31 | 59256 | 59256 | 59256 | 61664 | 61664 | 61664 | 63776 | 63776 | 63776 | 66592 |
| 32 | 61664 | 61664 | 61664 | 63776 | 63776 | 63776 | 66592 | 66592 | 66592 | 68808 |
| 33 | 71112 | 71112 | 71112 | 73712 | 75376 | 76208 | 76208 | 76208 | 78704 | 78704 |

| $I_{TBS}$ | \multicolumn{10}{c}{$N_{PRB}$} |
|---|---|---|---|---|---|---|---|---|---|---|
| | 81 | 82 | 83 | 84 | 85 | 86 | 87 | 88 | 89 | 90 |
| 27 | 52752 | 55056 | 55056 | 55056 | 57336 | 57336 | 57336 | 59256 | 59256 | 59256 |
| 28 | 57336 | 57336 | 59256 | 59256 | 59256 | 61664 | 61664 | 61664 | 61664 | 63776 |
| 29 | 59256 | 61664 | 61664 | 61664 | 63776 | 63776 | 63776 | 66592 | 66592 | 66592 |
| 30 | 63776 | 63776 | 63776 | 66592 | 66592 | 66592 | 68808 | 68808 | 68808 | 71112 |
| 31 | 66592 | 66592 | 68808 | 68808 | 71112 | 71112 | 71112 | 73712 | 73712 | 73712 |
| 32 | 68808 | 71112 | 71112 | 71112 | 73712 | 73712 | 73712 | 75376 | 76208 | 76208 |
| 33 | 81176 | 81176 | 81176 | 81176 | 84760 | 84760 | 84760 | 87936 | 87936 | 87936 |

| $I_{TBS}$ | \multicolumn{10}{c}{$N_{PRB}$} |
|---|---|---|---|---|---|---|---|---|---|---|
| | 91 | 92 | 93 | 94 | 95 | 96 | 97 | 98 | 99 | 100 |
| 27 | 59256 | 61664 | 61664 | 61664 | 63776 | 63776 | 63776 | 63776 | 66592 | 66592 |
| 28 | 63776 | 63776 | 66592 | 66592 | 66592 | 66592 | 68808 | 68808 | 68808 | 71112 |
| 29 | 66592 | 68808 | 68808 | 68808 | 71112 | 71112 | 71112 | 73712 | 73712 | 73712 |
| 30 | 71112 | 71112 | 73712 | 73712 | 73712 | 75376 | 76208 | 76208 | 78704 | 78704 |
| 31 | 75376 | 75376 | 76208 | 76208 | 78704 | 78704 | 78704 | 81176 | 81176 | 81176 |
| 32 | 78704 | 78704 | 78704 | 81176 | 81176 | 81176 | 81176 | 84760 | 84760 | 84760 |
| 33 | 90816 | 90816 | 90816 | 93800 | 93800 | 93800 | 93800 | 97896 | 97896 | 97896 |

| $I_{TBS}$ | \multicolumn{10}{c}{$N_{PRB}$} |
|---|---|---|---|---|---|---|---|---|---|---|
| | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 71112 | 73712 | 73712 | 73712 | 75376 | 75376 | 76208 | 76208 | 76208 |
| 29 | 75376 | 76208 | 76208 | 76208 | 78704 | 78704 | 78704 | 81176 | 81176 | 81176 |
| 30 | 78704 | 78704 | 81176 | 81176 | 81176 | 84760 | 84760 | 84760 | 84760 | 84760 |
| 31 | 84760 | 84760 | 84760 | 84760 | 87936 | 87936 | 87936 | 87936 | 90816 | 90816 |
| 32 | 84760 | 87936 | 87936 | 87936 | 90816 | 90816 | 90816 | 90816 | 93800 | 93800 |
| 33 | 97896 | 97896 | 97896 | 97896 | 97896 | 97896 | 97896 | 97896 | 97896 | 97896 |

Sixteenth Embodiment

In accordance with the sixteenth embodiment, a TBS is defined for supporting transmission efficiency of MCSs in Table 8. Referring to FIG. 8, MCS indices 21 to 27 may be allocated for supporting 256QAM, and TBS indices 27 to 33 are allocated to the MCS indices 21 to 27 respectively.

The transmission efficiency may be calculated by i) obtaining a code rate by dividing R of FIG. 8 by 1024 (code rate=R/1024) and ii) multiplying a modulation order and the obtained code rate.

Therefore, a TBS index for supporting 256 QAM may be set in correspondence with the transmission efficiency of an MCS index.

As shown in FIG. 8, TBS indices for supporting 256QAM may be assigned with TBS values, respectively. Such TBS values may be calculated as shown in FIG. 9 to FIG. 15 in accordance with at least one embodiment. As described, the TBS value may be obtained based on the number of resource elements of a PRB pair, the number of allocable PRB pairs, and a transmission efficiency value for each index.

Hereinafter, a TBS value of each TBS index will be described in detail with reference to drawings.

FIG. 9 is a diagram illustrating a TBS value of a TBS index 27 according to an embodiment of the present disclosure. Referring to FIG. 9, a TBS value corresponding to an MCS index 21 for the 245QAM modulation scheme may be set as shown in FIG. 9, based on the number of allocable PRB pairs.

Each TBS value may be calculated through the method 2 described above. In this instance, the TBS value is calculated with conditions that $N_{toneperPRB}$ is 120, a modulation order is 8, and R is 711.

FIG. 10 is a diagram illustrating a TBS value of a TBS index 28 according to an embodiment of the present disclosure. Referring to FIG. 10, a TBS value corresponding to an MCS index 22 for the 245QAM modulation scheme may be set as shown in FIG. 10, based on the number of allocable PRB pairs.

Each TBS value may be calculated through the method 2. In this instance, the TBS value is calculated with conditions that $N_{toneperPRB}$=120, a modulation order is 8, and R is 754.

FIG. 11 is a diagram illustrating a TBS value of a TBS index number 29 according to an embodiment of the present disclosure. Referring to FIG. 11, a TBS value corresponding to an MCS index 23 for the 245QAM modulation scheme may be set as shown in FIG. 11, based on the number of allocable PRB pairs.

Each TBS value may be calculated through the above described method 2. In this instance, the TBS value is calculated with conditions that $N_{toneperPRB}$=120, a modulation order is 8, and R is 797.

FIG. 12 is a diagram illustrating a TBS value of a TBS index number 30 according to an embodiment of the present disclosure. Referring to FIG. 12, a TBS value corresponding to an MCS index 24 for the 245QAM modulation scheme may be set as shown in FIG. 12, based on the number of allocable PRB pairs.

Each TBS value may be calculated through the above described method 2. In this instance, the TBS value is calculated with conditions that $N_{toneperPRB}$=120, a modulation order is 8, and R is 841.

FIG. 13 is a diagram illustrating a TBS value of a TBS index number 31 according to an embodiment of the present disclosure. Referring to FIG. 13, a TBS value corresponding to an MCS index 25 for the 245QAM modulation scheme may be set as shown in FIG. 13, based on the number of allocable PRB pairs.

Each TBS value may be calculated through the above described method 2. In this instance, the TBS value is calculated with conditions that $N_{toneperPRB}$=120, a modulation order is 8, and R is 885.

FIG. 14 is a diagram illustrating a TBS value of a TBS index number 32 according to an embodiment of the present disclosure. Referring to FIG. 14, a TBS value corresponding to an MCS index 26 for the 245QAM modulation scheme may be set as shown in FIG. 14, based on the number of allocable PRB pairs.

Each TBS value may be calculated through the above described method 2. In this instance, the TBS value is calculated with conditions that $N_{toneperPRB}$=120, a modulation order is 8, and R is 916.5.

FIG. 15 is a diagram illustrating a TBS value of a TBS index number 33 according to an embodiment of the present disclosure. Referring to FIG. 15, a TBS value corresponding to an MCS index 27 for the 245QAM modulation scheme may be set as shown in FIG. 15, based on the number of allocable PRB pairs.

Each TBS value may be calculated through the described method 1, since an MCS index 27 is a value for the maximum transmission efficiency. In this instance, the TBS value is calculated with conditions that $N_{toneperPRB}$=136, a modulation order is 8, and R is 948.

As described above, TBS values of the TBS indices 27 to 33 for supporting the 256QAM modulation scheme, which are calculated based on the number of PRB pairs, may be set as shown in the following Table 36.

TABLE 36

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 27 | 648 | 1320 | 1992 | 2664 | 3368 | 4008 | 4584 | 5352 | 5992 | 6712 |
| 28 | 680 | 1384 | 2088 | 2792 | 3496 | 4264 | 4968 | 5544 | 6200 | 6968 |
| 29 | 712 | 1480 | 2216 | 2984 | 3752 | 4392 | 5160 | 5992 | 6712 | 7480 |
| 30 | 776 | 1544 | 2344 | 3112 | 3880 | 4776 | 5544 | 6200 | 6968 | 7736 |
| 31 | 808 | 1608 | 2472 | 3240 | 4136 | 4968 | 5736 | 6456 | 7480 | 8248 |
| 32 | 840 | 1672 | 2536 | 3368 | 4264 | 5160 | 5992 | 6712 | 7736 | 8504 |
| 33 | 968 | 1992 | 2984 | 4008 | 4968 | 5992 | 6968 | 7992 | 8760 | 9912 |

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 27 | 7224 | 7992 | 8504 | 9144 | 9912 | 10680 | 11448 | 11832 | 12576 | 12960 |
| 28 | 7736 | 8504 | 9144 | 9912 | 10680 | 11064 | 11832 | 12576 | 13536 | 14112 |

TABLE 36-continued

| | | | | | | | | | |
|---|---|---|---|---|---|---|---|---|---|
| 29 | 8248 | 8760 | 9528 | 10296 | 11064 | 11832 | 12576 | 13536 | 14112 | 14688 |
| 30 | 8504 | 9528 | 10296 | 11064 | 11832 | 12576 | 13536 | 14112 | 14688 | 15840 |
| 31 | 9144 | 9912 | 10680 | 11448 | 12216 | 12960 | 14112 | 14688 | 15840 | 16416 |
| 32 | 9528 | 10296 | 11064 | 11832 | 12960 | 13536 | 14688 | 15264 | 16416 | 16992 |
| 33 | 10680 | 11832 | 12960 | 13536 | 14688 | 15840 | 16992 | 17568 | 19080 | 19848 |

| | $N_{PRB}$ | | | | | | | | |
|---|---|---|---|---|---|---|---|---|---|
| $I_{TBS}$ | 21 | 22 | 23 | 24 | 25 | 26 | 27 | 28 | 29 | 30 |
| 27 | 14112 | 14688 | 15264 | 15840 | 16416 | 16992 | 17568 | 18336 | 19080 | 19848 |
| 28 | 14688 | 15264 | 16416 | 16992 | 17568 | 18336 | 19080 | 19848 | 20616 | 21384 |
| 29 | 15840 | 16416 | 16992 | 17568 | 18336 | 19080 | 19848 | 20616 | 21384 | 22152 |
| 30 | 16416 | 16992 | 18336 | 19080 | 19848 | 20616 | 21384 | 22152 | 22920 | 23688 |
| 31 | 17568 | 18336 | 19080 | 19848 | 20616 | 21384 | 22152 | 22920 | 23688 | 24496 |
| 32 | 17568 | 19080 | 19848 | 20616 | 21384 | 22152 | 22920 | 23688 | 24496 | 25456 |
| 33 | 20616 | 21384 | 22920 | 23688 | 24496 | 25456 | 26416 | 27376 | 28336 | 29296 |

| | $N_{PRB}$ | | | | | | | | |
|---|---|---|---|---|---|---|---|---|---|
| $I_{TBS}$ | 31 | 32 | 33 | 34 | 35 | 36 | 37 | 38 | 39 | 40 |
| 27 | 20616 | 21384 | 22152 | 22920 | 22920 | 23688 | 24496 | 25456 | 25456 | 26416 |
| 28 | 22152 | 22152 | 22920 | 23688 | 24496 | 25456 | 26416 | 26416 | 27376 | 28336 |
| 29 | 22920 | 23688 | 24496 | 25456 | 26416 | 26416 | 27376 | 28336 | 29296 | 29296 |
| 30 | 24496 | 25456 | 25456 | 26416 | 27376 | 28336 | 29296 | 29296 | 30576 | 31704 |
| 31 | 25456 | 26416 | 27376 | 28336 | 29296 | 29296 | 30576 | 31704 | 31704 | 32856 |
| 32 | 26416 | 27376 | 28336 | 29296 | 29296 | 30576 | 31704 | 32856 | 32856 | 34008 |
| 33 | 30576 | 31704 | 32856 | 34008 | 35160 | 35160 | 36696 | 37888 | 39232 | 39232 |

| | $N_{PRB}$ | | | | | | | | |
|---|---|---|---|---|---|---|---|---|---|
| $I_{TBS}$ | 41 | 42 | 43 | 44 | 45 | 46 | 47 | 48 | 49 | 50 |
| 27 | 27376 | 27376 | 28336 | 29296 | 29296 | 30576 | 31704 | 31704 | 32856 | 32856 |
| 28 | 29296 | 29296 | 30576 | 30576 | 31704 | 32856 | 32856 | 34008 | 34008 | 35160 |
| 29 | 30576 | 31704 | 31704 | 32856 | 34008 | 34008 | 35160 | 35160 | 36696 | 36696 |
| 30 | 31704 | 32856 | 34008 | 34008 | 35160 | 36696 | 36696 | 37888 | 37888 | 39232 |
| 31 | 34008 | 35160 | 35160 | 36696 | 36696 | 37888 | 39232 | 39232 | 40576 | 40576 |
| 32 | 35160 | 35160 | 36696 | 37888 | 37888 | 39232 | 40576 | 40576 | 42368 | 42368 |
| 33 | 40576 | 40576 | 42368 | 43816 | 43816 | 45352 | 46888 | 46888 | 48936 | 48936 |

| | $N_{PRB}$ | | | | | | | | |
|---|---|---|---|---|---|---|---|---|---|
| $I_{TBS}$ | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| 28 | 35160 | 36696 | 36696 | 37888 | 39232 | 39232 | 40576 | 40576 | 42368 | 42368 |
| 29 | 37888 | 39232 | 39232 | 40576 | 40576 | 42368 | 42368 | 43816 | 43816 | 45352 |
| 30 | 40576 | 40576 | 42368 | 42368 | 43816 | 43816 | 45352 | 45352 | 46888 | 46888 |
| 31 | 42368 | 42368 | 43816 | 45352 | 45352 | 46888 | 46888 | 48936 | 48936 |
| 32 | 43816 | 43816 | 45352 | 46888 | 46888 | 46888 | 48936 | 48936 | 51024 | 51024 |
| 33 | 51024 | 51024 | 52752 | 52752 | 55056 | 55056 | 57336 | 57336 | 59256 | 59256 |

| | $N_{PRB}$ | | | | | | | | |
|---|---|---|---|---|---|---|---|---|---|
| $I_{TBS}$ | 61 | 62 | 63 | 64 | 65 | 66 | 67 | 68 | 69 | 70 |
| 27 | 40576 | 40576 | 42368 | 42368 | 43816 | 43816 | 43816 | 45352 | 45352 | 46888 |
| 28 | 42368 | 43816 | 43816 | 45352 | 45352 | 46888 | 46888 | 46888 | 48936 | 48936 |
| 29 | 45352 | 45352 | 46888 | 46888 | 48936 | 48936 | 48936 | 51024 | 51024 | 52752 |
| 30 | 46888 | 48936 | 48936 | 51024 | 51024 | 51024 | 52752 | 52752 | 55056 | 55056 |
| 31 | 51024 | 51024 | 52752 | 52752 | 52752 | 55056 | 55056 | 55056 | 57336 | 57336 |
| 32 | 52752 | 52752 | 52752 | 55056 | 55056 | 57336 | 57336 | 57336 | 59256 | 59256 |
| 33 | 59256 | 61664 | 61664 | 63776 | 63776 | 63776 | 66592 | 66592 | 68808 | 68808 |

| | $N_{PRB}$ | | | | | | | | |
|---|---|---|---|---|---|---|---|---|---|
| $I_{TBS}$ | 71 | 72 | 73 | 74 | 75 | 76 | 77 | 78 | 79 | 80 |
| 27 | 46888 | 46888 | 48936 | 48936 | 48936 | 51024 | 51024 | 51024 | 52752 | 52752 |
| 28 | 48936 | 51024 | 51024 | 52752 | 52752 | 52752 | 55056 | 55056 | 55056 | 57336 |
| 29 | 52752 | 52752 | 55056 | 55056 | 55056 | 57336 | 57336 | 57336 | 59256 | 59256 |
| 30 | 55056 | 57336 | 57336 | 57336 | 59256 | 59256 | 59256 | 61664 | 61664 | 63776 |
| 31 | 59256 | 59256 | 59256 | 61664 | 61664 | 63776 | 63776 | 63776 | 66592 | 66592 |
| 32 | 61664 | 61664 | 61664 | 63776 | 63776 | 63776 | 66592 | 66592 | 66592 | 68808 |
| 33 | 71112 | 71112 | 71112 | 73712 | 75376 | 76208 | 76208 | 76208 | 78704 | 78704 |

TABLE 36-continued

| $I_{TBS}$ | \multicolumn{9}{c}{$N_{PRB}$} |
| --- | --- | --- | --- | --- | --- | --- | --- | --- | --- |
|  | 81 | 82 | 83 | 84 | 85 | 86 | 87 | 88 | 89 | 90 |
| 27 | 52752 | 55056 | 55056 | 55056 | 57336 | 57336 | 57336 | 59256 | 59256 | 59256 |
| 28 | 57336 | 57336 | 59256 | 59256 | 59256 | 61664 | 61664 | 61664 | 61664 | 63776 |
| 29 | 59256 | 61664 | 61664 | 61664 | 63776 | 63776 | 63776 | 66592 | 66592 | 66592 |
| 30 | 63776 | 63776 | 63776 | 66592 | 66592 | 66592 | 68808 | 68808 | 68808 | 71112 |
| 31 | 66592 | 68808 | 68808 | 68808 | 71112 | 71112 | 71112 | 73712 | 73712 | 73712 |
| 32 | 68808 | 71112 | 71112 | 71112 | 73712 | 73712 | 73712 | 75376 | 76208 | 76208 |
| 33 | 81176 | 81176 | 81176 | 81176 | 84760 | 84760 | 84760 | 87936 | 87936 | 87936 |

| $I_{TBS}$ | \multicolumn{9}{c}{$N_{PRB}$} |
| --- | --- | --- | --- | --- | --- | --- | --- | --- | --- |
|  | 91 | 92 | 93 | 94 | 95 | 96 | 97 | 98 | 99 | 100 |
| 27 | 59256 | 61664 | 61664 | 61664 | 63776 | 63776 | 63776 | 63776 | 66592 | 66592 |
| 28 | 63776 | 63776 | 66592 | 66592 | 66592 | 66592 | 68808 | 68808 | 68808 | 71112 |
| 29 | 66592 | 68808 | 68808 | 68808 | 71112 | 71112 | 71112 | 73712 | 73712 | 73712 |
| 30 | 71112 | 71112 | 73712 | 73712 | 75376 | 75376 | 76208 | 76208 | 78704 | 78704 |
| 31 | 75376 | 76208 | 76208 | 78704 | 78704 | 78704 | 81176 | 81176 | 81176 | 81176 |
| 32 | 78704 | 78704 | 78704 | 81176 | 81176 | 81176 | 84760 | 84760 | 84760 | 84760 |
| 33 | 90816 | 90816 | 90816 | 93800 | 93800 | 93800 | 93800 | 97896 | 97896 | 97896 |

| $I_{TBS}$ | \multicolumn{9}{c}{$N_{PRB}$} |
| --- | --- | --- | --- | --- | --- | --- | --- | --- | --- |
|  | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 71112 | 73712 | 73712 | 73712 | 75376 | 75376 | 76208 | 76208 | 76208 |
| 29 | 75376 | 76208 | 76208 | 76208 | 78704 | 78704 | 78704 | 81176 | 81176 | 81176 |
| 30 | 78704 | 81176 | 81176 | 81176 | 81176 | 84760 | 84760 | 84760 | 84760 | 87936 |
| 31 | 84760 | 84760 | 84760 | 84760 | 87936 | 87936 | 87936 | 87936 | 90816 | 90816 |
| 32 | 87936 | 87936 | 87936 | 87936 | 90816 | 90816 | 90816 | 93800 | 93800 | 93800 |
| 33 | 97896 | 97896 | 97896 | 97896 | 97896 | 97896 | 97896 | 97896 | 97896 | 97896 |

A method of calculating TBS values related to 256QAM, among TBS values in the TBS table of Rank 1, was described. Hereinafter, TBS values of Rank 2 to Rank 4 will be described.

[Define a TBS of Rank 2 to Rank 4]

In the typical Rank 1 (or 1-Layer Spatial multiplexing), a TBS with maximum transmission efficiency for supporting 64QAM is 75376. In the present disclosure, to support 256QAM, the maximum transmission efficiency is increased in comparison with the typical case. Therefore, a new Rank 1 TBS for supporting the increased maximum transmission efficiency has been added. Added TBSs are 76208, 78704, 81176, 84760, 87936, 90816, 93800, and 97896. Table 37 lists TBSs that are greater than the largest TBS of Table 2 and Table 3 from among the TBSs of Table 5, based on the typical code block segmentation method.

TABLE 37

| TBS | B' | TBS | B' |
| --- | --- | --- | --- |
| 302776 | 304000 | 305976 | 307200 |
| 308832 | 310080 | 312096 | 313344 |
| 314888 | 316160 | 318216 | 319488 |
| 320944 | 322240 | 324336 | 325632 |
| 327000 | 328320 | 330456 | 331776 |
| 333056 | 334400 | 336576 | 337920 |
| 339112 | 340480 | 342696 | 344064 |
| 345168 | 346560 | 348816 | 350208 |
| 351224 | 352640 | 354936 | 356352 |
| 357280 | 358720 | 361056 | 362496 |
| 363336 | 364800 | 367176 | 368640 |
| 369392 | 370880 | 373296 | 374784 |
| 375448 | 376960 | 379416 | 380928 |
| 381504 | 383040 | 385536 | 387072 |
| 387560 | 389120 | 391656 | 393216 |

In the present disclosure, the following methods are used to define a TBS of Rank 2 to Rank 4 (or 2-Layer Spatial multiplexing to 4-Layer Spatial multiplexing) in association with the added Rank 1 TBS.

With respect to an added TBS

1) The smallest TBS index in association with the TBS is selected from the Rank 1 TBS table.

2) The smallest number $N_{PRBmin}$ of PRB pairs in association with the TBS is selected from the Rank 1 TBS table.

3) A block size $B'_{temp}$ is calculated.

$B'_{temp} = N_{tonePerPRB} * N_{PRB} * M * \text{code rate} * L$

When the transmission efficiency of the MCS associated with the smallest TBS index is the maximum transmission efficiency, code rate=0.93 is used.

When the transmission efficiency of the MCS associated with the smallest TBS index is not the maximum transmission efficiency, code rate=R/1024 is used by taking into consideration the MCS associated with the smallest TBS index.

M indicates the modulation order of an MCS associated with the smallest TBS index.

L represents Rank and may have a value of 2, 3, or 4 based on the supported Rank.

4) With respect to $B'_{temp}$

When the transmission efficiency of the MCS associated with the smallest TBS index is the maximum transmission efficiency, A largest B' value is selected from B's that are less than $B'_{temp}$ and are included from Table 2 or Table 3 or from Table 37. A TBS corresponding to B' obtained from Table 2, Table 3, or Table 27 is defined as a TBS for the defined $N_{PRB}$ and the MCS index 28

When the transmission efficiency of the MCS associated with the smallest TBS index is not the maximum transmission efficiency, A largest B' value is selected from B's that are less than B'$_{temp}$ and included in Table 2, Table 3, or Table 37. The selected largest B' value is referred to as B'$_-$. Also, a smallest B' value is selected from B's that are greater than B'$_{temp}$ and are included in Table 2, Table 3, or Table 37. The selected B' is referred to as B'$_+$.

SE$_-$ and SE$_+$ are calculated using equations of SE$_-$=B'$_-$/(N$_{tonerPRB}$*N$_{PRBmin}$*L) and SE$_+$=B'$_+$/(N$_{toneperPRB}$*N$_{PRBmin}$*L).

SE$_{Target}$ is calculated using an equation of: SE$_{Target}$=M*(R/1024). (SE$_{Target}$−SE$_-$) is compared with (SE$_{Target}$−SE$_+$).

IF |SE$_{Target}$−SE$_-$|≥|SE$_{Target}$−SE$_+$|,

B'=B'$_+$

ELSE,

B'=B'$_-$

6) A TBS corresponding to B' obtained from Table 2, Table 3, or Table 37 is defined as a Rank 2~4 TBS for the TBS Various embodiments of the present disclosure will be provided. In the following embodiments, when the transmission efficiency of the MCS associated with the smallest TBS index is the maximum transmission efficiency, N$_{toneperPRB}$=136 is used, and otherwise, N$_{toneperPRB}$=120 is used.

In association with TBSs 76208, 78704, 81176, 84760, 87936, 90816, 93800, and 97896 in the TBS table of Table 7 of the first embodiment, the smallest TBS index and the smallest number N$_{PRBmin}$ of PRB pairs may be listed as shown in Table 38.

TABLE 38

| | | |
|---|---|---|
| 76208 | 33 | 107 |
| 78704 | 33 | 110 |
| 81176 | 34 | 104 |
| 84760 | 34 | 108 |
| 87936 | 35 | 104 |
| 90816 | 35 | 107 |
| 93800 | 36 | 94 |
| 97896 | 36 | 98 |

Ranks 2 to 4 TBSs obtained through the above described method of the present disclosure are listed as shown in Table 39.

TABLE 39

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 320944 |
| 84760 | 165216 | 245648 | 333056 |
| 87936 | 171888 | 254328 | 345168 |
| 90816 | 177816 | 266440 | 357280 |
| 93800 | 187712 | 275376 | 375448 |
| 97896 | 195816 | 293736 | 391656 |

In association with the TBS table of Table 9 in the second embodiment, Ranks 2 to 4 TBSs obtained through the above described method according to at least one embodiment of the present disclosure are listed as shown in Table 40.

TABLE 40

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 318216 |
| 84760 | 165216 | 245648 | 333056 |
| 87936 | 171888 | 254328 | 345168 |
| 90816 | 177816 | 266440 | 357280 |
| 93800 | 181656 | 275376 | 369392 |
| 97896 | 195816 | 293736 | 393616 |

In association with the TBS table of Table 11 in the third embodiment, Ranks 2 to 4 TBSs obtained through the above described method according to at least one embodiment of the present disclosure are listed as shown in Table 41.

TABLE 41

| Rank 1 TBS | Rank 2 TBS | Rank 3 TBS | Rank 4 TBS |
|---|---|---|---|
| 76208 | 152976 | 226416 | 305976 |
| 78704 | 152976 | 230104 | 308832 |
| 81176 | 157432 | 236160 | 320944 |
| 84760 | 165216 | 245648 | 333056 |
| 87936 | 171888 | 254328 | 345168 |
| 90816 | 177816 | 266440 | 357280 |
| 93800 | 187712 | 275376 | 375448 |
| 97896 | 195816 | 293736 | 391656 |

In association with the TBS table of Table 13 in the fourth embodiment, Ranks 2 to 4 TBSs obtained through the above described method according to at least one embodiment of the present disclosure are listed as shown in Table 42.

TABLE 42

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 318216 |
| 84760 | 165216 | 245648 | 333056 |
| 87936 | 171888 | 254328 | 345168 |
| 90816 | 177816 | 266440 | 357280 |
| 93800 | 187712 | 275376 | 375448 |
| 97896 | 195816 | 293736 | 393616 |

In association with the TBS table of Table 15 in the fifth embodiment, Ranks 2 to 4 TBSs obtained through the above described method according to at least one embodiment of the present disclosure are listed as shown in Table 43.

TABLE 43

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 320944 |
| 84760 | 165216 | 245648 | 333056 |
| 87936 | 171888 | 254328 | 345168 |
| 90816 | 177816 | 266440 | 357280 |
| 93800 | 187712 | 275376 | 375448 |
| 97896 | 195816 | 293736 | 391656 |

In association with the TBS table of Table 17 in the sixth embodiment, Ranks 2 to 4 TBSs obtained through the above described method according to at least one embodiment of the present disclosure are listed as shown in Table 44.

TABLE 44

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 318216 |
| 84760 | 165216 | 245648 | 330456 |
| 87936 | 171888 | 254328 | 345168 |
| 90816 | 177816 | 266440 | 357280 |
| 93800 | 187712 | 275376 | 375448 |
| 97896 | 195816 | 293736 | 393616 |

In association with the TBS table of Table 19 in the seventh embodiment, Ranks 2 to 4 TBSs obtained through the above described method according to at least one embodiment of the present disclosure are listed as shown in Table 45.

TABLE 45

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 320944 |
| 84760 | 165216 | 245648 | 333056 |
| 87936 | 171888 | 254328 | 345168 |
| 90816 | 177816 | 266440 | 357280 |
| 93800 | 187712 | 275376 | 375448 |
| 97896 | 195816 | 293736 | 391656 |

In association with the TBS table of Table 21 in the eighth embodiment, Ranks 2 to 4 TBSs obtained through the above described method according to at least one embodiment of the present disclosure are listed as shown in Table 46.

TABLE 46

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 318216 |
| 84760 | 165216 | 245648 | 330456 |
| 87936 | 171888 | 254328 | 345168 |
| 90816 | 177816 | 266440 | 357280 |
| 93800 | 187712 | 275376 | 375448 |
| 97896 | 195816 | 293736 | 393616 |

In association with the TBS table of Table 23 in the ninth embodiment, Ranks 2 to 4 TBSs obtained through the above described method according to at least one embodiment of the present disclosure are listed as shown in Table 47.

TABLE 47

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 312096 |
| 81176 | 157432 | 236160 | 320944 |
| 84760 | 165216 | 245648 | 330456 |
| 87936 | 171888 | 254328 | 345168 |
| 90816 | 177816 | 266440 | 357280 |
| 93800 | 181656 | 275376 | 369392 |
| 97896 | 195816 | 293736 | 391656 |

In association with the TBS table 25 in the tenth embodiment, Ranks 2 to 4 TBSs obtained through the above described method according to at least one embodiment of the present disclosure are listed as shown in Table 48.

TABLE 48

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 320944 |
| 84760 | 165216 | 245648 | 333056 |
| 87936 | 171888 | 254328 | 345168 |
| 90816 | 177816 | 266440 | 357280 |
| 93800 | 181656 | 275376 | 369392 |
| 97896 | 195816 | 293736 | 393616 |

In association with the TBS table of Table 27 in the eleventh embodiment, Ranks 2 to 4 TBSs obtained through the above described method according to at least one embodiment of the present disclosure are listed as shown in Table 49.

TABLE 49

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 312096 |
| 81176 | 157432 | 236160 | 320944 |
| 84760 | 165216 | 245648 | 330456 |
| 87936 | 171888 | 254328 | 345168 |
| 90816 | 177816 | 266440 | 357280 |
| 93800 | 185728 | 275376 | 369392 |
| 97896 | 195816 | 293736 | 391656 |

In association with the TBS table of Table 29 in the twelfth embodiment, Ranks 2 to 4 TBSs obtained through the above described method according to at least one embodiment of the present disclosure are listed as shown in Table 50.

TABLE 50

| Rank 1 TBS | Rank 2 TBS | Rank 3 TBS | Rank 4 TBS |
|---|---|---|---|
| 76208 | 151376 | 226416 | 302776 |
| 78704 | 152976 | 230104 | 308832 |
| 81176 | 157432 | 236160 | 320944 |
| 84760 | 165216 | 245648 | 333056 |
| 87936 | 171888 | 254328 | 345168 |
| 90816 | 177816 | 266440 | 357280 |
| 93800 | 181656 | 275376 | 369392 |
| 97896 | 195816 | 293736 | 393616 |

A method of calculating Ranks 2 to 4 TBSs by applying the Ranks 2 to 4 calculation method to each embodiment of the above described Rank 1, has been described.

As described above, a base station according to embodiments of the present disclosure may generate data segmentations by segmenting data for downlink data transmission by referring to a TBS index determined based on the above described first to sixteenth embodiments. Such operation of a base station and a user equipment will be described based on the sixteenth embodiment with reference to FIG. 16 and FIG. 17. However, the present disclosure is not limited thereto. For example, the base station and UE of FIG. 16 and FIG. 17 will also equally operate in the above described first to fifteenth embodiments.

Figure 16:
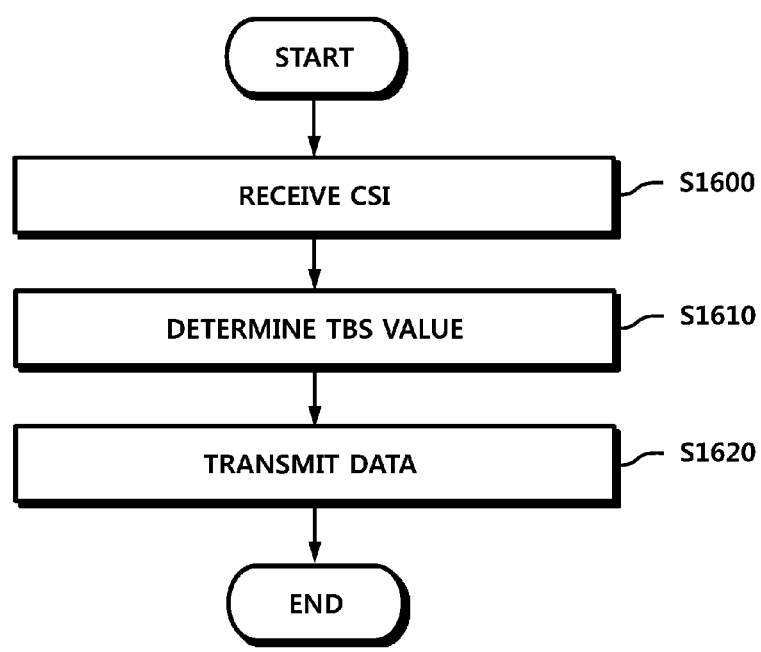
FIG. 16 is a diagram illustrating operations of a base station according to the present disclosure.

FIG. 16 is a flowchart for illustrating operations of a base station according to at least one embodiment of the present disclosure.

A method for a base station to transmit data according to at least one embodiment of the present disclosure includes receiving CSI from a UE, determining a TBS value based on a TBS table including indices for supporting the 256QAM modulation scheme and the number of allocable PRB pairs, and transmitting data using the TBS value.

Referring to FIG. 16, the operations of the base station include receiving CSI from the UE, in operation 51600. For example, the base station may receive CSI including CQI information from the UE. The CSI may include information indicating the quality of a downlink channel.

The operations of the base station may include determining a TBS value based on the TBS table including indices corresponding to the 256 QAM modulation scheme and the number of allocable PRB pairs, in operation 51610. For example, the base station may select an MCS index based on CQI index information that may be included in the CSI. The selected MCS index information has a corresponding relationship with a TBS index, as described above, and thus, the base station may determine a TBS index. In addition, a TBS value may be determined using the number of PRB pairs that may be determined based on a frequency bandwidth of a downlink channel and the selected TBS index. That is, the base station may determine the TBS value used for data transmission, using the TBS table including indices corresponding to the 256QAM modulation scheme, the number $N_{PRB}$ of PRB pairs, and the TBS index number.

The TBS table may set the TBS indices 27 to 33 for supporting the 256QAM modulation scheme. In addition, a TBS value corresponding to the 256 QAM modulation scheme in the TBS table of the present disclosure may be set based on the number of resource elements of a single PRB pair, the number of allocable PRB pairs, and a transmission efficiency value for each index. For example, a TBS value for each TBS index for 256QAM in the TBS table including indices for supporting the 256 QAM modulation scheme may be set as described with reference to FIG. 9 to FIG. 15. In addition, a TBS value of each TBS index may be set as shown in each table that has been described above.

In addition, the base station may include transmitting data using the TBS value, in operation 51620. The base station executes channel encoding using the described TBS value, and transmits the data to the UE.

Figure 17:
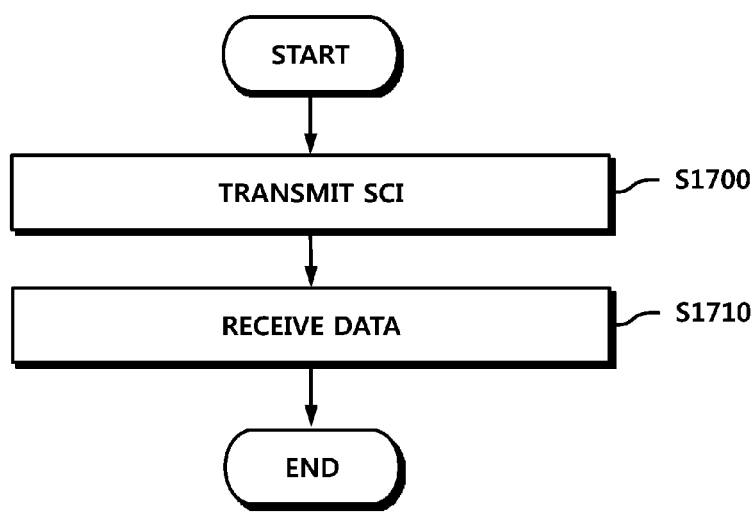
FIG. 17 is a diagram illustrating operations of a User Equipment according to the present disclosure.

FIG. 17 is a flowchart illustrating operations of a UE according to at least one embodiment of the present disclosure.

A method for a UE to receive data according to at least one embodiment of the present disclosure may include transmitting CSI to a base station, and receiving data using a TBS value determined based on the CSI. Here, the TBS value is determined based on the TBS table including indices for supporting the 256 QAM modulation scheme and the number of allocable PRB pairs.

Referring to FIG. 17, the operations of the UE include transmitting CSI to the base station, in operation S1700. The UE may receive a reference signal from the base station and may measure channel quality with respect to a downlink channel. Subsequently, the UE may transmit, to the base station, the measured channel quality information with respect to the downlink channel, using the CSI. That is, the UE includes CQI index information in the CSI information and transmits the same, so as to report, to the base station, the channel quality information with respect to the downlink channel.

Subsequently, the UE receives downlink data from the base station in operation 51710. In this instance, the UE may further receive MCS index information including information associated with a modulation order.

As described above, the data that the UE receives is generated using a TBS value determined based on a TBS table including indices for supporting the 256 QAM modulation scheme and the number of allocable PRB pairs.

The TBS table may set the TBS indices 27 to 33 for supporting the 256QAM modulation scheme. In addition, a TBS value for the 256 QAM modulation scheme in the TBS table of the present disclosure may be set based on the number of resource elements of a single PRB pair, the number of allocable PRB pairs, and a transmission efficiency value for each index. For example, a TBS value for each TBS index for 256QAM in the TBS table including indices for the 256 QAM modulation scheme may be set as described with reference to FIG. 9 to FIG. 15. In addition, a TBS value of each TBS index may be set as shown in each table that has been described above.

In addition, the base station and the UE are capable of executing operations required for implementing the embodiments of the present disclosure.

Figure 18:
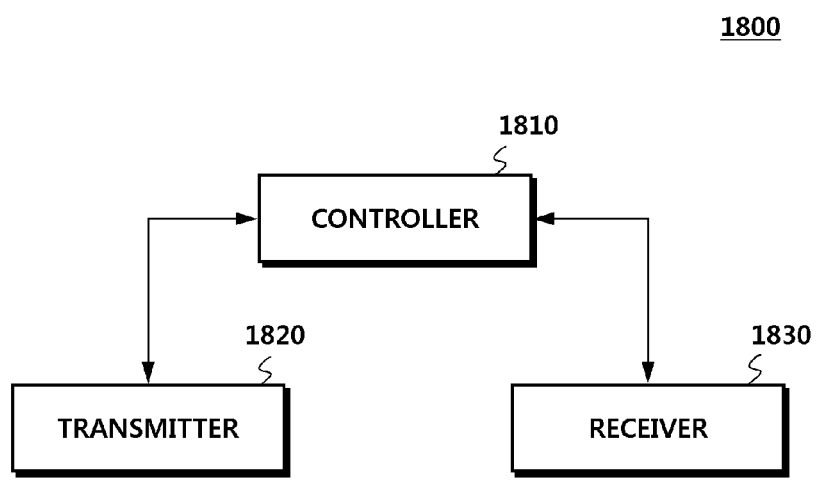
FIG. 18 is a diagram illustrating the configuration of a base station according to the present disclosure.

FIG. 18 is a diagram illustrating the configuration of a base station according to at least one embodiment of the present disclosure.

Referring to FIG. 18, a base station 1800 according to at least one embodiment of the present disclosure includes a controller 1810, a transmitter 1820, and a receiver 1830.

The receiver 1830 may receive CSI from a UE. In addition, the receiver 1830 may receive, from the UE, uplink control information, downlink data, a message, through a corresponding channel.

The base station 1810 determines a TBS value based on a TBS table including indices for supporting the 256 QAM modulation scheme and the number of allocable PRB pairs. In addition, the controller 1810 controls the general operations of the base station in association with each embodiment, when a TBS value for supporting 256QAM is determined and when a Rank 1 TBS associated with an MCS corresponding to 256 QAM is set, which are required for implementing the present disclosure.

The transmitter 1820 may transmit data using a TBS value. In addition, the transmitter 1820 may transmit, to the UE, a signal, a message, or data required for implementing the present disclosure.

Figure 19:
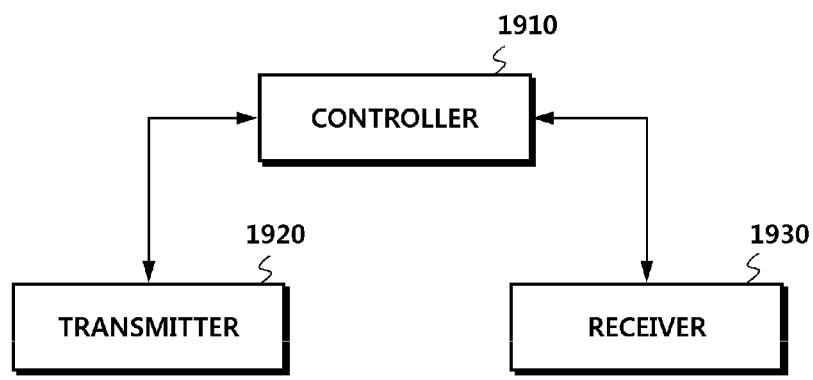
FIG. 19 is a diagram illustrating the configuration of a User Equipment according to the present disclosure.

FIG. 19 is a diagram illustrating the configuration of a UE according to at least one embodiment of the present disclosure.

Referring to FIG. 19, a UE 1900 according to at least one embodiment of the present disclosure includes a receiver 1930, a controller 1910, and a transmitter 1920.

The receiver 1930 may receive, from a base station, downlink control information, data, a message, through a corresponding channel. In addition, the receiver 1930 may receive the generated data using a TBS value determined based on the above described embodiments of the present disclosure.

The transmitter 1920 may transmit, to the base station, CSI including downlink channel quality information. In addition, the transmitter 1920 may transmit, to the base station, uplink control information, data, a message, through a corresponding channel.

In addition, the controller 1910 may control the general operations of the UE in association with CSI transmission and data reception, which are required for implementing the present disclosure.

Although the embodiments of the present disclosure have been described for illustrative purposes, those skilled in the art will appreciate that various modifications, additions and substitutions are possible, without departing from the scope and spirit of the disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A method for a base station to transmit data, the method comprising:
   receiving Channel State Information (CSI) from a User Equipment;
   determining a Transport Block Size (TBS) value based on a TBS table including indices for supporting a 256 quadrature amplitude modulation (QAM) modulation scheme and a number of allocable Physical Resource Block (PRB) pairs; and
   transmitting data using the TBS value,
   wherein the TBS table sets TBS indices 27 to 33 for supporting the 256QAM modulation scheme; and TBS values for supporting the 256QAM modulation scheme in the TBS table are set based on a number of resource elements of a PRB pair, a number of allocable PRB pairs, and a transmission efficiency value for each index; and
   wherein TBS values of the TBS indices 27 to 32 are set by applying a condition that the number of resource elements of the PRB pair is 120; a TBS value of the TBS index 33 is set by applying a condition that the number of resource elements of the PRB pair is 136; and the TBS values of the TBS indices 27 to 33 are set by applying a condition that the number of allocable PRB pairs is inclusively between 1 and 110,
   wherein a TBS value of the TBS index 28 for supporting the 256QAM modulation scheme in the TBS table is set as shown in the following table

| $N_{PRB}$ | 1 | 2 | 3 | 4 | 5 | 6 | 7 | 8 |
|---|---|---|---|---|---|---|---|---|
| TBS | 680 | 1384 | 2088 | 2792 | 3496 | 4264 | 4968 | 5544 |
| $N_{PRB}$ | 9 | 10 | 11 | 12 | 13 | 14 | 15 | 16 |
| TBS | 6200 | 6968 | 7736 | 8504 | 9144 | 9912 | 10680 | 11064 |
| $N_{PRB}$ | 17 | 18 | 19 | 20 | 21 | 22 | 23 | 24 |
| TBS | 11832 | 12576 | 13536 | 14112 | 14688 | 15264 | 16416 | 16992 |
| $N_{PRB}$ | 25 | 26 | 27 | 28 | 29 | 30 | 31 | 32 |
| TBS | 17568 | 18336 | 19080 | 19848 | 20616 | 21384 | 22152 | 22152 |
| $N_{PRB}$ | 33 | 34 | 35 | 36 | 37 | 38 | 39 | 40 |
| TBS | 22920 | 23688 | 24496 | 25456 | 26416 | 26416 | 27376 | 28336 |
| $N_{PRB}$ | 41 | 42 | 43 | 44 | 45 | 46 | 47 | 48 |
| TBS | 29296 | 29296 | 30576 | 30576 | 31704 | 32856 | 32856 | 34008 |
| $N_{PRB}$ | 49 | 50 | 51 | 52 | 53 | 54 | 55 | 56 |
| TBS | 34008 | 35160 | 35160 | 36696 | 36696 | 37888 | 39232 | 39232 |
| $N_{PRB}$ | 57 | 58 | 59 | 60 | 61 | 62 | 63 | 64 |
| TBS | 40576 | 40576 | 42368 | 42368 | 42368 | 43816 | 43816 | 45352 |
| $N_{PRB}$ | 65 | 66 | 67 | 68 | 69 | 70 | 71 | 72 |
| TBS | 45352 | 46888 | 46888 | 46888 | 48936 | 48936 | 48936 | 51024 |
| $N_{PRB}$ | 73 | 74 | 75 | 76 | 77 | 78 | 79 | 80 |
| TBS | 51024 | 52752 | 52752 | 52752 | 55056 | 55056 | 55056 | 57336 |
| $N_{PRB}$ | 81 | 82 | 83 | 84 | 85 | 86 | 87 | 88 |
| TBS | 57336 | 57336 | 59256 | 59256 | 59256 | 61664 | 61664 | 61664 |
| $N_{PRB}$ | 89 | 90 | 91 | 92 | 93 | 94 | 95 | 96 |
| TBS | 61664 | 63776 | 63776 | 63776 | 66592 | 66592 | 66592 | 66592 |
| $N_{PRB}$ | 97 | 98 | 99 | 100 | 101 | 102 | 103 | 104 |
| TBS | 68808 | 68808 | 68808 | 71112 | 71112 | 71112 | 73712 | 73712 |
| $N_{PRB}$ | 105 | 106 | 107 | 108 | 109 | 110 | | |
| TBS | 73712 | 75376 | 75376 | 76208 | 76208 | 76208. | | |

2. The method of claim 1, wherein a TBS value of the TBS index 27 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 648 | 1320 | 1992 | 2664 | 3368 | 4008 | 4584 | 5352 | 5992 | 6712 |
| $N_{PRB}$ | 11 | 12 | 13 | 14 | 15 | 16 | 17 | 18 | 19 | 20 |
| TBS | 7224 | 7992 | 8504 | 9144 | 9912 | 10680 | 11448 | 11832 | 12576 | 12960 |
| $N_{PRB}$ | 21 | 22 | 23 | 24 | 25 | 26 | 27 | 28 | 29 | 30 |
| TBS | 14112 | 14688 | 15264 | 15840 | 16416 | 16992 | 17568 | 18336 | 19080 | 19848 |
| $N_{PRB}$ | 31 | 32 | 33 | 34 | 35 | 36 | 37 | 38 | 39 | 40 |
| TBS | 20616 | 21384 | 22152 | 22920 | 22920 | 23688 | 24496 | 25456 | 25456 | 26416 |

-continued

| $N_{PRB}$ | 41 | 42 | 43 | 44 | 45 | 46 | 47 | 48 | 49 | 50 |
|---|---|---|---|---|---|---|---|---|---|---|
| TBS | 27376 | 27376 | 28336 | 29296 | 29296 | 30576 | 31704 | 31704 | 32856 | 32856 |
| $N_{PRB}$ | 51 | 52 | 53 | 54 | 55 | 56 | 57 | 58 | 59 | 60 |
| TBS | 34008 | 34008 | 35160 | 35160 | 36696 | 36696 | 37888 | 37888 | 39232 | 39232 |
| $N_{PRB}$ | 61 | 62 | 63 | 64 | 65 | 66 | 67 | 68 | 69 | 70 |
| TBS | 40576 | 40576 | 42368 | 42368 | 43816 | 43816 | 43816 | 45352 | 45352 | 46888 |
| $N_{PRB}$ | 71 | 72 | 73 | 74 | 75 | 76 | 77 | 78 | 79 | 80 |
| TBS | 46888 | 46888 | 48936 | 48936 | 48936 | 51024 | 51024 | 51024 | 52752 | 52752 |
| $N_{PRB}$ | 81 | 82 | 83 | 84 | 85 | 86 | 87 | 88 | 89 | 90 |
| TBS | 52752 | 55056 | 55056 | 55056 | 57336 | 57336 | 57336 | 59256 | 59256 | 59256 |
| $N_{PRB}$ | 91 | 92 | 93 | 94 | 95 | 96 | 97 | 98 | 99 | 100 |
| TBS | 59256 | 61664 | 61664 | 61664 | 63776 | 63776 | 63776 | 63776 | 66592 | 66592 |
| $N_{PRB}$ | 101 | 102 | 103 | 104 | 105 | 106 | 107 | 108 | 109 | 110 |
| TBS | 66592 | 66592 | 68808 | 68808 | 68808 | 71112 | 71112 | 71112 | 71112 | 73712. |

3. The method of claim 1, wherein a TBS value of the TBS index 29 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 712 | 1480 | 2216 | 2984 | 3752 | 4392 | 5160 | 5992 | 6712 | 7480 |
| $N_{PRB}$ | 11 | 12 | 13 | 14 | 15 | 16 | 17 | 18 | 19 | 20 |
| TBS | 8248 | 8760 | 9528 | 10296 | 11064 | 11832 | 12576 | 13536 | 14112 | 14688 |
| $N_{PRB}$ | 21 | 22 | 23 | 24 | 25 | 26 | 27 | 28 | 29 | 30 |
| TBS | 15840 | 16416 | 16992 | 17568 | 18336 | 19080 | 19848 | 20616 | 21384 | 22152 |
| $N_{PRB}$ | 31 | 32 | 33 | 34 | 35 | 36 | 37 | 38 | 39 | 40 |
| TBS | 22920 | 23688 | 24496 | 25456 | 26416 | 26416 | 27376 | 28336 | 29296 | 29296 |
| $N_{PRB}$ | 41 | 42 | 43 | 44 | 45 | 46 | 47 | 48 | 49 | 50 |
| TBS | 30576 | 31704 | 31704 | 32856 | 34008 | 34008 | 35160 | 35160 | 36696 | 36696 |
| $N_{PRB}$ | 51 | 52 | 53 | 54 | 55 | 56 | 57 | 58 | 59 | 60 |
| TBS | 37888 | 39232 | 39232 | 40576 | 40576 | 42368 | 42368 | 43816 | 43816 | 45352 |
| $N_{PRB}$ | 61 | 62 | 63 | 64 | 65 | 66 | 67 | 68 | 69 | 70 |
| TBS | 45352 | 45352 | 46888 | 46888 | 48936 | 48936 | 48936 | 51024 | 51024 | 52752 |
| $N_{PRB}$ | 71 | 72 | 73 | 74 | 75 | 76 | 77 | 78 | 79 | 80 |
| TBS | 52752 | 52752 | 55056 | 55056 | 55056 | 57336 | 57336 | 57336 | 59256 | 59256 |
| $N_{PRB}$ | 81 | 82 | 83 | 84 | 85 | 86 | 87 | 88 | 89 | 90 |
| TBS | 59256 | 61664 | 61664 | 61664 | 63776 | 63776 | 63776 | 66592 | 66592 | 66592 |
| $N_{PRB}$ | 91 | 92 | 93 | 94 | 95 | 96 | 97 | 98 | 99 | 100 |
| TBS | 66592 | 68808 | 68808 | 68808 | 71112 | 71112 | 71112 | 73712 | 73712 | 73712 |
| $N_{PRB}$ | 101 | 102 | 103 | 104 | 105 | 106 | 107 | 108 | 109 | 110 |
| TBS | 75376 | 76208 | 76208 | 76208 | 78704 | 78704 | 78704 | 81176 | 81176 | 81176. |

4. The method of claim 1, wherein a TBS value of the TBS index 30 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 776 | 1544 | 2344 | 3112 | 3880 | 4776 | 5544 | 6200 | 6968 | 7736 |
| $N_{PRB}$ | 11 | 12 | 13 | 14 | 15 | 16 | 17 | 18 | 19 | 20 |
| TBS | 8504 | 9528 | 10296 | 11064 | 11832 | 12576 | 13536 | 14112 | 14688 | 15840 |
| $N_{PRB}$ | 21 | 22 | 23 | 24 | 25 | 26 | 27 | 28 | 29 | 30 |
| TBS | 16416 | 16992 | 18336 | 19080 | 19848 | 20616 | 21384 | 22152 | 22920 | 23688 |
| $N_{PRB}$ | 31 | 32 | 33 | 34 | 35 | 36 | 37 | 38 | 39 | 40 |
| TBS | 24496 | 25456 | 25456 | 26416 | 27376 | 28336 | 29296 | 29296 | 30576 | 31704 |
| $N_{PRB}$ | 41 | 42 | 43 | 44 | 45 | 46 | 47 | 48 | 49 | 50 |
| TBS | 31704 | 32856 | 34008 | 34008 | 35160 | 36696 | 36696 | 37888 | 37888 | 39232 |
| $N_{PRB}$ | 51 | 52 | 53 | 54 | 55 | 56 | 57 | 58 | 59 | 60 |
| TBS | 40576 | 40576 | 42368 | 42368 | 43816 | 43816 | 45352 | 45352 | 46888 | 46888 |
| $N_{PRB}$ | 61 | 62 | 63 | 64 | 65 | 66 | 67 | 68 | 69 | 70 |
| TBS | 46888 | 48936 | 48936 | 51024 | 51024 | 51024 | 52752 | 52752 | 55056 | 55056 |
| $N_{PRB}$ | 71 | 72 | 73 | 74 | 75 | 76 | 77 | 78 | 79 | 80 |
| TBS | 55056 | 57336 | 57336 | 57336 | 59256 | 59256 | 59256 | 61664 | 61664 | 63776 |
| $N_{PRB}$ | 81 | 82 | 83 | 84 | 85 | 86 | 87 | 88 | 89 | 90 |
| TBS | 63776 | 63776 | 63776 | 66592 | 66592 | 66592 | 68808 | 68808 | 68808 | 71112 |
| $N_{PRB}$ | 91 | 92 | 93 | 94 | 95 | 96 | 97 | 98 | 99 | 100 |
| TBS | 71112 | 71112 | 73712 | 73712 | 75376 | 75376 | 76208 | 76208 | 78704 | 78704 |
| $N_{PRB}$ | 101 | 102 | 103 | 104 | 105 | 106 | 107 | 108 | 109 | 110 |
| TBS | 78704 | 81176 | 81176 | 81176 | 81176 | 84760 | 84760 | 84760 | 84760 | 87936. |

5. The method of claim 1, wherein a TBS value of the TBS index 31 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 808 | 1608 | 2472 | 3240 | 4136 | 4968 | 5736 | 6456 | 7480 | 8248 |
| $N_{PRB}$ | 11 | 12 | 13 | 14 | 15 | 16 | 17 | 18 | 19 | 20 |
| TBS | 9144 | 9912 | 10680 | 11448 | 12216 | 12960 | 14112 | 14688 | 15840 | 16416 |
| $N_{PRB}$ | 21 | 22 | 23 | 24 | 25 | 26 | 27 | 28 | 29 | 30 |
| TBS | 17568 | 18336 | 19080 | 19848 | 20616 | 21384 | 22152 | 22920 | 23688 | 24496 |
| $N_{PRB}$ | 31 | 32 | 33 | 34 | 35 | 36 | 37 | 38 | 39 | 40 |
| TBS | 25456 | 26416 | 27376 | 28336 | 29296 | 29296 | 30576 | 31704 | 31704 | 32856 |
| $N_{PRB}$ | 41 | 42 | 43 | 44 | 45 | 46 | 47 | 48 | 49 | 50 |
| TBS | 34008 | 35160 | 35160 | 36696 | 36696 | 37888 | 39232 | 39232 | 40576 | 40576 |
| $N_{PRB}$ | 51 | 52 | 53 | 54 | 55 | 56 | 57 | 58 | 59 | 60 |
| TBS | 42368 | 42368 | 43816 | 45352 | 45352 | 46888 | 46888 | 46888 | 48936 | 48936 |
| $N_{PRB}$ | 61 | 62 | 63 | 64 | 65 | 66 | 67 | 68 | 69 | 70 |
| TBS | 51024 | 51024 | 52752 | 52752 | 52752 | 55056 | 55056 | 55056 | 57336 | 57336 |

-continued

| $N_{PRB}$ | 71 | 72 | 73 | 74 | 75 | 76 | 77 | 78 | 79 | 80 |
|---|---|---|---|---|---|---|---|---|---|---|
| TBS | 59256 | 59256 | 59256 | 61664 | 61664 | 63776 | 63776 | 63776 | 66592 | 66592 |
| $N_{PRB}$ | 81 | 82 | 83 | 84 | 85 | 86 | 87 | 88 | 89 | 90 |
| TBS | 66592 | 68808 | 68808 | 68808 | 71112 | 71112 | 71112 | 73712 | 73712 | 73712 |
| $N_{PRB}$ | 91 | 92 | 93 | 94 | 95 | 96 | 97 | 98 | 99 | 100 |
| TBS | 75376 | 76208 | 76208 | 78704 | 78704 | 78704 | 81176 | 81176 | 81176 | 81176 |
| $N_{PRB}$ | 101 | 102 | 103 | 104 | 105 | 106 | 107 | 108 | 109 | 110 |
| TBS | 84760 | 84760 | 84760 | 84760 | 87936 | 87936 | 87936 | 87936 | 90816 | 90816. |

6. The method of claim 1, wherein a TBS value of the TBS index 32 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 840 | 1672 | 2536 | 3368 | 4264 | 5160 | 5992 | 6712 | 7736 | 8504 |
| $N_{PRB}$ | 11 | 12 | 13 | 14 | 15 | 16 | 17 | 18 | 19 | 20 |
| TBS | 9528 | 10296 | 11064 | 11832 | 12960 | 13536 | 14688 | 15264 | 16416 | 16992 |
| $N_{PRB}$ | 21 | 22 | 23 | 24 | 25 | 26 | 27 | 28 | 29 | 30 |
| TBS | 17568 | 19080 | 19848 | 20616 | 21384 | 22152 | 22920 | 23688 | 24496 | 25456 |
| $N_{PRB}$ | 31 | 32 | 33 | 34 | 35 | 36 | 37 | 38 | 39 | 40 |
| TBS | 26416 | 27376 | 28336 | 29296 | 29296 | 30576 | 31704 | 32856 | 32856 | 34008 |
| $N_{PRB}$ | 41 | 42 | 43 | 44 | 45 | 46 | 47 | 48 | 49 | 50 |
| TBS | 35160 | 35160 | 36696 | 37888 | 37888 | 39232 | 40576 | 40576 | 42368 | 42368 |
| $N_{PRB}$ | 51 | 52 | 53 | 54 | 55 | 56 | 57 | 58 | 59 | 60 |
| TBS | 43816 | 43816 | 45352 | 46888 | 46888 | 46888 | 48936 | 48936 | 51024 | 51024 |
| $N_{PRB}$ | 61 | 62 | 63 | 64 | 65 | 66 | 67 | 68 | 69 | 70 |
| TBS | 52752 | 52752 | 52752 | 55056 | 55056 | 57336 | 57336 | 57336 | 59256 | 59256 |
| $N_{PRB}$ | 71 | 72 | 73 | 74 | 75 | 76 | 77 | 78 | 79 | 80 |
| TBS | 61664 | 61664 | 61664 | 63776 | 63776 | 63776 | 66592 | 66592 | 66592 | 68808 |
| $N_{PRB}$ | 81 | 82 | 83 | 84 | 85 | 86 | 87 | 88 | 89 | 90 |
| TBS | 68808 | 71112 | 71112 | 71112 | 73712 | 73712 | 73712 | 75376 | 76208 | 76208 |
| $N_{PRB}$ | 91 | 92 | 93 | 94 | 95 | 96 | 97 | 98 | 99 | 100 |
| TBS | 78704 | 78704 | 78704 | 81176 | 81176 | 81176 | 84760 | 84760 | 84760 | 84760 |
| $N_{PRB}$ | 101 | 102 | 103 | 104 | 105 | 106 | 107 | 108 | 109 | 110 |
| TBS | 87936 | 87936 | 87936 | 87936 | 90816 | 90816 | 90816 | 93800 | 93800 | 93800. |

7. The method of claim 1, wherein a TBS value of the TBS index 33 that supports maximum transmission efficiency in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 968 | 1992 | 2984 | 4008 | 4968 | 5992 | 6968 | 7992 | 8760 | 9912 |
| $N_{PRB}$ | 11 | 12 | 13 | 14 | 15 | 16 | 17 | 18 | 19 | 20 |
| TBS | 10680 | 11832 | 12960 | 13536 | 14688 | 15840 | 16992 | 17568 | 19080 | 19848 |
| $N_{PRB}$ | 21 | 22 | 23 | 24 | 25 | 26 | 27 | 28 | 29 | 30 |
| TBS | 20616 | 21384 | 22920 | 23688 | 24496 | 25456 | 26416 | 27376 | 28336 | 29296 |
| $N_{PRB}$ | 31 | 32 | 33 | 34 | 35 | 36 | 37 | 38 | 39 | 40 |
| TBS | 30576 | 31704 | 32856 | 34008 | 35160 | 35160 | 36696 | 37888 | 39232 | 39232 |
| $N_{PRB}$ | 41 | 42 | 43 | 44 | 45 | 46 | 47 | 48 | 49 | 50 |
| TBS | 40576 | 40576 | 42368 | 43816 | 43816 | 45352 | 46888 | 46888 | 48936 | 48936 |
| $N_{PRB}$ | 51 | 52 | 53 | 54 | 55 | 56 | 57 | 58 | 59 | 60 |
| TBS | 51024 | 51024 | 52752 | 52752 | 55056 | 55056 | 57336 | 57336 | 59256 | 59256 |
| $N_{PRB}$ | 61 | 62 | 63 | 64 | 65 | 66 | 67 | 68 | 69 | 70 |
| TBS | 59256 | 61664 | 61664 | 63776 | 63776 | 63776 | 66592 | 66592 | 68808 | 68808 |
| $N_{PRB}$ | 71 | 72 | 73 | 74 | 75 | 76 | 77 | 78 | 79 | 80 |
| TBS | 71112 | 71112 | 71112 | 73712 | 75376 | 76208 | 76208 | 76208 | 78704 | 78704 |
| $N_{PRB}$ | 81 | 82 | 83 | 84 | 85 | 86 | 87 | 88 | 89 | 90 |
| TBS | 81176 | 81176 | 81176 | 81176 | 84760 | 84760 | 84760 | 87936 | 87936 | 87936 |
| $N_{PRB}$ | 91 | 92 | 93 | 94 | 95 | 96 | 97 | 98 | 99 | 100 |
| TBS | 90816 | 90816 | 90816 | 93800 | 93800 | 93800 | 93800 | 97896 | 97896 | 97896 |
| $N_{PRB}$ | 101 | 102 | 103 | 104 | 105 | 106 | 107 | 108 | 109 | 110 |
| TBS | 97896 | 97896 | 97896 | 97896 | 97896 | 97896 | 97896 | 97896 | 97896 | 97896. |

8. A method for a User Equipment to receive data, the method comprising:
transmitting Channel State Information (CSI) to a base station; and
receiving data using a Transport Block Size (TBS) value determined based on the CSI,
wherein the TBS value is determined based on a TBS table including indices for supporting a 256 quadrature amplitude modulation (QAM) modulation scheme, and a number of allocable Physical Resource Block (PRB) pairs;
wherein the TBS table sets TBS indices 27 to 33 for supporting the 256QAM modulation scheme; and TBS values for supporting the 256QAM modulation scheme in the TBS table are set based on a number of resource elements of a PRB pair, a number of allocable PRB pairs, and a transmission efficiency value for each index; and
wherein TBS values of the TBS indices 27 to 32 are set by applying a condition that the number of resource elements of the PRB pair is 120; a TBS value of the TBS index 33 is set by applying a condition that the number of resource elements of the PRB pair is 136; and the TBS values of the TBS indices 27 to 33 are set by applying a condition that the number of allocable PRB pairs is inclusively between 1 and 110,
wherein a TBS value of the TBS index 28 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 680 | 1384 | 2088 | 2792 | 3496 | 4264 | 4968 | 5544 | 6200 | 6968 |
| $N_{PRB}$ | 11 | 12 | 13 | 14 | 15 | 16 | 17 | 18 | 19 | 20 |
| TBS | 7736 | 8504 | 9144 | 9912 | 10680 | 11064 | 11832 | 12576 | 13536 | 14112 |

| $N_{PRB}$ | 21 | 22 | 23 | 24 | 25 | 26 | 27 | 28 | 29 | 30 |
|---|---|---|---|---|---|---|---|---|---|---|
| TBS | 14688 | 15264 | 16416 | 16992 | 17568 | 18336 | 19080 | 19848 | 20616 | 21384 |
| $N_{PRB}$ | 31 | 32 | 33 | 34 | 35 | 36 | 37 | 38 | 39 | 40 |
| TBS | 22152 | 22152 | 22920 | 23688 | 24496 | 25456 | 26416 | 26416 | 27376 | 28336 |
| $N_{PRB}$ | 41 | 42 | 43 | 44 | 45 | 46 | 47 | 48 | 49 | 50 |
| TBS | 29296 | 29296 | 30576 | 30576 | 31704 | 32856 | 32856 | 34008 | 34008 | 35160 |
| $N_{PRB}$ | 51 | 52 | 53 | 54 | 55 | 56 | 57 | 58 | 59 | 60 |
| TBS | 35160 | 36696 | 36696 | 37888 | 39232 | 39232 | 40576 | 40576 | 42368 | 42368 |
| $N_{PRB}$ | 61 | 62 | 63 | 64 | 65 | 66 | 67 | 68 | 69 | 70 |
| TBS | 42368 | 43816 | 43816 | 45352 | 45352 | 46888 | 46888 | 46888 | 48936 | 48936 |
| $N_{PRB}$ | 71 | 72 | 73 | 74 | 75 | 76 | 77 | 78 | 79 | 80 |
| TBS | 48936 | 51024 | 51024 | 52752 | 52752 | 52752 | 55056 | 55056 | 55056 | 57336 |
| $N_{PRB}$ | 81 | 82 | 83 | 84 | 85 | 86 | 87 | 88 | 89 | 90 |
| TBS | 57336 | 57336 | 59256 | 59256 | 59256 | 61664 | 61664 | 61664 | 61664 | 63776 |
| $N_{PRB}$ | 91 | 92 | 93 | 94 | 95 | 96 | 97 | 98 | 99 | 100 |
| TBS | 63776 | 63776 | 66592 | 66592 | 66592 | 66592 | 68808 | 68808 | 68808 | 71112 |
| $N_{PRB}$ | 101 | 102 | 103 | 104 | 105 | 106 | 107 | 108 | 109 | 110 |
| TBS | 71112 | 71112 | 73712 | 73712 | 73712 | 75376 | 75376 | 76208 | 76208 | 76208. |

9. The method of claim 8, wherein a TBS value of the TBS index 27 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 648 | 1320 | 1992 | 2664 | 3368 | 4008 | 4584 | 5352 | 5992 | 6712 |
| $N_{PRB}$ | 11 | 12 | 13 | 14 | 15 | 16 | 17 | 18 | 19 | 20 |
| TBS | 7224 | 7992 | 8504 | 9144 | 9912 | 10680 | 11448 | 11832 | 12576 | 12960 |
| $N_{PRB}$ | 21 | 22 | 23 | 24 | 25 | 26 | 27 | 28 | 29 | 30 |
| TBS | 14112 | 14688 | 15264 | 15840 | 16416 | 16992 | 17568 | 18336 | 19080 | 19848 |
| $N_{PRB}$ | 31 | 32 | 33 | 34 | 35 | 36 | 37 | 38 | 39 | 40 |
| TBS | 20616 | 21384 | 22152 | 22920 | 22920 | 23688 | 24496 | 25456 | 25456 | 26416 |
| $N_{PRB}$ | 41 | 42 | 43 | 44 | 45 | 46 | 47 | 48 | 49 | 50 |
| TBS | 27376 | 27376 | 28336 | 29296 | 29296 | 30576 | 31704 | 31704 | 32856 | 32856 |
| $N_{PRB}$ | 51 | 52 | 53 | 54 | 55 | 56 | 57 | 58 | 59 | 60 |
| TBS | 34008 | 34008 | 35160 | 35160 | 36696 | 36696 | 37888 | 37888 | 39232 | 39232 |
| $N_{PRB}$ | 61 | 62 | 63 | 64 | 65 | 66 | 67 | 68 | 69 | 70 |
| TBS | 40576 | 40576 | 42368 | 42368 | 43816 | 43816 | 43816 | 45352 | 45352 | 46888 |
| $N_{PRB}$ | 71 | 72 | 73 | 74 | 75 | 76 | 77 | 78 | 79 | 80 |
| TBS | 46888 | 46888 | 48936 | 48936 | 48936 | 51024 | 51024 | 51024 | 52752 | 52752 |
| $N_{PRB}$ | 81 | 82 | 83 | 84 | 85 | 86 | 87 | 88 | 89 | 90 |
| TBS | 52752 | 55056 | 55056 | 55056 | 57336 | 57336 | 57336 | 59256 | 59256 | 59256 |

-continued

| $N_{PRB}$ | 91 | 92 | 93 | 94 | 95 | 96 | 97 | 98 | 99 | 100 |
|---|---|---|---|---|---|---|---|---|---|---|
| TBS | 59256 | 61664 | 61664 | 61664 | 63776 | 63776 | 63776 | 63776 | 66592 | 66592 |
| $N_{PRB}$ | 101 | 102 | 103 | 104 | 105 | 106 | 107 | 108 | 109 | 110 |
| TBS | 66592 | 66592 | 68808 | 68808 | 68808 | 71112 | 71112 | 71112 | 71112 | 73712. |

10. The method of claim 8, wherein a TBS value of the TBS index 29 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 712 | 1480 | 2216 | 2984 | 3752 | 4392 | 5160 | 5992 | 6712 | 7480 |
| $N_{PRB}$ | 11 | 12 | 13 | 14 | 15 | 16 | 17 | 18 | 19 | 20 |
| TBS | 8248 | 8760 | 9528 | 10296 | 11064 | 11832 | 12576 | 13536 | 14112 | 14688 |
| $N_{PRB}$ | 21 | 22 | 23 | 24 | 25 | 26 | 27 | 28 | 29 | 30 |
| TBS | 15840 | 16416 | 16992 | 17568 | 18336 | 19080 | 19848 | 20616 | 21384 | 22152 |
| $N_{PRB}$ | 31 | 32 | 33 | 34 | 35 | 36 | 37 | 38 | 39 | 40 |
| TBS | 22920 | 23688 | 24496 | 25456 | 26416 | 26416 | 27376 | 28336 | 29296 | 29296 |
| $N_{PRB}$ | 41 | 42 | 43 | 44 | 45 | 46 | 47 | 48 | 49 | 50 |
| TBS | 30576 | 31704 | 31704 | 32856 | 34008 | 34008 | 35160 | 35160 | 36696 | 36696 |
| $N_{PRB}$ | 51 | 52 | 53 | 54 | 55 | 56 | 57 | 58 | 59 | 60 |
| TBS | 37888 | 39232 | 39232 | 40576 | 40576 | 42368 | 42368 | 43816 | 43816 | 45352 |
| $N_{PRB}$ | 61 | 62 | 63 | 64 | 65 | 66 | 67 | 68 | 69 | 70 |
| TBS | 45352 | 45352 | 46888 | 46888 | 48936 | 48936 | 48936 | 51024 | 51024 | 52752 |
| $N_{PRB}$ | 71 | 72 | 73 | 74 | 75 | 76 | 77 | 78 | 79 | 80 |
| TBS | 52752 | 52752 | 55056 | 55056 | 55056 | 57336 | 57336 | 57336 | 59256 | 59256 |
| $N_{PRB}$ | 81 | 82 | 83 | 84 | 85 | 86 | 87 | 88 | 89 | 90 |
| TBS | 59256 | 61664 | 61664 | 61664 | 63776 | 63776 | 63776 | 66592 | 66592 | 66592 |
| $N_{PRB}$ | 91 | 92 | 93 | 94 | 95 | 96 | 97 | 98 | 99 | 100 |
| TBS | 66592 | 68808 | 68808 | 68808 | 71112 | 71112 | 71112 | 73712 | 73712 | 73712 |
| $N_{PRB}$ | 101 | 102 | 103 | 104 | 105 | 106 | 107 | 108 | 109 | 110 |
| TBS | 75376 | 76208 | 76208 | 76208 | 78704 | 78704 | 78704 | 81176 | 81176 | 81176. |

11. The method of claim 8, wherein a TBS value of the TBS index 30 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 776 | 1544 | 2344 | 3112 | 3880 | 4776 | 5544 | 6200 | 6968 | 7736 |
| $N_{PRB}$ | 11 | 12 | 13 | 14 | 15 | 16 | 17 | 18 | 19 | 20 |
| TBS | 8504 | 9528 | 10296 | 11064 | 11832 | 12576 | 13536 | 14112 | 14688 | 15840 |

| $N_{PRB}$ | 21 | 22 | 23 | 24 | 25 | 26 | 27 | 28 | 29 | 30 |
|---|---|---|---|---|---|---|---|---|---|---|
| TBS | 16416 | 16992 | 18336 | 19080 | 19848 | 20616 | 21384 | 22152 | 22920 | 23688 |
| $N_{PRB}$ | 31 | 32 | 33 | 34 | 35 | 36 | 37 | 38 | 39 | 40 |
| TBS | 24496 | 25456 | 25456 | 26416 | 27376 | 28336 | 29296 | 29296 | 30576 | 31704 |
| $N_{PRB}$ | 41 | 42 | 43 | 44 | 45 | 46 | 47 | 48 | 49 | 50 |
| TBS | 31704 | 32856 | 34008 | 34008 | 35160 | 36696 | 36696 | 37888 | 37888 | 39232 |
| $N_{PRB}$ | 51 | 52 | 53 | 54 | 55 | 56 | 57 | 58 | 59 | 60 |
| TBS | 40576 | 40576 | 42368 | 42368 | 43816 | 43816 | 45352 | 45352 | 46888 | 46888 |
| $N_{PRB}$ | 61 | 62 | 63 | 64 | 65 | 66 | 67 | 68 | 69 | 70 |
| TBS | 46888 | 48936 | 48936 | 51024 | 51024 | 51024 | 52752 | 52752 | 55056 | 55056 |
| $N_{PRB}$ | 71 | 72 | 73 | 74 | 75 | 76 | 77 | 78 | 79 | 80 |
| TBS | 55056 | 57336 | 57336 | 57336 | 59256 | 59256 | 59256 | 61664 | 61664 | 63776 |
| $N_{PRB}$ | 81 | 82 | 83 | 84 | 85 | 86 | 87 | 88 | 89 | 90 |
| TBS | 63776 | 63776 | 63776 | 66592 | 66592 | 66592 | 68808 | 68808 | 68808 | 71112 |
| $N_{PRB}$ | 91 | 92 | 93 | 94 | 95 | 96 | 97 | 98 | 99 | 100 |
| TBS | 71112 | 71112 | 73712 | 73712 | 75376 | 75376 | 76208 | 76208 | 78704 | 78704 |
| $N_{PRB}$ | 101 | 102 | 103 | 104 | 105 | 106 | 107 | 108 | 109 | 110 |
| TBS | 78704 | 81176 | 81176 | 81176 | 81176 | 84760 | 84760 | 84760 | 84760 | 87936. |

12. The method of claim 8, wherein a TBS value of the TBS index 31 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 808 | 1608 | 2472 | 3240 | 4136 | 4968 | 5736 | 6456 | 7480 | 8248 |
| $N_{PRB}$ | 11 | 12 | 13 | 14 | 15 | 16 | 17 | 18 | 19 | 20 |
| TBS | 9144 | 9912 | 10680 | 11448 | 12216 | 12960 | 14112 | 14688 | 15840 | 16416 |
| $N_{PRB}$ | 21 | 22 | 23 | 24 | 25 | 26 | 27 | 28 | 29 | 30 |
| TBS | 17568 | 18336 | 19080 | 19848 | 20616 | 21384 | 22152 | 22920 | 23688 | 24496 |
| $N_{PRB}$ | 31 | 32 | 33 | 34 | 35 | 36 | 37 | 38 | 39 | 40 |
| TBS | 25456 | 26416 | 27376 | 28336 | 29296 | 29296 | 30576 | 31704 | 31704 | 32856 |
| $N_{PRB}$ | 41 | 42 | 43 | 44 | 45 | 46 | 47 | 48 | 49 | 50 |
| TBS | 34008 | 35160 | 35160 | 36696 | 36696 | 37888 | 39232 | 39232 | 40576 | 40576 |
| $N_{PRB}$ | 51 | 52 | 53 | 54 | 55 | 56 | 57 | 58 | 59 | 60 |
| TBS | 42368 | 42368 | 43816 | 45352 | 45352 | 46888 | 46888 | 46888 | 48936 | 48936 |
| $N_{PRB}$ | 61 | 62 | 63 | 64 | 65 | 66 | 67 | 68 | 69 | 70 |
| TBS | 51024 | 51024 | 52752 | 52752 | 52752 | 55056 | 55056 | 55056 | 57336 | 57336 |
| $N_{PRB}$ | 71 | 72 | 73 | 74 | 75 | 76 | 77 | 78 | 79 | 80 |
| TBS | 59256 | 59256 | 59256 | 61664 | 61664 | 63776 | 63776 | 63776 | 66592 | 66592 |

-continued

| $N_{PRB}$ | 81 | 82 | 83 | 84 | 85 | 86 | 87 | 88 | 89 | 90 |
|---|---|---|---|---|---|---|---|---|---|---|
| TBS | 66592 | 68808 | 68808 | 68808 | 71112 | 71112 | 71112 | 73712 | 73712 | 73712 |
| $N_{PRB}$ | 91 | 92 | 93 | 94 | 95 | 96 | 97 | 98 | 99 | 100 |
| TBS | 75376 | 76208 | 76208 | 78704 | 78704 | 78704 | 81176 | 81176 | 81176 | 81176 |
| $N_{PRB}$ | 101 | 102 | 103 | 104 | 105 | 106 | 107 | 108 | 109 | 110 |
| TBS | 84760 | 84760 | 84760 | 84760 | 87936 | 87936 | 87936 | 87936 | 90816 | 90816. |

13. The method of claim 8, wherein a TBS value of the TBS index 32 for supporting the 256QAM modulation scheme in the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 840 | 1672 | 2536 | 3368 | 4264 | 5160 | 5992 | 6712 | 7736 | 8504 |
| $N_{PRB}$ | 11 | 12 | 13 | 14 | 15 | 16 | 17 | 18 | 19 | 20 |
| TBS | 9528 | 10296 | 11064 | 11832 | 12960 | 13536 | 14688 | 15264 | 16416 | 16992 |
| $N_{PRB}$ | 21 | 22 | 23 | 24 | 25 | 26 | 27 | 28 | 29 | 30 |
| TBS | 17568 | 19080 | 19848 | 20616 | 21384 | 22152 | 22920 | 23688 | 24496 | 25456 |
| $N_{PRB}$ | 31 | 32 | 33 | 34 | 35 | 36 | 37 | 38 | 39 | 40 |
| TBS | 26416 | 27376 | 28336 | 29296 | 29296 | 30576 | 31704 | 32856 | 32856 | 34008 |
| $N_{PRB}$ | 41 | 42 | 43 | 44 | 45 | 46 | 47 | 48 | 49 | 50 |
| TBS | 35160 | 35160 | 36696 | 37888 | 37888 | 39232 | 40576 | 40576 | 42368 | 42368 |
| $N_{PRB}$ | 51 | 52 | 53 | 54 | 55 | 56 | 57 | 58 | 59 | 60 |
| TBS | 43816 | 43816 | 45352 | 46888 | 46888 | 46888 | 48936 | 48936 | 51024 | 51024 |
| $N_{PRB}$ | 61 | 62 | 63 | 64 | 65 | 66 | 67 | 68 | 69 | 70 |
| TBS | 52752 | 52752 | 52752 | 55056 | 55056 | 57336 | 57336 | 57336 | 59256 | 59256 |
| $N_{PRB}$ | 71 | 72 | 73 | 74 | 75 | 76 | 77 | 78 | 79 | 80 |
| TBS | 61664 | 61664 | 61664 | 63776 | 63776 | 63776 | 66592 | 66592 | 66592 | 68808 |
| $N_{PRB}$ | 81 | 82 | 83 | 84 | 85 | 86 | 87 | 88 | 89 | 90 |
| TBS | 68808 | 71112 | 71112 | 71112 | 73712 | 73712 | 73712 | 75376 | 76208 | 76208 |
| $N_{PRB}$ | 91 | 92 | 93 | 94 | 95 | 96 | 97 | 98 | 99 | 100 |
| TBS | 78704 | 78704 | 78704 | 81176 | 81176 | 81176 | 84760 | 84760 | 84760 | 84760 |
| $N_{PRB}$ | 101 | 102 | 103 | 104 | 105 | 106 | 107 | 108 | 109 | 110 |
| TBS | 87936 | 87936 | 87936 | 87936 | 90816 | 90816 | 90816 | 93800 | 93800 | 93800. |

14. The method of claim 8, wherein a TBS value of the TBS index 33 that supports maximum transmission efficiency of the TBS table is set as shown in the following table

| $N_{PRB}$ | 1 | 2 | 3 | 4 | 5 | 6 | 7 | 8 | 9 | 10 |
|---|---|---|---|---|---|---|---|---|---|---|
| TBS | 968 | 1992 | 2984 | 4008 | 4968 | 5992 | 6968 | 7992 | 8760 | 9912 |
| $N_{PRB}$ | 11 | 12 | 13 | 14 | 15 | 16 | 17 | 18 | 19 | 20 |
| TBS | 10680 | 11832 | 12960 | 13536 | 14688 | 15840 | 16992 | 17568 | 19080 | 19848 |

-continued

| $N_{PRB}$ | 21 | 22 | 23 | 24 | 25 | 26 | 27 | 28 | 29 | 30 |
|---|---|---|---|---|---|---|---|---|---|---|
| TBS | 20616 | 21384 | 22920 | 23688 | 24496 | 25456 | 26416 | 27376 | 28336 | 29296 |
| $N_{PRB}$ | 31 | 32 | 33 | 34 | 35 | 36 | 37 | 38 | 39 | 40 |
| TBS | 30576 | 31704 | 32856 | 34008 | 35160 | 35160 | 36696 | 37888 | 39232 | 39232 |
| $N_{PRB}$ | 41 | 42 | 43 | 44 | 45 | 46 | 47 | 48 | 49 | 50 |
| TBS | 40576 | 40576 | 42368 | 43816 | 43816 | 45352 | 46888 | 46888 | 48936 | 48936 |
| $N_{PRB}$ | 51 | 52 | 53 | 54 | 55 | 56 | 57 | 58 | 59 | 60 |
| TBS | 51024 | 51024 | 52752 | 52752 | 55056 | 55056 | 57336 | 57336 | 59256 | 59256 |
| $N_{PRB}$ | 61 | 62 | 63 | 64 | 65 | 66 | 67 | 68 | 69 | 70 |
| TBS | 59256 | 61664 | 61664 | 63776 | 63776 | 63776 | 66592 | 66592 | 68808 | 68808 |
| $N_{PRB}$ | 71 | 72 | 73 | 74 | 75 | 76 | 77 | 78 | 79 | 80 |
| TBS | 71112 | 71112 | 71112 | 73712 | 75376 | 76208 | 76208 | 76208 | 78704 | 78704 |
| $N_{PRB}$ | 81 | 82 | 83 | 84 | 85 | 86 | 87 | 88 | 89 | 90 |
| TBS | 81176 | 81176 | 81176 | 81176 | 84760 | 84760 | 84760 | 87936 | 87936 | 87936 |
| $N_{PRB}$ | 91 | 92 | 93 | 94 | 95 | 96 | 97 | 98 | 99 | 100 |
| TBS | 90816 | 90816 | 90816 | 93800 | 93800 | 93800 | 93800 | 97896 | 97896 | 97896 |
| $N_{PRB}$ | 101 | 102 | 103 | 104 | 105 | 106 | 107 | 108 | 109 | 110 |
| TBS | 97896 | 97896 | 97896 | 97896 | 97896 | 97896 | 97896 | 97896 | 97896 | 97896. |

15. A base station that transmits data, comprising:
a receiver configured to receive Channel State Information (CSI) from a User Equipment;
a controller configured to determine a Transport Block Size (TBS) value based on a TBS table including indices corresponding to a 256QAM modulation scheme, and a number of allocable Physical Resource Block (PRB) pairs; and
a transmitter configured to transmit data using the TBS value,
wherein the TBS table sets TBS indices 27 to 33 for supporting the 256QAM modulation scheme; and TBS values for supporting the 256QAM modulation scheme in the TBS table are set based on a number of resource elements of a PRB pair, a number of allocable PRB pairs, and a transmission efficiency value for each index; and
wherein TBS values of the TBS indices 27 to 32 are set by applying a condition that the number of resource elements of the PRB pair is 120; a TBS value of the TBS index 33 is set by applying a condition that the number of resource elements of the PRB pair is 136; and the TBS values of the TBS indices 27 to 33 are set by applying a condition that the number of allocable PRB pairs is inclusively between 1 and 110,
wherein a TBS value of the TBS index 28 for supporting the 256QAM modulation scheme in the TBS table is set as shown in the following table

| $N_{PRB}$ | 1 | 2 | 3 | 4 | 5 | 6 | 7 | 8 |
|---|---|---|---|---|---|---|---|---|
| TBS | 680 | 1384 | 2088 | 2792 | 3496 | 4264 | 4968 | 5544 |

-continued

| $N_{PRB}$ | 9 | 10 | 11 | 12 | 13 | 14 | 15 | 16 |
|---|---|---|---|---|---|---|---|---|
| TBS | 6200 | 6968 | 7736 | 8504 | 9144 | 9912 | 10680 | 11064 |
| $N_{PRB}$ | 17 | 18 | 19 | 20 | 21 | 22 | 23 | 24 |
| TBS | 11832 | 12576 | 13536 | 14112 | 14688 | 15264 | 16416 | 16992 |
| $N_{PRB}$ | 25 | 26 | 27 | 28 | 29 | 30 | 31 | 32 |
| TBS | 17568 | 18336 | 19080 | 19848 | 20616 | 21384 | 22152 | 22152 |
| $N_{PRB}$ | 33 | 34 | 35 | 36 | 37 | 38 | 39 | 40 |
| TBS | 22920 | 23688 | 24496 | 25456 | 26416 | 26416 | 27376 | 28336 |
| $N_{PRB}$ | 41 | 42 | 43 | 44 | 45 | 46 | 47 | 48 |
| TBS | 29296 | 29296 | 30576 | 30576 | 31704 | 32856 | 32856 | 34008 |
| $N_{PRB}$ | 49 | 50 | 51 | 52 | 53 | 54 | 55 | 56 |
| TBS | 34008 | 35160 | 35160 | 36696 | 36696 | 37888 | 39232 | 39232 |
| $N_{PRB}$ | 57 | 58 | 59 | 60 | 61 | 62 | 63 | 64 |
| TBS | 40576 | 40576 | 42368 | 42368 | 42368 | 43816 | 43816 | 45352 |
| $N_{PRB}$ | 65 | 66 | 67 | 68 | 69 | 70 | 71 | 72 |
| TBS | 45352 | 46888 | 46888 | 46888 | 48936 | 48936 | 48936 | 51024 |
| $N_{PRB}$ | 73 | 74 | 75 | 76 | 77 | 78 | 79 | 80 |
| TBS | 51024 | 52752 | 52752 | 52752 | 55056 | 55056 | 55056 | 57336 |

-continued

| $N_{PRB}$ | 81 | 82 | 83 | 84 | 85 | 86 | 87 | 88 |
|---|---|---|---|---|---|---|---|---|
| TBS | 57336 | 57336 | 59256 | 59256 | 59256 | 61664 | 61664 | 61664 |
| $N_{PRB}$ | 89 | 90 | 91 | 92 | 93 | 94 | 95 | 96 |
| TBS | 61664 | 63776 | 63776 | 63776 | 66592 | 66592 | 66592 | 66592 |
| $N_{PRB}$ | 97 | 98 | 99 | 100 | 101 | 102 | 103 | 104 |
| TBS | 68808 | 68808 | 68808 | 71112 | 71112 | 71112 | 73712 | 73712 |
| $N_{PRB}$ | 105 | 106 | 107 | 108 | 109 | 110 | | |
| TBS | 73712 | 75376 | 75376 | 76208 | 76208 | 76208. | | |

\* \* \* \* \*